(12) United States Patent
Graham et al.

(10) Patent No.: US 11,591,050 B2
(45) Date of Patent: Feb. 28, 2023

(54) SONOBUOY DEPLOYABLE RESOURCES

(71) Applicant: Eagle Technology, LLC, Melbourne, FL (US)

(72) Inventors: Tom Graham, Lindenhurst, NY (US); Robert Eschbach, East Rockaway, NY (US); Robert E. Hammerquist, Huntington, NY (US); Brian K. Elliott, Reston, VA (US)

(73) Assignee: Eagle Technology, LLC, Melbourne, FL (US)

( * ) Notice: Subject to any disclaimer, the term of this patent is extended or adjusted under 35 U.S.C. 154(b) by 213 days.

(21) Appl. No.: 17/154,441

(22) Filed: Jan. 21, 2021

(65) Prior Publication Data

US 2022/0227463 A1 Jul. 21, 2022

(51) Int. Cl.
*B63B 22/24* (2006.01)
*B63C 1/12* (2006.01)
(Continued)

(52) U.S. Cl.
CPC .............. *B63B 22/24* (2013.01); *B63B 35/50* (2013.01); *B63C 1/12* (2013.01); *B63G 8/001* (2013.01);
(Continued)

(58) Field of Classification Search
CPC ......... B63B 22/24; B63B 35/50; B63B 22/26; B63B 2022/006; B63B 2201/18;
(Continued)

(56) References Cited

U.S. PATENT DOCUMENTS 6,056,237 A 5/2000 Woodland
6,400,645 B1 * 6/2002 Travor ................. G10K 11/006
367/4
(Continued)

FOREIGN PATENT DOCUMENTS

EP 2190743 B1 10/2016
JP 2012-503167 A 2/2012

OTHER PUBLICATIONS

Brehm, M., and C. Wheeler, (Mar. 2019) "Swarms", Article 36, Discussion paper for the Convention on Certain Conventional Weapons (CCW), Geneva, Switzerland, pp. 1-8, http://www.article36.org/wp-content/uploads/2019/06/swarms.pdf.
(Continued)

*Primary Examiner* — Anthony D Wiest
(74) *Attorney, Agent, or Firm* — Edell, Shapiro & Finnan, LLC

(57) ABSTRACT

Disclosed is a sonobuoy that houses at least one unmanned vehicle that may be launched from the sonobuoy. The sonobuoy may include a canister, a parachute, an unmanned vehicle, and a launch mechanism. The parachute may be disposed within an interior cavity of the canister proximate to a first end of the canister. The unmanned vehicle may be disposed within the interior cavity of the canister proximate to a second end of the canister. The launch mechanism may be disposed within the interior cavity of the canister and operatively coupled to the unmanned vehicle. The launch mechanism may be configured to launch the unmanned vehicle from the canister. The sonobuoy may further include a launch deployment mechanism that may be configured to orient the canister with respect to a surface after the sonobuoy impacts the surface in order to facilitate the launch of the unmanned vehicle.

20 Claims, 36 Drawing Sheets

(51) Int. Cl.
  B63G 8/00  (2006.01)
  B64C 39/02  (2023.01)
  B63B 35/50  (2006.01)

(52) U.S. Cl.
  CPC ...... B64C 39/024 (2013.01); B63G 2008/002 (2013.01); B64C 2201/08 (2013.01); B64C 2201/205 (2013.01)

(58) Field of Classification Search
  CPC ......... B63B 22/003; B63C 1/12; B63G 8/001; B63G 2008/002; B63G 2008/008; B64C 39/024; B64C 2201/08; B64C 2201/205; G10K 11/006
  See application file for complete search history.

(56) References Cited

U.S. PATENT DOCUMENTS

| | | | |
|---|---|---|---|
| 8,056,461 B2* | 11/2011 | Bossert | F41F 3/07 |
| | | | 114/319 |
| 8,662,441 B2 | 3/2014 | Powell et al. | |
| 8,708,285 B1* | 4/2014 | Carreiro | F42B 12/60 |
| | | | 244/190 |
| 10,053,194 B1 | 8/2018 | Majewski et al. | |
| 10,486,830 B2 | 11/2019 | Kahlon et al. | |
| 10,661,878 B1 | 5/2020 | Bonang et al. | |
| 2019/0263489 A1* | 8/2019 | Coles | B63C 9/01 |

OTHER PUBLICATIONS

Hamblinng, D., (2018) "Change in the air: Disruptive Developments in Armed UAV Technology," UNIDIR, https://unidir.org/publication/change-air-disruptive-developments-uav-technology (20 pages), https://www.unidir.org/files/publications/pdfs/-en-726.pdf.

Kunertova, D., (2019) "Military Drones in Europe: The European Defense Market and the Spread of Military UAV technology," Center for War Studies, University of Southern Denmark (76 pages), https://www.sdu.dk/cws/-/media/cws/files/cws_military_drones_in_europe_report.pdf.

Nato Cied Coe (Jun. 2017), "Countering IED-UAV: A Long-Term Simulation-Based Study," pp. 1-13, https://ciedcoe.org/index.php/reports/analysis-reports/48-0001-c-ied-uav-a-long-term-simulation-based-study-final-version/file.

Sun, Z., et al., "Collaborative target-tracking control using multiple autonomous fixed-wing UAVs with constant speeds," eprint arXiv:1810.00182, pp. 1-33 (2020), https://arxiv.org/pdf/1810.00182.pdf.

Tuttle, R., "U.S. Navy Wants To Boost Unmanned Systems On The Surface, Underwater To Meet Challenges," Unmanned Systems (AUVSI,) vol. 37 No. 5: pp. 32-35 (Jul.-Aug. 2019), https://issuu.com/auvsi3/docs/july-augus-web-2.

U.S. Department of the Navy, "The Navy Unmanned Undersea Vehicle (UUV) Master Plan," Nov. 2004 (127 pages), https://www.hsdl.org/?view&did=708654.

L3harris, "Next-Generation Pneumatic Sonobuoy Launch Systems", https://www.l3harris.com/all-capabilities/next-generation-pneumatic-sonobuoy-launch-systems, last accessed on Jan. 21, 2021.

* cited by examiner

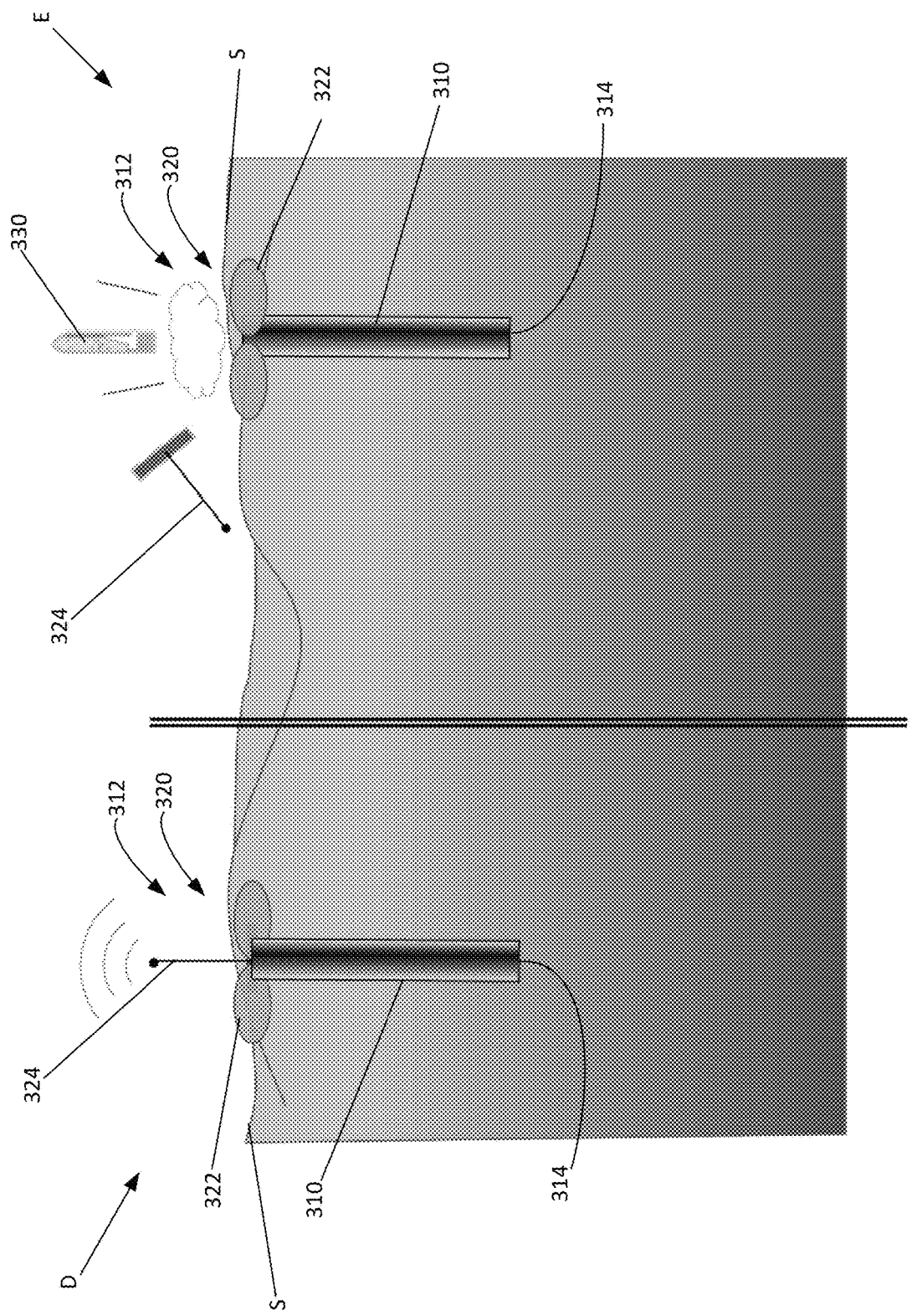

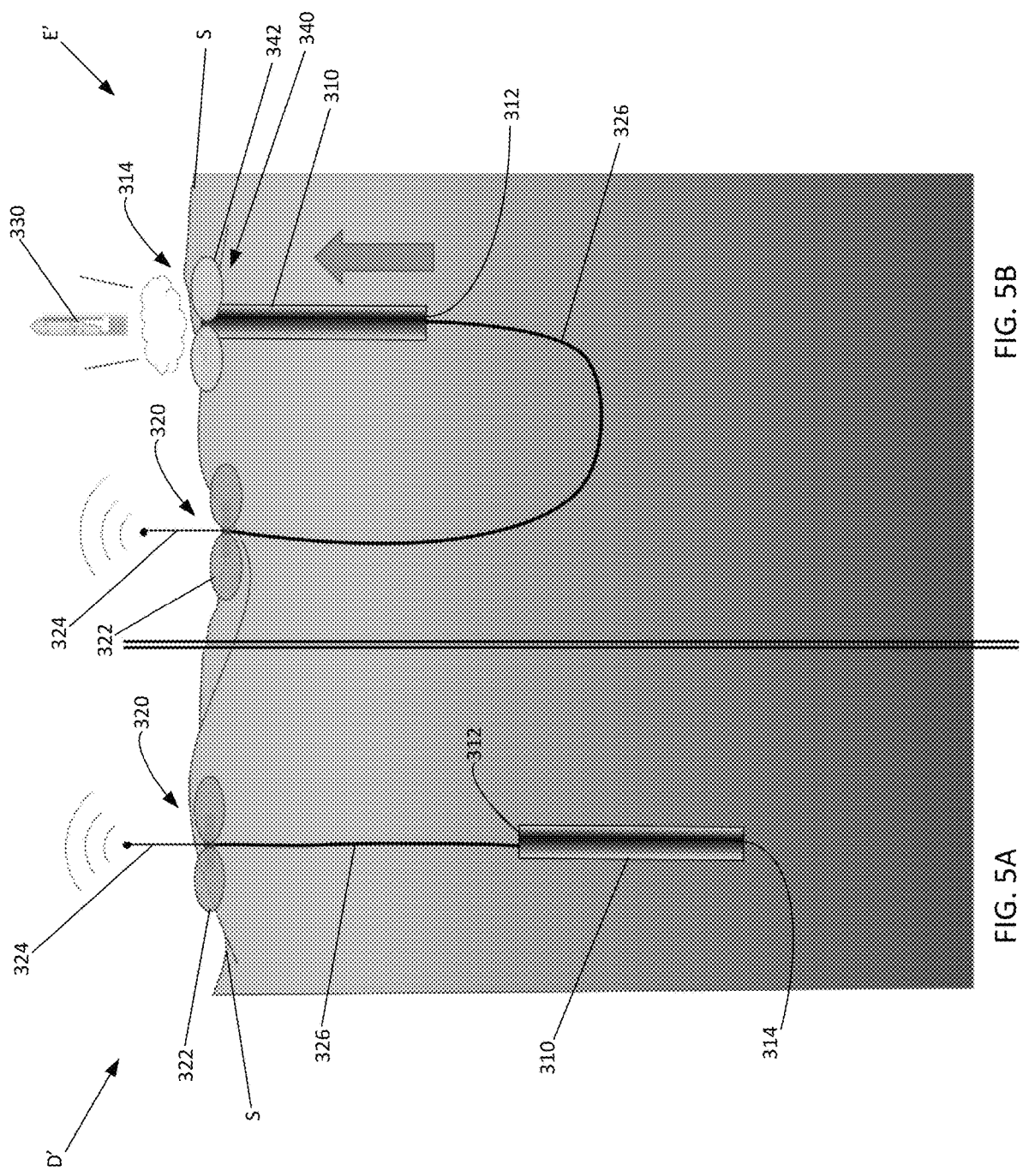

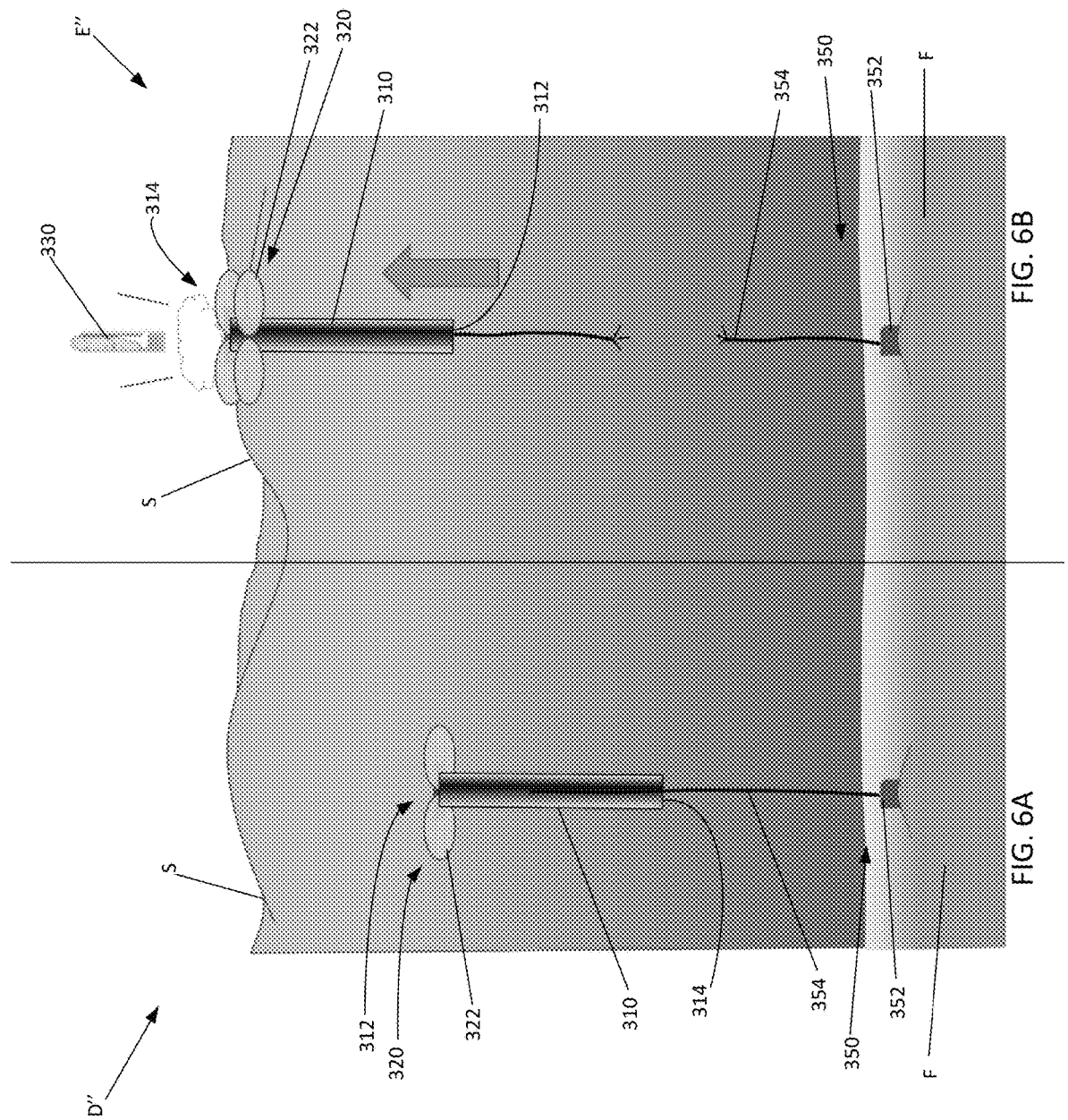

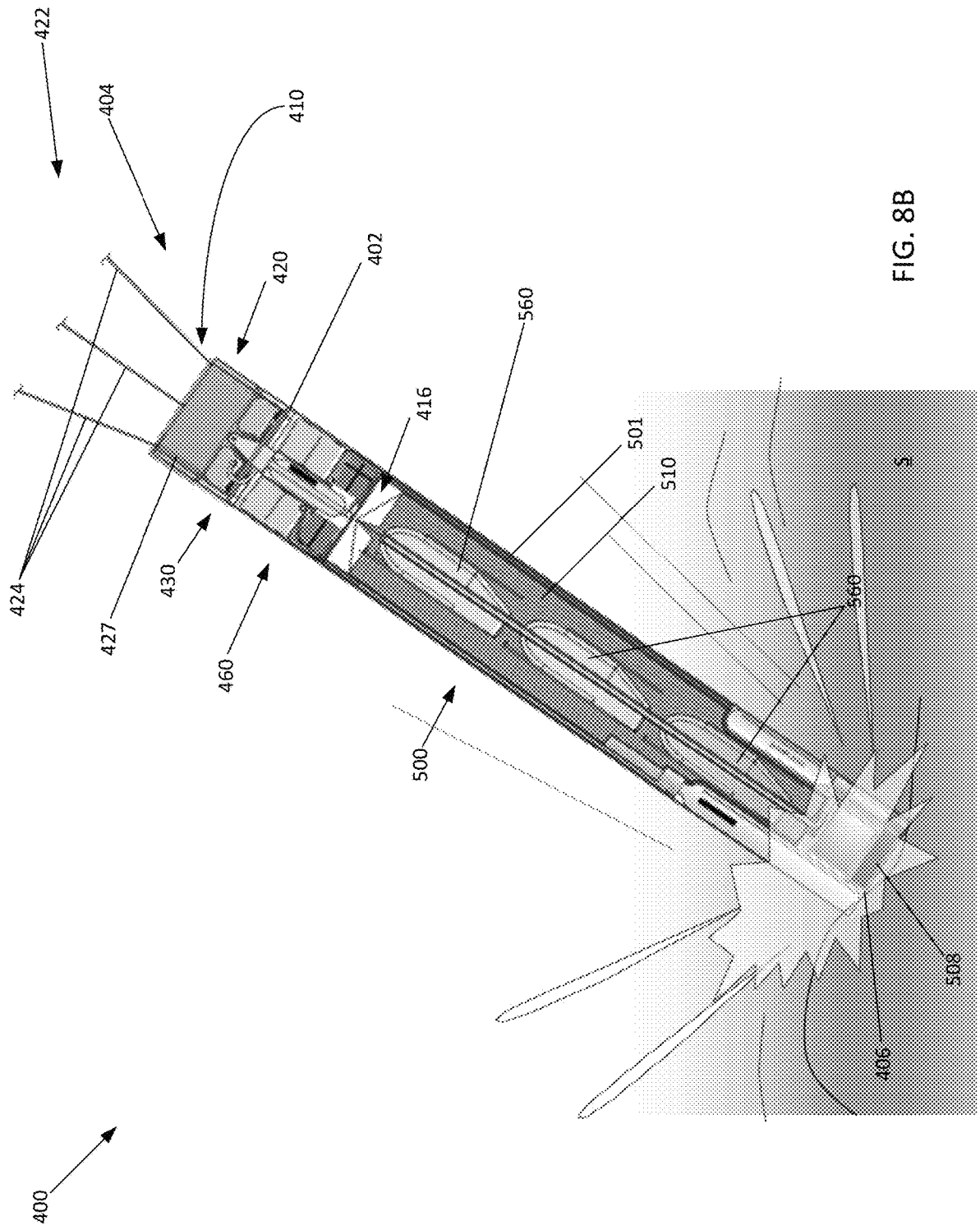

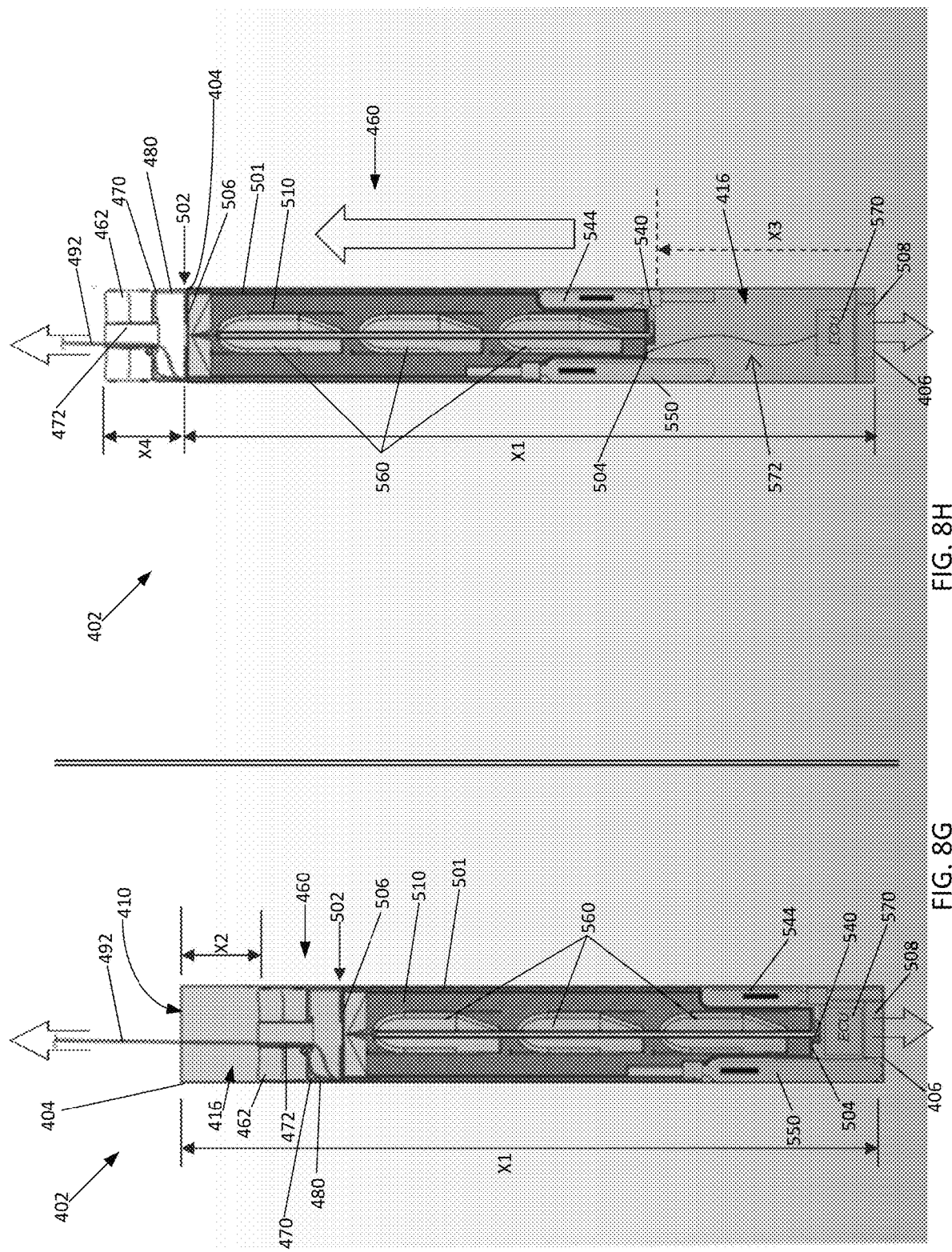

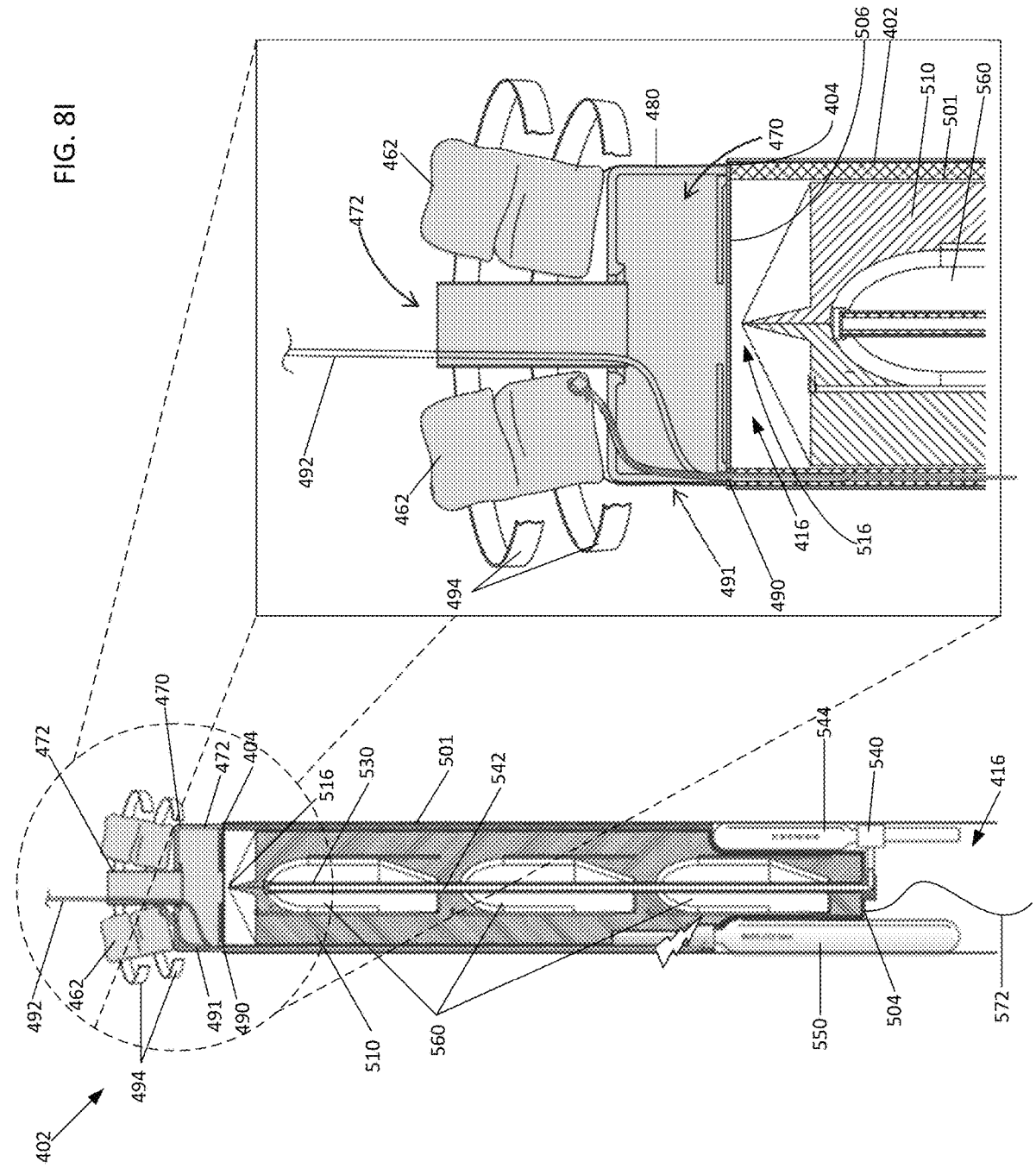

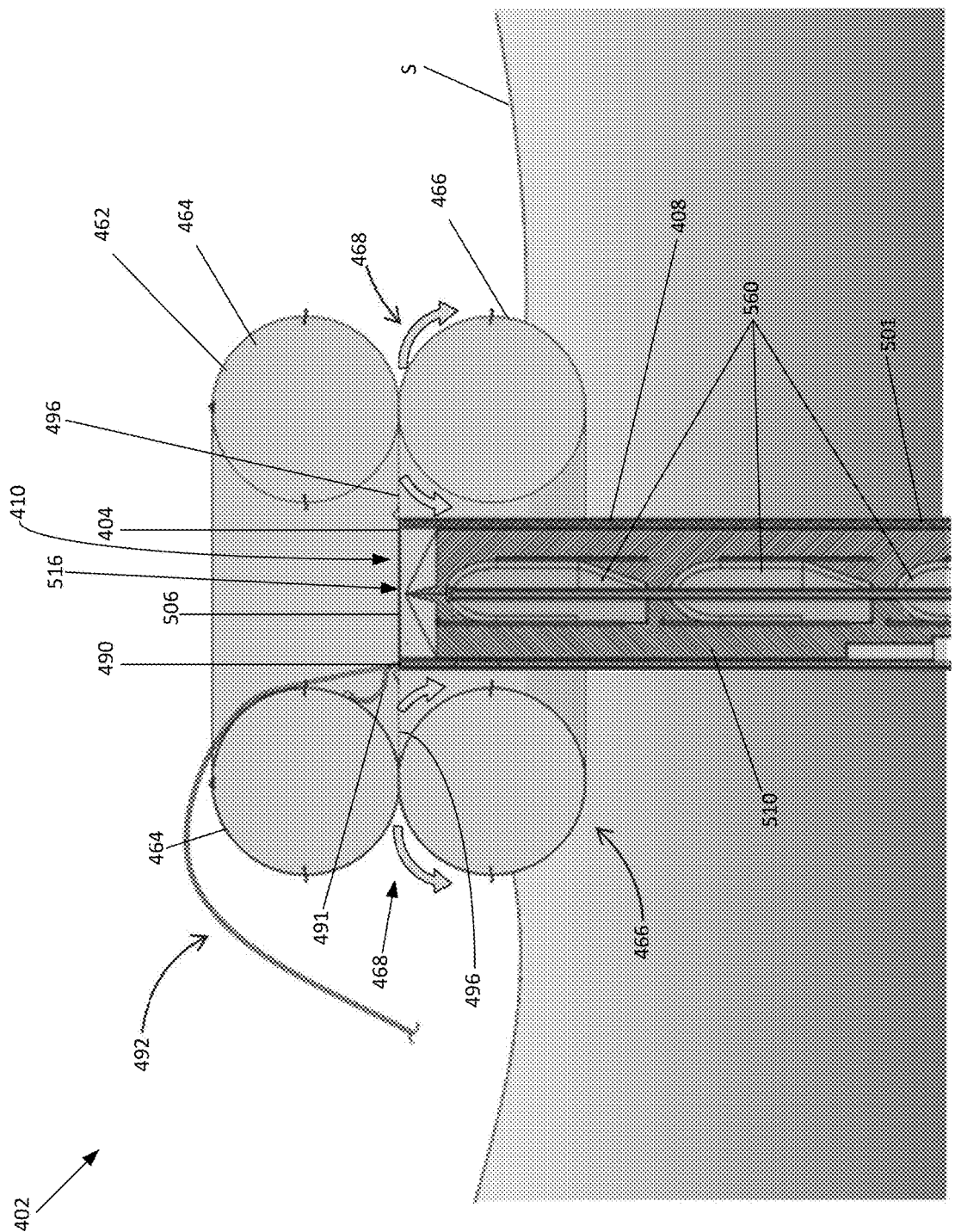

SONOBUOY DEPLOYABLE RESOURCES

BACKGROUND OF THE INVENTION

Sonobuoys are relatively small buoys (i.e., floating devices) typically equipped with expendable sonar systems that are dropped or ejected from aircraft or ships for the purpose of conducting anti-submarine warfare or underwater acoustic research. Typically, sonobuoys are stored, transported, and launched from an aircraft manually, pyrotechnically, pneumatically or by gravity. In some configurations, sonobuoys are launched using a sonobuoy launching container (hereinafter "SLC").

Over time, offensive and defensive capabilities of adversarial countries have increased. Often, Anti Access/Area Denial (hereinafter "A2/AD") weapon systems are deployed, where A2/AD weapon systems are devices or strategies used to prevent an adversary from occupying or traversing an area of land, sea, or air. A2/AD situations typically require staging military resources, where operations often require high value electronic warfare platforms to be scrambled in advance of primary mission resources. Electronic warfare platforms typically require coordinated and close proximity ventures to protect the primary resources of an operation, which makes mission planning challenging and puts high value resources at risk. For example, even though unmanned vehicle technology has been developed to conduct electronic warfare operations, high value assets are typically utilized to deliver the unmanned vehicles to a target area so that the unmanned vehicles may conduct electronic warfare to protect incoming vehicles from adversary A2/AD weapon systems.

Accordingly, it would be desirable to provide a sonobuoy that is configured to house one or more unmanned vehicles (e.g., ground, aerial, underwater, etc.) as a payload so that the sonobuoys, and ultimately their payload (i.e., unmanned vehicles), may be staged in advance, in both time and location, of an operation. Furthermore, it would be desirable for these sonobuoys to be capable of resting on or below a surface (e.g., land or water), and be available to remotely launch unmanned vehicles at a time of need so that the unmanned vehicles may conduct electronic warfare. This would allow staged sonobuoys to launch one or more unmanned vehicles that are capable of traveling ahead of the primary resources of a mission and provide required functionality, either autonomously or via remote control, for conducting electronic warfare against A2/AD weapon systems.

SUMMARY OF THE INVENTION

The present invention may be directed to a sonobuoy configured to launch an unmanned vehicle. The sonobuoy may include a canister that defines an interior cavity. The sonobuoy may further include an unmanned vehicle disposed within the interior cavity of the canister. Furthermore, the sonobuoy may also include a launch mechanism disposed within the interior cavity of the canister. The launch mechanism may be operatively coupled to the unmanned vehicle such that the launch mechanism may launch the unmanned vehicle from the canister.

The canister of the sonobuoy may further include a first end and an opposite second end. The sonobuoy may further include a parachute unit disposed within the interior cavity of the canister proximate to the first end of the canister. The parachute unit may be configured to deploy a parachute from the first end of the canister after the sonobuoy has been launched and prior to the sonobuoy impacting a surface. In addition, the launch mechanism of the sonobuoy may be configured to launch the unmanned vehicle from the canister after the sonobuoy has impacted the surface. The unmanned vehicle and the launch mechanism may be disposed within the interior cavity of the canister more proximate to the second end of the canister than the first end of the canister. The launch mechanism may include a compressed gas container. In addition, the sonobuoy may include a communication device disposed within the interior cavity of the canister. The communication device may be configured to receive launch signals from a device that is remotely located from the sonobuoy. Furthermore, the unmanned vehicle may be one of a plurality of unmanned vehicles disposed within the interior cavity of the canister.

In another embodiment, the present invention may be directed to a sonobuoy configured to launch an unmanned vehicle, where the sonobuoy may include a canister, a parachute, an unmanned vehicle, a launch mechanism, and a launch deployment mechanism. The canister may define an interior cavity, and may have a first end and a second end. The parachute may be disposed within the interior cavity of the canister proximate to the first end of the canister. The unmanned vehicle may be disposed within the interior cavity of the canister proximate to the second end of the canister. The launch mechanism may be disposed within the interior cavity of the canister and operatively coupled to the unmanned vehicle. The launch mechanism may be configured to launch the unmanned vehicle from the canister. The launch deployment mechanism may be disposed within the interior cavity of the canister between the unmanned vehicle and the parachute. The launch deployment mechanism may be configured to orient the canister with respect to a surface after the sonobuoy has impacted the surface in order to facilitate the launch of the unmanned vehicle from the canister.

In addition, the parachute may be configured to be deploy from the first end of the canister after the sonobuoy has been launched and prior to the sonobuoy impacting the surface. The sonobuoy may further include a communication device that may be disposed within the interior cavity of the canister. The communication device may be configured to receive one or more launch signals from a device that is remotely located from the sonobuoy after the sonobuoy impacts the surface. The one or more launch signals may be configured to actuate the launch mechanism to launch the unmanned vehicle from the canister. The launch mechanism may include a container of compressed gas.

In yet another embodiment, the present invention may be directed to a sonobuoy configured to launch an unmanned vehicle, where the sonobuoy may include a canister, a parachute, an unmanned vehicle, and a launch mechanism. The canister may have a first end, an opposite second end, and a sidewall that spans between the first end and the second end. The first end, the second end, and the sidewall may collectively define an interior cavity. The parachute may be disposed within the interior cavity of the canister proximate to the first end of the canister. The unmanned vehicle may be disposed within the interior cavity of the canister proximate to the second end of the canister. The launch mechanism may be disposed within the interior cavity of the canister and operatively coupled to the unmanned vehicle. The launch mechanism may be configured to launch the unmanned vehicle from the canister.

Furthermore, the unmanned vehicle may be one of a plurality of unmanned vehicles disposed within the interior cavity of the canister, where the plurality of unmanned vehicles may be simultaneously launched from the canister by the launch mechanism. The launch mechanism may include a container of compressed gas that may be configured to propel the unmanned vehicle from the interior cavity of the canister. The sonobuoy may further include a communication device that may be disposed within the interior cavity of the canister. The communication device may be configured to receive one or more launch signals from a device that is remotely located from the sonobuoy. The one or more launch signals may be configured to actuate the launch mechanism to launch the unmanned vehicle from the canister.

BRIEF DESCRIPTION OF THE DRAWINGS

FIGS. 4A and 4B illustrate schematic views of one embodiment for deploying an unmanned vehicle from a sonobuoy in accordance with the present disclosure.

FIGS. 5A and 5B illustrate schematic views of a second embodiment for deploying an unmanned vehicle from a sonobuoy in accordance with the present disclosure.

FIGS. 6A and 6B illustrate schematic views of a third embodiment for deploying an unmanned vehicle from a sonobuoy in accordance with the present disclosure.

Like reference numerals have been used to identify like elements throughout this disclosure.

DETAILED DESCRIPTION OF THE INVENTION

Figure 1:
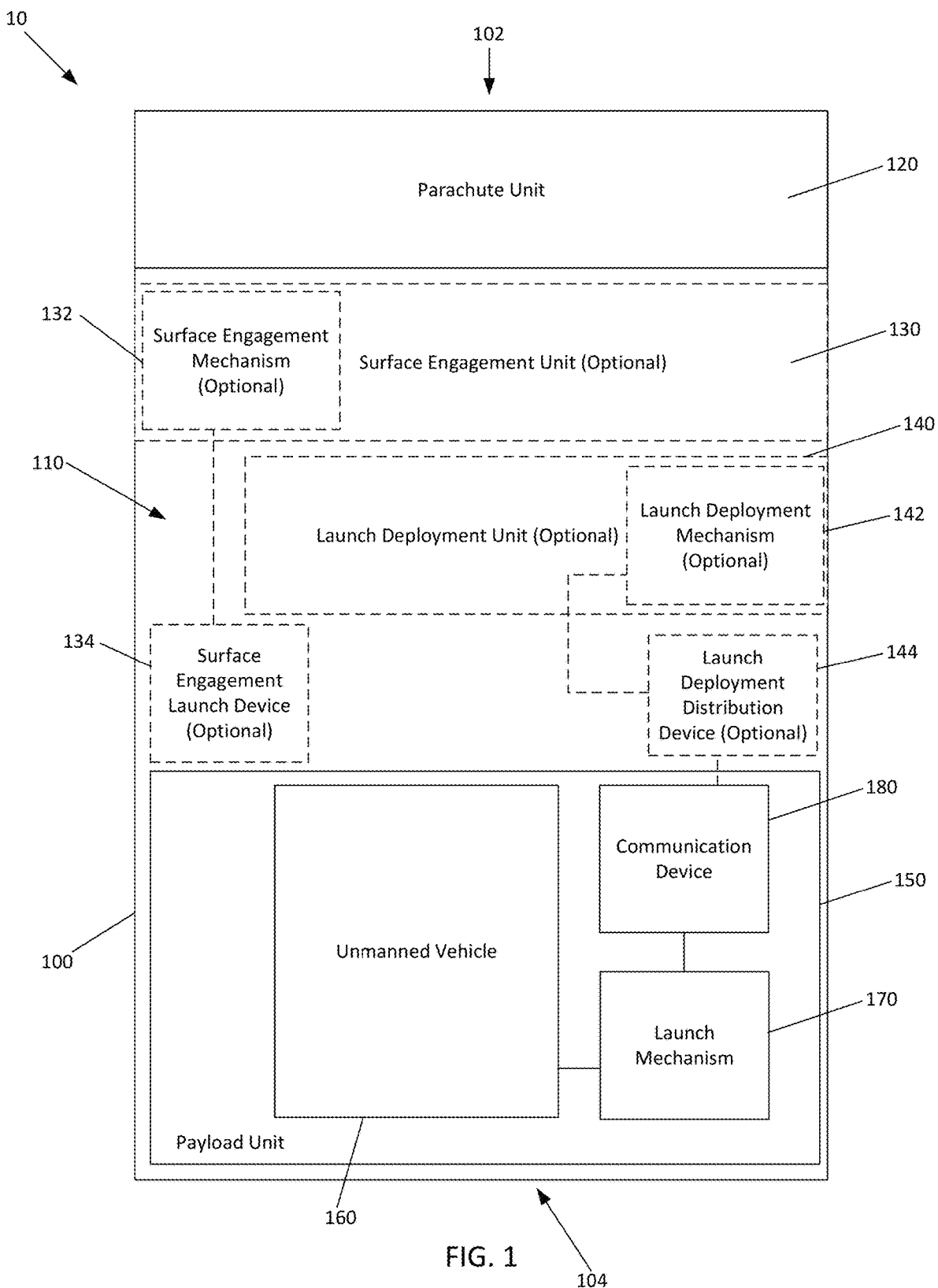
FIG. 1 illustrates a schematic view of a sonobuoy equipped to launch at least one unmanned vehicle in accordance with the present disclosure.

The present invention is directed to a sonobuoy that houses at least one unmanned vehicle that may be launched from the sonobuoy at a desired point in time. The sonobuoy may include at least a canister, a parachute, an unmanned vehicle, and a launch mechanism. The canister may include a first end, an opposite second end, and a sidewall spanning between the first and second ends. The first end, the second end, and the sidewall may collectively define an interior cavity. The parachute may be disposed within the interior cavity of the canister proximate to the first end of the canister. The unmanned vehicle may be disposed within the interior cavity of the canister proximate to a second end of the canister. The launch mechanism may be disposed within the interior cavity of the canister and operatively coupled to the unmanned vehicle such that the launch mechanism may be configured to launch the unmanned vehicle from the canister. The sonobuoy may further include a launch deployment mechanism that may be configured to orient the canister with respect to a surface after the sonobuoy has impacted the surface in order to facilitate the launch of the unmanned vehicle. The sonobuoy of the present invention may be staged in advance, in both time and location, of an operation so that the unmanned vehicle may be launched at a time to conduct electronic warfare.

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the description herein. Alternate embodiments of the present disclosure and their equivalents may be devised without parting from the spirit or scope of the present disclosure. It should be noted that any discussion herein regarding "one embodiment," "an embodiment," "an exemplary embodiment," and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

FIG. 1 illustrates a schematic depiction of a sonobuoy 10. The schematic sonobuoy 10 includes a canister 100 that includes a first end 102 and a second end 104. The canister 100 may define an interior cavity 110. The sonobuoy 10 and canister 100 may be configured for use with an SLC or any other standard launch configuration, including but not limited to the standard launch tube. Disposed within the interior cavity 110 of the canister 100 may be a parachute unit 120, an optional surface engagement unit 130, an optional launch deployment unit 140, and a payload unit 150. Thus, the sonobuoy 10 depicted herein may include at least the parachute unit 120 and the payload unit 150. Described in further detail below, depending on the type of payload and type of surface over which the sonobuoy 10 is launched, the sonobuoy 10 may include the optional surface engagement unit 130 and the optional launch deployment unit 140. The parachute unit 120 may be disposed within the interior cavity 110 of the canister 100 proximate to the first end 102 of the canister, while the payload unit 150 may be disposed within the interior cavity 110 of the canister 100 proximate to the second end 104 of the canister 100. If the sonobuoy 10 is equipped within a surface engagement unit 130 and/or a launch deployment unit 140, the surface engagement unit 130 and the launch deployment unit 140 may be disposed between the parachute unit 120 and the payload unit 150.

For embodiments of the sonobuoy 10 that include the surface engagement unit 130, the surface engagement unit 130 may be activated after the sonobuoy 10 is launched from a vehicle, and after the parachute unit 120 has been deployed. More specifically, after deployment of the sonobuoy 10, the surface engagement unit 130 may be configured to launch a surface engagement mechanism 132 that may be configured to orient the canister 100 of the sonobuoy 10 with respect to a surface after the sonobuoy has impacted the surface or as the sonobuoy impacts the surface. For example, when the sonobuoy 10 is launched over a body of water, the surface engagement unit 130 may be configured deploy a floatable device from the first end 102 of the canister 100 that orients the canister 100 of the sonobuoy 10 with respect to the surface of the body of water. In another example, when the sonobuoy 10 is launched over a land surface, the surface engagement unit 130 may be configured to deploy a mechanism from the first end 102 of the canister 100 immediately prior to impact with the land surface so that the canister 100 of the sonobuoy 10 may be oriented by the mechanism with respect to the land surface, and in order to prevent the canister 100 from becoming stuck between rocks, in a tree, etc. The surface engagement mechanism 132 may orient the canister 100 of the sonobuoy 10 with respect to the surface as the sonobuoy 10 awaits to receive a launch signal to launch/deploy the payload disposed within the interior cavity 110 of the canister 100. The surface engagement unit 130 may further include a surface engagement unit launch device 134 that is operatively coupled to the surface engagement mechanism 132 to deploy the surface engagement mechanism 132 from the first end 102 of the canister 100.

For embodiments of the sonobuoy 10 that include the launch deployment unit 140, the launch deployment unit 140 may be activated after the sonobuoy 10 is launched from a vehicle, after the parachute unit 120 has been deployed, and after the surface engagement unit 130 has been activated. More specifically, after the sonobuoy 10 has been oriented with respect to the surface by the surface engagement unit 130, the launch deployment unit 140 may be configured to launch a launch deployment mechanism 142 from the canister 100. The launch deployment mechanism 142 may be configured to prepare the canister 100 and/or the area around the canister 100 for launch and/or deployment of the payload within the interior cavity 110 of the canister 100. For example, when the sonobuoy 10 is launched over a body of water, and the surface engagement unit 130 has deployed a floatable device from which the canister 100 descends (i.e., the canister 100 is submerged), the launch deployment mechanism 142 may be another floatable device that orients the payload launching end (e.g., the first end 102 of the canister 100 or the second end 104 of the canister 100) of the canister 100 above the surface of the water so that the payload may be launched from the canister 100. The launch deployment section 140 may further include a launch deployment distribution device 144 that is operatively coupled to the launch deployment mechanism 142 to deploy the launch deployment mechanism 142 from the canister 100.

As further illustrated in FIG. 1, the payload unit 150 may include at least one unmanned vehicle 160, a launch mechanism 170, and a communication device 180. The "payload" to be deployed from the canister 100 may be the at least one unmanned vehicle 160. In other words, the at least one unmanned vehicle 160 may be launched from the canister 100. The at least one unmanned vehicle 160 may be an unmanned aerial vehicle (hereinafter "UAV"), an unmanned underwater or submerged vehicle (hereinafter "UUV"), and an unmanned ground vehicle (hereinafter "UGV"). Furthermore, the canister 100 may be configured, or capable of, housing and launching any number of unmanned vehicles simultaneously. The launch mechanism 170 of the payload unit 150 may be operatively coupled to the at least one unmanned vehicle 160 of the payload unit 150 to launch the at least one unmanned vehicle 160 from the canister 100 of the sonobuoy 10. The launch mechanism 170 may be any type of mechanism for propelling an unmanned vehicle from the canister 100 of the sonobuoy 10 including, as further explained below, launching an unmanned vehicle via compressed air/gas. The communication device 180 of the payload unit 150 may be configured to receive communication signals from a device (not shown) that is remote from the sonobuoy 10. The signals received by the communication device 180 may include, but are not limited to, launch command signals. Because the communication device 180 is operatively connected with at least the launch mechanism 170 of the payload unit 150, when the communication device 180 receives a launch command signal, the communication device 180 may instruct, or relay the launch signal to, the launch mechanism 170 to cause the launch mechanism 170 to launch the at least one unmanned vehicle 160. Moreover, as illustrated in FIG. 1, when the sonobuoy 10 is equipped with a launch deployment unit 142, the communication device 180 may also be operatively connected to the launch deployment distribution device 144. The communication device 180 may be configured to relay signals to the launch deployment distribution device 144 to cause the launch deployment distribution device 144 to launch the launch deployment mechanism 142 from the canister 100 of the sonobuoy 10.

Figure 2:
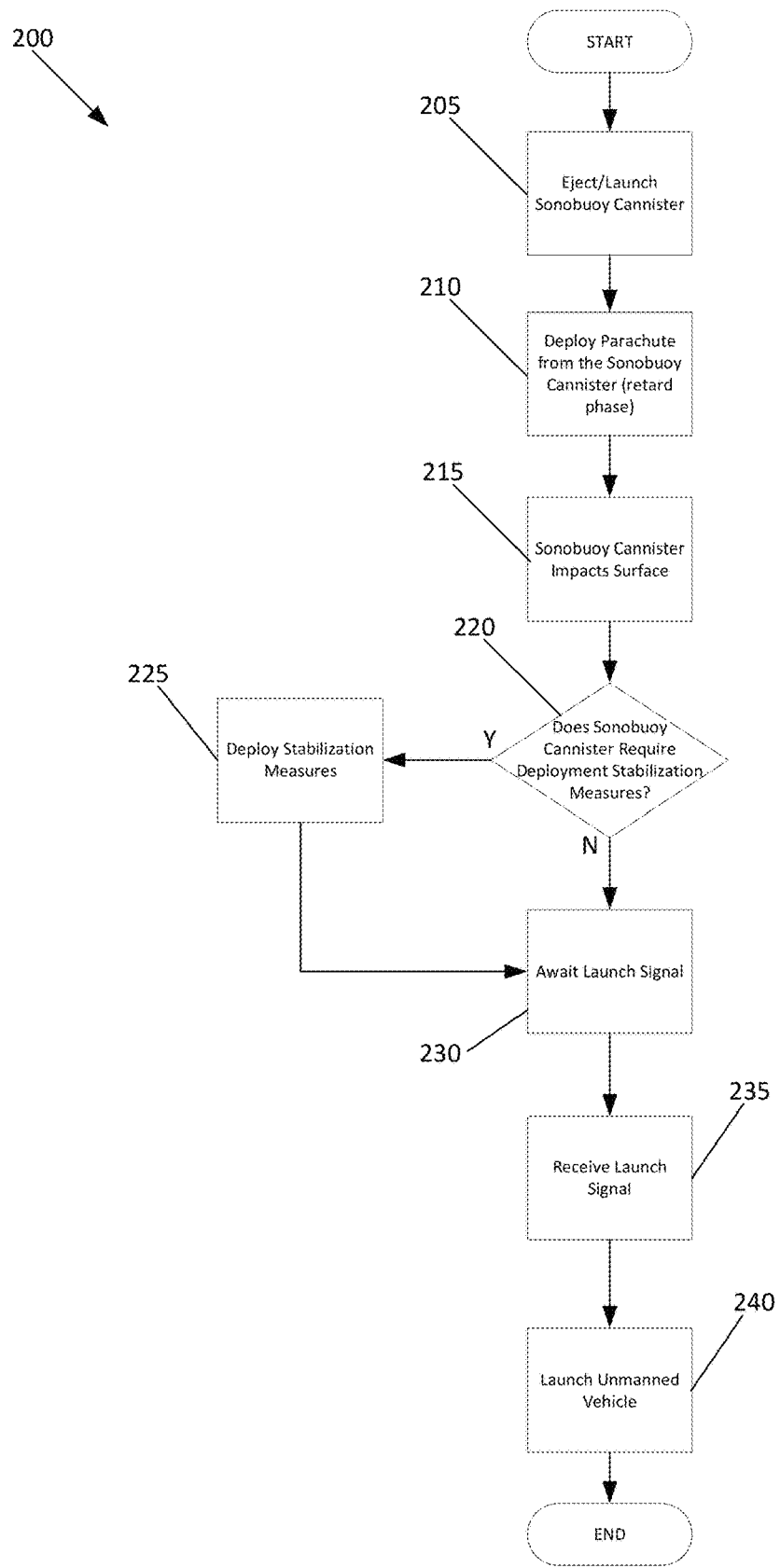
FIG. 2 illustrates a method of deploying the sonobuoy and deploying an unmanned vehicle from the sonobuoy in accordance with the present disclosure.

Turning to FIG. 2, illustrated is a flowchart of the general method 200 for deploying the sonobuoy 10 and later launching at least one unmanned vehicle 160 from the canister 100 of the sonobuoy 10. At step 205, the sonobuoy 10 is launched or ejected from a vehicle configured to launch or eject a sonobuoy. The sonobuoy 10 may be configured to be launched or dropped from conventional sonobuoy launchers/sonobuoy bays of a vehicle (e.g., an airplane). At step 210, the sonobuoy 10 may deploy a parachute from the canister 100 of the sonobuoy, where the parachute retards the velocity of the descending sonobuoy 10 in order to provide a controlled descent from the vehicle. At step 215, the sonobuoy 10 may eventually impact a surface (e.g., water or land). If, at step 220, the sonobuoy canister 100 is equipped with stabilization measures (e.g., surface engagement mechanism 132, launch deployment mechanism 142, etc.) and/or requires deployment of the stabilization measures, then, at step 225, the sonobuoy 10 deploys the stabilization measures. After the stabilization measures have been deployed, or, if, at step 220, the sonobuoy canister 100 is not equipped with stabilization measures, then at step 230, the sonobuoy 10 waits to receive a launch signal by the communication device 180. At step 235, the communication device 180 of the sonobuoy 10 may receive a launch signal from a device remote from the sonobuoy 10. Once the communication device 180 receives the launch signals, at step 240, the launch mechanism 170 launches the at least one unmanned vehicle 160 from the canister 100 of the sonobuoy 10.

Figure 3A:
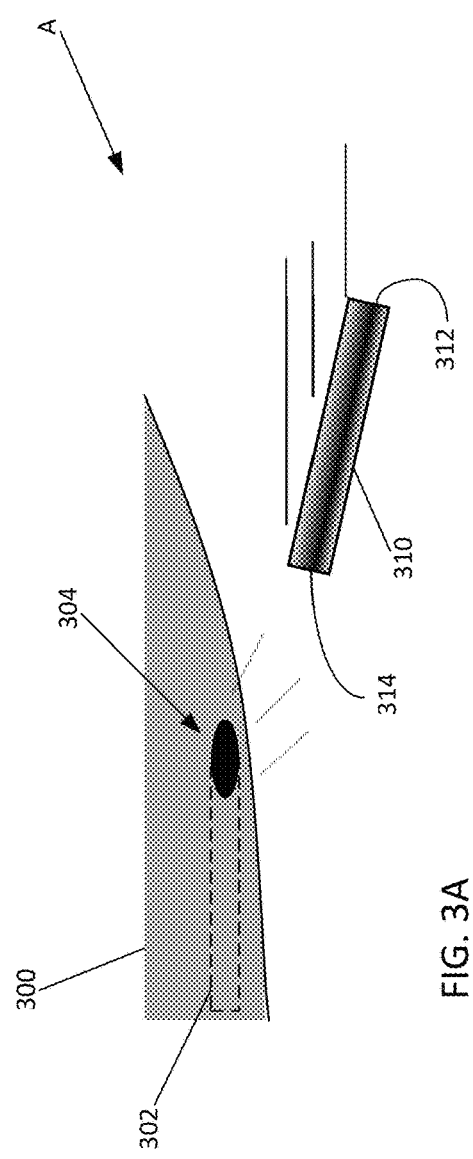
FIGS. 3A-3C illustrate schematic views of the launching stages for launching a sonobuoy housing an unmanned vehicle in accordance with the present disclosure.
Figure 3B:
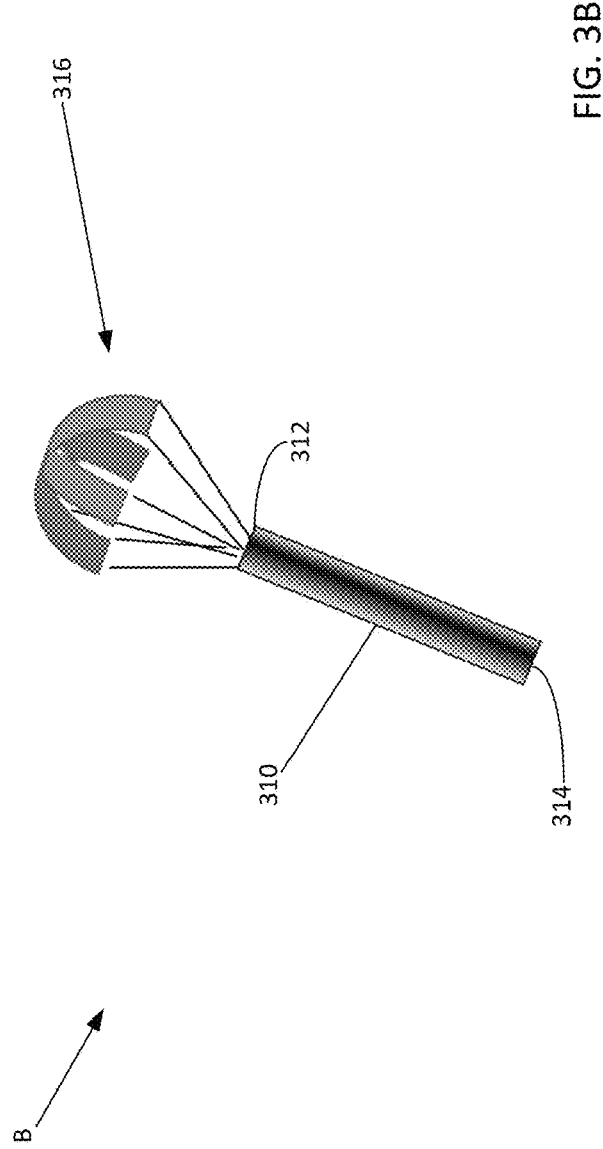
Figure 3C:
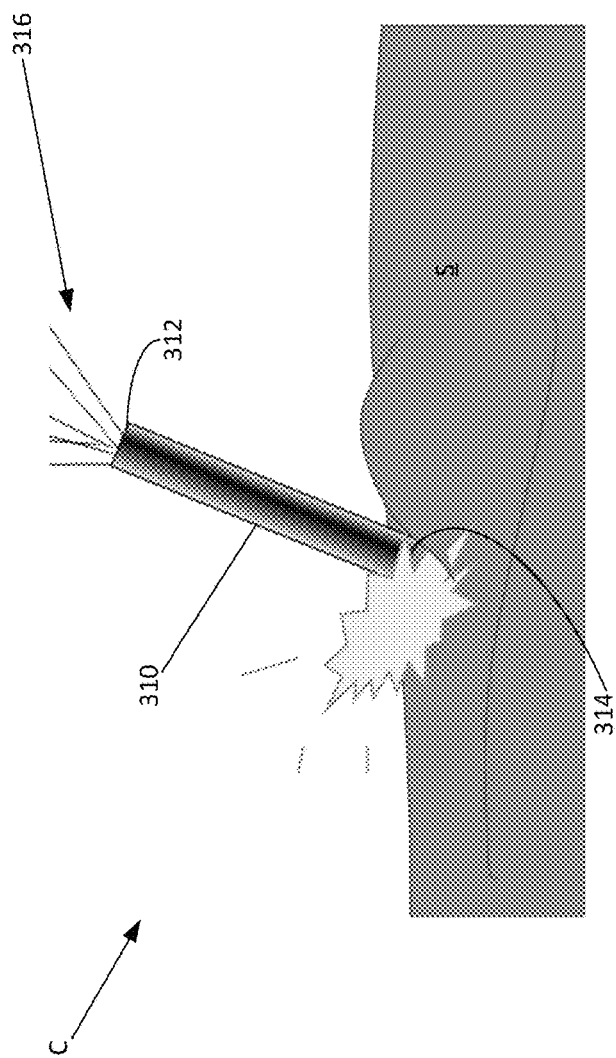

Turning to FIGS. 3A-3C, illustrated are schematic views of the deployment of a sonobuoy, in accordance with steps 205, 210, 215 of the method 200. The vehicle (e.g., an airplane) 300 illustrated in FIG. 3A may be equipped with an SLC 302 that is aligned with an opening 304 in the side or bottom of the vehicle 300. As illustrated in FIG. 3A, during stage A of deployment of a sonobuoy canister 310, the vehicle 300 may launch, drop, or deploy the sonobuoy canister 310 out of the opening 304 in the vehicle 300 via the SLC 302. The SLC 302 may be used to forcibly eject the canister 310 from the vehicle 300 via pneumatic or pyrotechnic techniques. The SLC 302 may be used by operators to safely encase the canister 310 during storage, shipment, and loading. The SLC 302 may also contain the ejection bore and piston (or obturator) for overcoming the hermetic end cap (not shown) and frangible retention clips (not shown), and for propelling the canister 310 out of the SLC 302 under the influence of expanding hot (pyrotechnic) or cold (pneumatic) gas. Accordingly, the SLC 302 may remain disposed within the vehicle 300 (i.e., may not be ejected from the vehicle 300), and may later be disposed of, or reloaded with, a new canister 310 for another mission. In other embodiments, the canister 310 may be deployed on its own (i.e., without being launched by an SLC 302) by throwing the canister 310 off of the vehicle 300, or by releasing it via a gravity drop mechanism. As further illustrated, the sonobuoy canister 310 is substantially cylindrical, and may have a first end 312 and an opposite second end 314.

Turning to FIG. 3B, illustrated is the sonobuoy canister 310 during stage B of the deployment of the sonobuoy canister 310, where, after the sonobuoy canister 310 has been launched from the vehicle 300, the sonobuoy canister 310 may deploy a parachute 316 from the first end 312 of the sonobuoy canister 310. The deployed parachute 316 may serve to retard the velocity of the descending sonobuoy canister 310 in order to provide a controlled descent from the vehicle 300. Moreover, the deployed parachute 316 may at least partially serve to orient the sonobuoy canister 310 while the sonobuoy canister 310 descends from the vehicle 300 such that the second end 314 of the sonobuoy canister 310 is oriented below the first end 312 of the sonobuoy canister 310. Turning to FIG. 3C, illustrated is the sonobuoy canister 310 during stage C of the deployment of the sonobuoy canister 310, where the second end 314 of the sonobuoy canister 310 impacts a surface S. As illustrated in the example of FIG. 3C, the second end 314 of the sonobuoy canister 310 may impact the surface S of a body of water.

Turning to FIGS. 4A and 4B, illustrated is the sonobuoy canister 310 during one embodiment of stages D (FIG. 4A) and E (FIG. 4B) of the deployment of the sonobuoy canister 310. As illustrated in FIG. 4A, in one embodiment, when the sonobuoy canister 310 is in stage D of the deployment of the sonobuoy canister 310, the sonobuoy canister 310 may have detached or removed the parachute 316 from the first end 312 of the sonobuoy canister 310. Furthermore, a surface engagement mechanism 320 may be deployed from the first end 312 of the sonobuoy canister 310. In accordance with the illustrated embodiment, the surface engagement mechanism 320 may be a floatation device 322 that includes an antenna or beacon 324 configured to receive signals (e.g., launch command signals, etc.) from a device that is remotely located from the sonobuoy canister 310. The floatation device 322 of the surface engagement mechanism 320 is configured to position the first end 312 of the sonobuoy canister 310 proximate to the surface S of the body of water, while the second end 314 of the sonobuoy canister 310 is submerged below the surface S of the body of water. The sonobuoy canister 310 in stage D is configured to float in the body of water in this orientation while awaiting to receive a launch command signal from a remote device via the antenna 324.

FIG. 4B illustrates the last stage, stage E, of the deployment of the sonobuoy canister 310, where the sonobuoy canister 310 launches an unmanned vehicle 330 from the first end 312 of the sonobuoy canister 310 once the sonobuoy canister 310, via the antenna 324, receives a launch command signal. As illustrated, and as previously explained, the floatation device 322 of the surface engagement mechanism 320 enables the sonobuoy canister 310 to float in a body of water such that the first end 312 of the sonobuoy canister 310 is positioned proximate to the surface S of the body of water, and such that the second end 314 of the sonobuoy canister 310 is submerged under the surface S of the body of water. Thus, the sonobuoy canister 310 may be oriented in the body of water in a substantially vertical orientation. Once the sonobuoy canister 310 receives a launch command signal from a remote device via the antenna 324, a launch mechanism disposed within the sonobuoy canister 310 is activated to launch the unmanned vehicle 330 from the first end 312 of the sonobuoy canister 310. Simultaneously to launching the unmanned vehicle 330, the antenna 324 is propelled from the first end 312 of the sonobuoy canister 310 so as to not obstruct the launch of the unmanned vehicle 330.

With reference to FIGS. 5A and 5B, illustrated is the sonobuoy canister 310 during another embodiment of stages D' (FIG. 5A) and E' (FIG. 5B) of the deployment of the sonobuoy canister 310. As illustrated in FIG. 5A, in this second embodiment, when the sonobuoy canister 310 is in stage D' of the deployment of the sonobuoy canister 310, the sonobuoy canister 310 may have detached or removed the parachute 316 from the first end 312 of the sonobuoy canister 310. Furthermore, a surface engagement mechanism 320 may be deployed from the first end 312 of the sonobuoy canister 310. In accordance with the illustrated embodiment, the surface engagement mechanism 320 may be a floatation device 322 that includes an antenna or beacon 324 configured to receive signals (e.g., launch command signals, etc.) from a device that is remotely located from the sonobuoy canister 310. In addition, the surface engagement mechanism 320 may include a tether 326 that couples the surface engagement mechanism 320 to the first end 312 of the sonobuoy canister 310 such that the sonobuoy canister 310 descends from the surface engagement mechanism 320 via the tether 326. The tether 326 may be configured not only to couple the surface engagement mechanism 320 to the sonobuoy canister 310, but may also be configured to deliver signals received by the antenna 324 to the sonobuoy canister 310. As illustrated, the sonobuoy canister 310 may be fully submerged in the body of water while awaiting to receive a launch command signal from a remote device via the antenna 324 and tether 326.

FIG. 5B illustrates the last stage, stage E', of the deployment of the sonobuoy canister 310 according to a second embodiment, where the sonobuoy canister 310 launches an unmanned vehicle 330 from the second end 314 of the sonobuoy canister 310 once the sonobuoy canister 310, via the antenna 324 and tether 326, receives a launch command signal. As illustrated, and as previously explained, the floatation device 322 and tether 326 of the surface engagement mechanism 320 enables the sonobuoy canister 310 to float in a body of water such that the sonobuoy canister 310 is fully submerged under the surface S of the body of water. Once the sonobuoy canister 310 receives a launch command signal from a remote device via the antenna 324 and tether 326, the sonobuoy canister 310 may deploy a launch deployment mechanism 340 from the second end 314 of the sonobuoy canister 310. As illustrated in FIG. 5B, the launch deployment mechanism 340 may include a floatation device 342 coupled to the second end 314 of the sonobuoy canister 310. Deployment of the floatation device 342 causes the sonobuoy canister 310 to float up to the surface S of the body of water such that the second end 314 of the sonobuoy canister 310 is located at the surface S of the body of water, and such that the sonobuoy canister 310 is oriented in a substantially vertical orientation with the first end 312 of the sonobuoy canister 310 still submerged below the surface S of the body of water. With the second end 314 of the sonobuoy canister 310 being located at the surface S of the body of water because of the floatation device 342 of the launch deployment mechanism 340, the launch mechanism disposed within the sonobuoy canister 310 may then be activated to launch the unmanned vehicle 330 from the second end 314 of the sonobuoy canister 310.

With reference to FIGS. 6A and 6B, illustrated is the sonobuoy canister 310 during yet other embodiments of stages D" (FIG. 6A) and E" (FIG. 6B) of the deployment of the sonobuoy canister 310. As illustrated in FIG. 6A, in this third embodiment, when the sonobuoy canister 310 is in stage D" of the deployment of the sonobuoy canister 310, the sonobuoy canister 310 may have detached or removed the parachute 316 from the first end 312 of the sonobuoy canister 310. Furthermore, a surface engagement mechanism 320 may be deployed from the first end 312 of the sonobuoy canister 310, while a securement mechanism 350 may be deployed from the second end 314 of the sonobuoy canister 310. In accordance with the illustrated embodiment, the surface engagement mechanism 320 may be a floatation device 322. The securement mechanism 350 may include an anchor 352 and a tether 354 that are deployed from the second end 314 of the sonobuoy canister 310, where the tether 354 couples the anchor 352 to the second end 314 of the sonobuoy canister 310, and where the anchor 352 is configured to engage a floor F of the body of water to submerge the sonobuoy canister 310 below a surface S of the body of water. As further illustrated, while the anchor 352 engages the floor F of the body of water, the floatation device 322 causes the sonobuoy canister 310 to float upwardly away from the anchor 352 the distance of the tether 354 (i.e., until the tether 354 is taught). The tether 354 may be of a length that prevents the sonobuoy canister 310 from floating up to the surface S of the body of water. The sonobuoy canister 310 may be fully submerged below the surface S of the body of water while the sonobuoy canister 310 awaits to receive a launch signal from a remote device.

FIG. 6B illustrates the last stage, stage E", of the deployment of the sonobuoy canister 310 according to a third embodiment, where the sonobuoy canister 310 launches an unmanned vehicle 330 from the first end 312 of the sonobuoy canister 310 once the sonobuoy canister 310 receives a launch command signal. As illustrated, and as previously explained, the anchor 352 and tether 354 of the securement mechanism 350 secures or anchors the sonobuoy canister 310 to the floor F of the body of water, while the floatation device 322 of the surface engagement mechanism 320 causes the sonobuoy canister 310 to float above the floor F of the body of water, but below the surface S of the body of water. Once the sonobuoy canister 310 receives a launch command signal from a remote device, the sonobuoy canister 310 may cut the tether 354, or disengage the anchor 352 from the second end 314 of the sonobuoy canister 310, so that the floatation device 322 can cause the first end 312 of the sonobuoy canister 310 to float up to the surface S of the body of water. As illustrated in FIG. 6B, once the first end 312 of the sonobuoy canister 310 has floated up to the surface S of the body of water, the launch mechanism disposed within the sonobuoy canister 310 may then be activated to launch the unmanned vehicle 330 from the first end 312 of the sonobuoy canister 310.

Figure 7A:
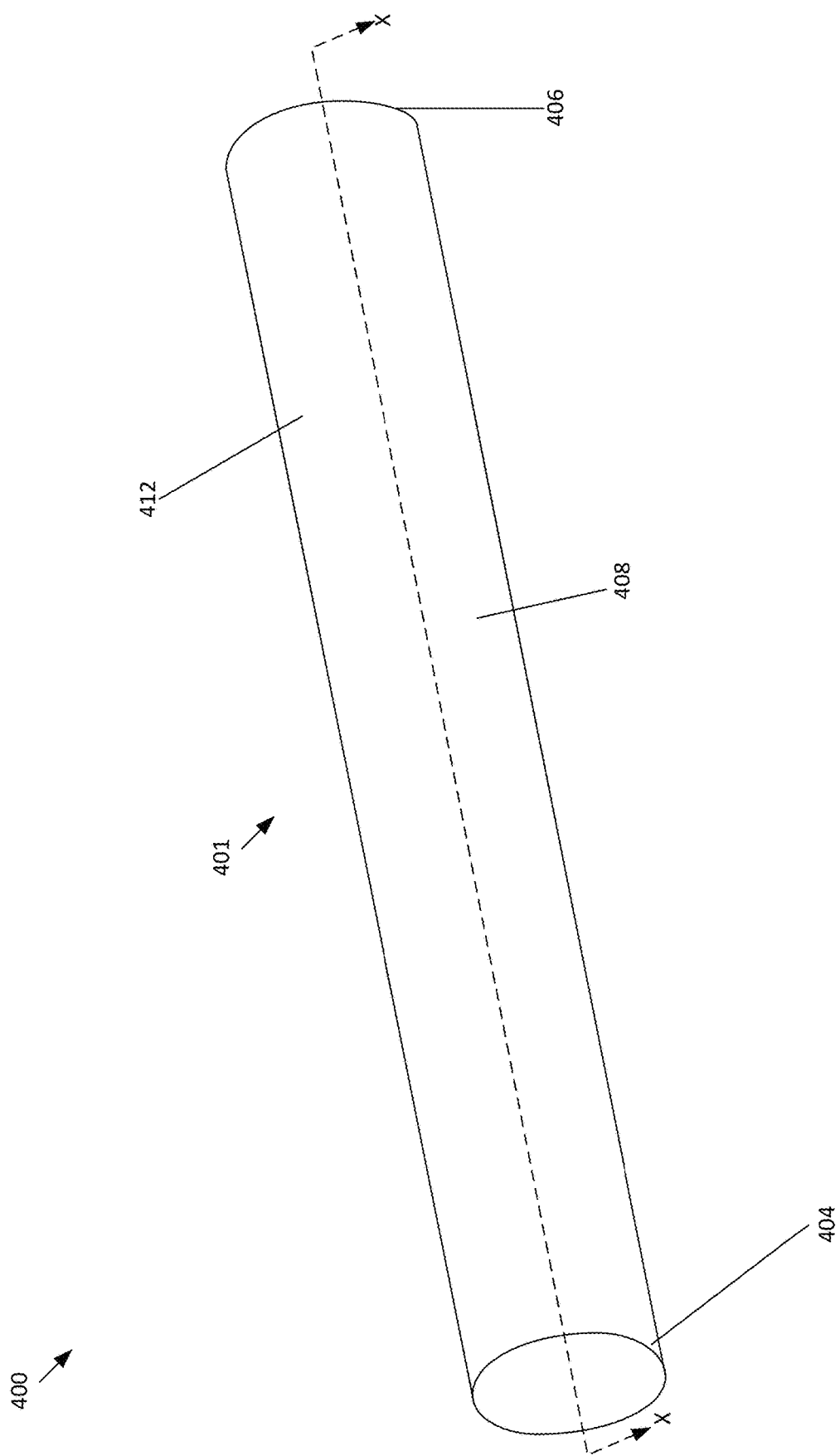
FIG. 7A illustrates a perspective view of a first embodiment of a sonobuoy configured to house and launch at least one unmanned vehicle in accordance with the present disclosure.
Figure 7B:
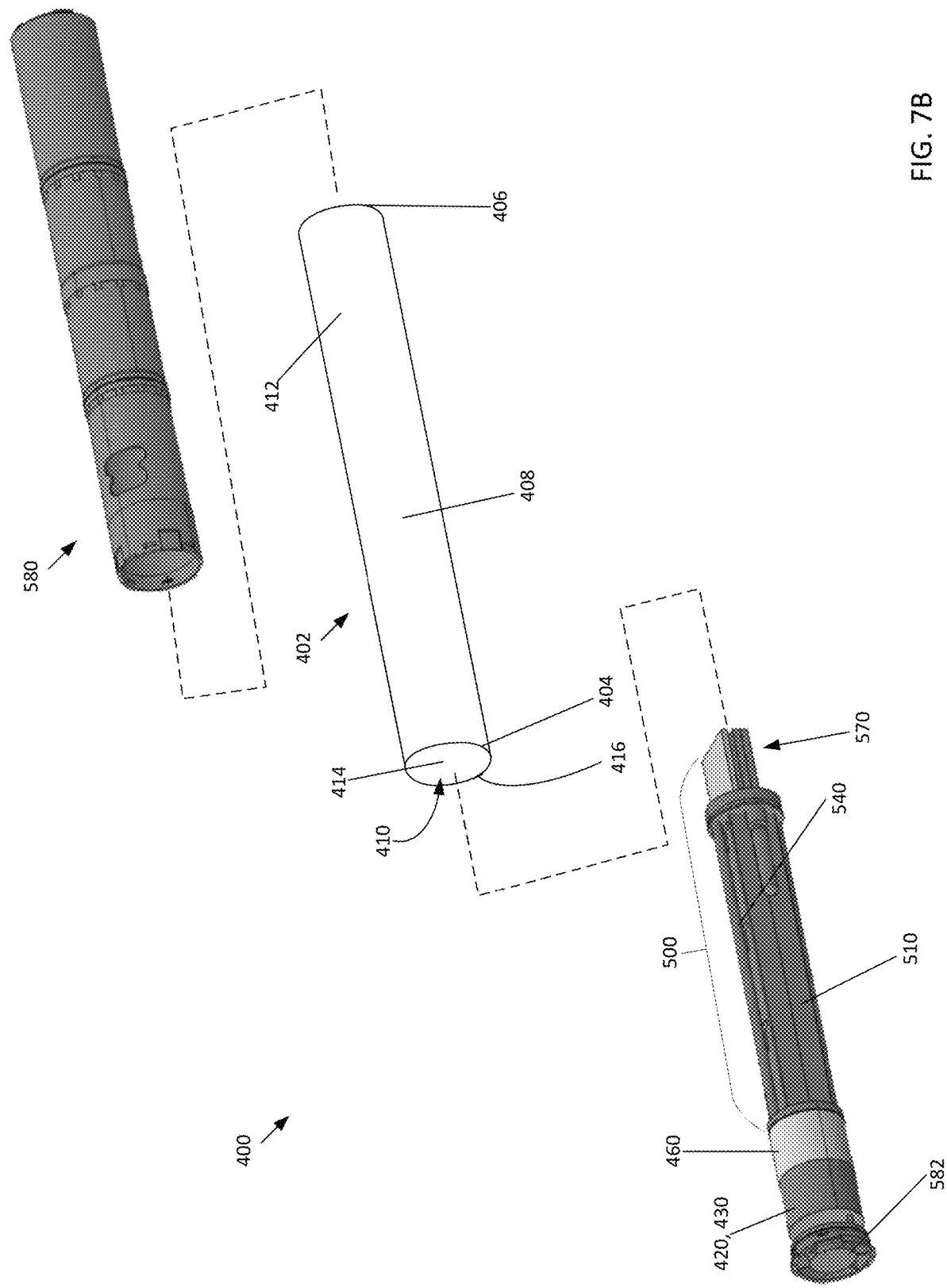
FIGS. 7B and 7C illustrate exploded views of the first embodiment of the sonobuoy illustrated in FIG. 7A.
Figure 7C:
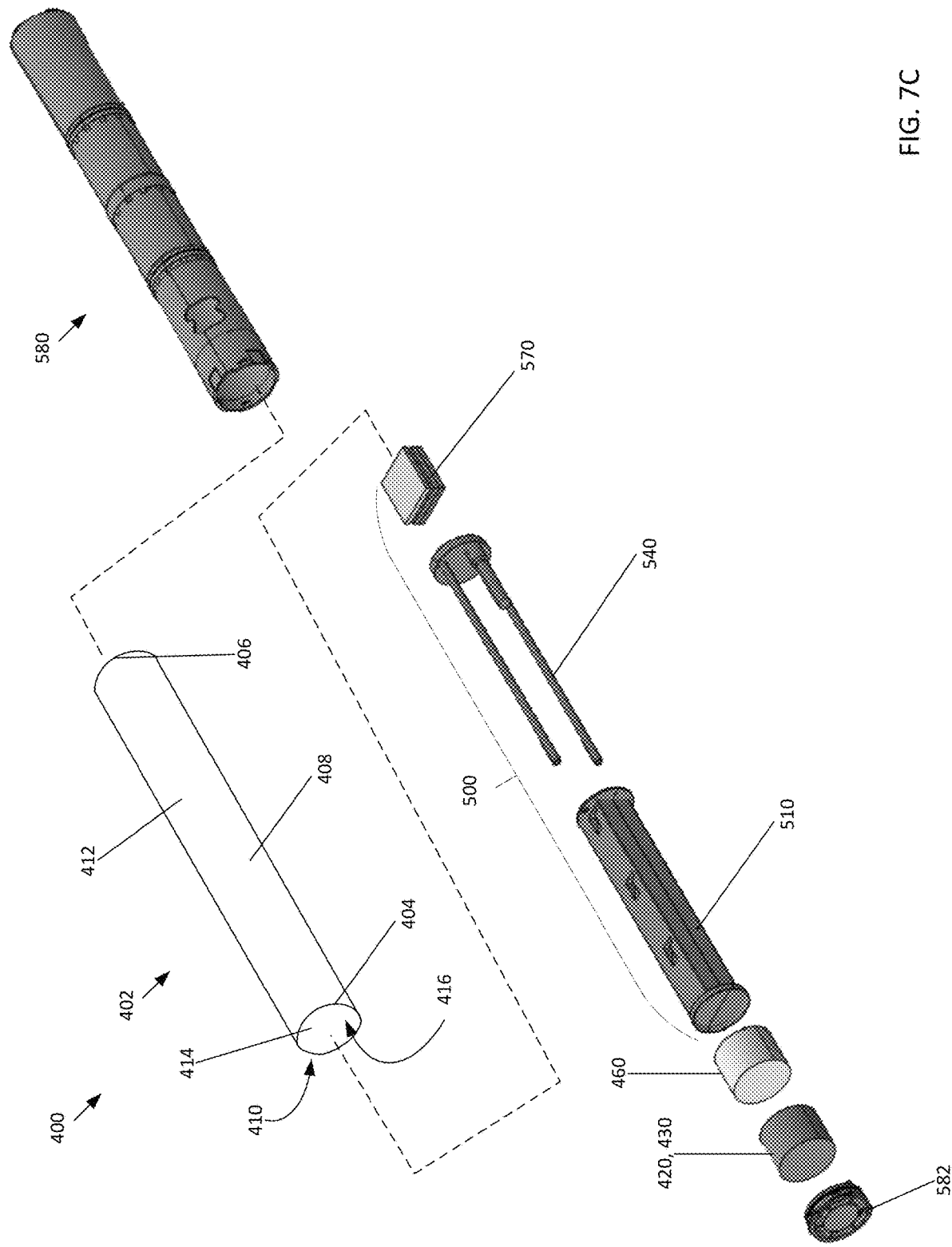

Turning to FIGS. 7A-7D, illustrated is an embodiment of a sonobuoy 400 adapted to be deployed from a vehicle and then configured to launch at least one unmanned vehicle from the sonobuoy 400. As best illustrated in FIGS. 7A-7C, the sonobuoy 400 may be substantially cylindrical, and may include a canister 402 that has a first end 404, an opposite second end 406, and a sidewall 408 spanning between the first and second ends 404, 406. The first end 404 of the canister 402 may include a substantially circular opening 410. The canister 402 may have an exterior surface 412 and an interior surface 414. Moreover, the first end 404, the second end 406, and the sidewall 408 may collectively define a cavity 416 that is accessible via the opening 410.

Figure 7D:
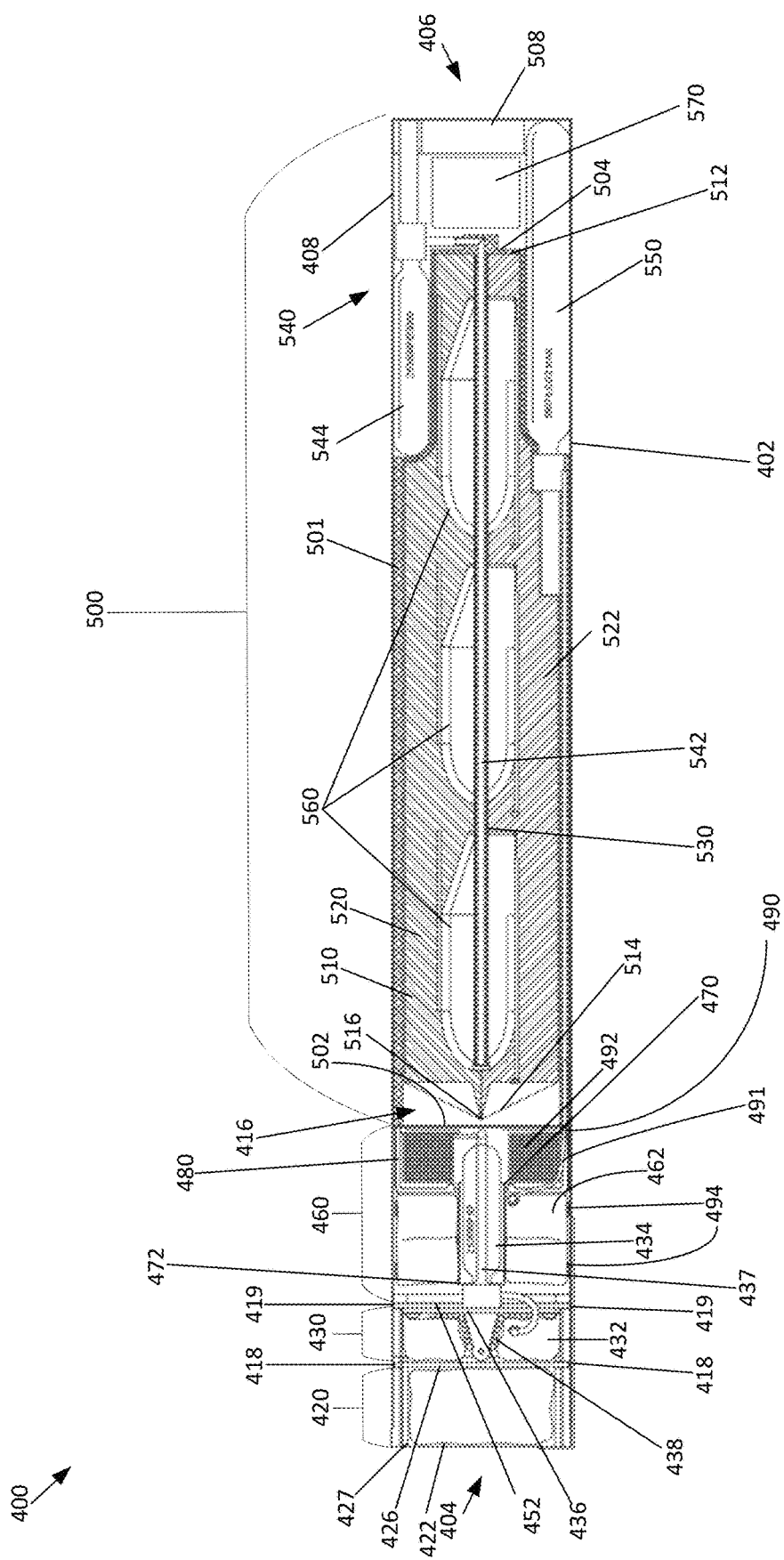
FIG. 7D illustrates a cross-sectional view of the first embodiment of the sonobuoy illustrated in FIG. 7A.

As best illustrated in FIGS. 7B-7D, various units are adapted to be disposed within the cavity 416 of the canister 402 of the sonobuoy 400. As illustrated, disposed within the cavity 416 proximate to the first end 404 of the canister 402 is a parachute unit 420, while disposed within the cavity 416 proximate to the second end 406 of the canister 402 is an unmanned vehicle unit or payload unit 500. Disposed within the cavity 416 of the canister 402 between the parachute unit 420 and the payload unit 500 is a surface float unit 430 and a launch float unit 460, where the surface float unit 430 is disposed more proximate to the parachute unit 420 than the launch float unit 460.

As best illustrated in FIG. 7D, which is a cross-sectional view of the sonobuoy 400 taken along line X-X in FIG. 7A, the parachute unit 420 is disposed proximate to the first end 404 of the canister 402. The parachute unit 420 may include a parachute 422 packed into a parachute cup 427. As shown in FIGS. 8B-8E, and explained in further detail below, the parachute 422 may be coupled to the parachute cup 427 via one or more parachute cords 424. With continued reference to FIG. 7D, the parachute unit 420 may be disposed proximate to the surface float unit 430, where a crossbar or divider wall 426 separates the parachute unit 420 from the surface float unit 430. The crossbar 426, as illustrated, may sit at least partially inserted into shear pockets 418 that are disposed within the interior surface of the sidewall 408 of the canister 402.

The surface float unit 430 may include a first float 432 that is packed around, and coupled to, a platform 436 when disposed within the cavity 416 of the canister 402. The platform 436 may include one or more elongated arms 437, which may extend in a substantially perpendicular direction to the platform 436 and along a first compressed gas container 434. As illustrated in FIG. 7D, the elongated arms 437 and the first compressed gas container 434 extend beyond or through a crossbar or divider wall 452, which separates the surface float unit 430 from the launch float unit 460. The crossbar 452, as illustrated, may sit at least partially inserted into shear pockets 419 that are disposed within the interior surface of the sidewall 408 of the canister 402, where shear pockets 419 are spaced from shear pockets 418. The surface float unit 430 may further include an antenna 438 that is coupled to the platform 436, and, when the surface float unit 430 is disposed within the cavity 416 of the canister 402, is wound up or folded proximate to the first float 432 and the platform 436.

With continued reference to FIG. 7D, the launch float unit 460 may include a second float 462 that is packed around, and coupled to, a spool section container 470 when disposed within the cavity 416 of the canister 402. As best shown in FIGS. 8G, 8J, 8K, and 8L, and explained in further detail below, the spool section container 470 includes a central guide tube 472 and a lower cavity 480. Returning to FIG. 7D, the second float 462 may be packed around the central guide tube 472 of the spool section container 470. A pair of retention bands 494 may be disposed around the second float 462 and configured to retain the second float 462 around the central guide tube 472 of the spool section container 470. As further illustrated, when the surface float unit 430 and the launch float unit 460 are disposed within the cavity 416 of the canister 402, the elongated arms 437 and the first compressed gas container 434 of the surface float unit 430 may extend into the spool section container 470. A tether or cord 492 may be disposed within the lower cavity 480 of the spool section container 470, where the tether 492 may be coupled to the elongated arms 437 of the platform 436 of the surface float unit 430, while also being coupled to the canister 402 proximate to the payload unit 500 via the pass-through 490. The launch float unit 460 may further include a launch float fill tube 491 that is coupled to both the second float 462 and the second compressed gas container 550, which is disposed within the payload unit 500. As explained in further detail below, the launch float fill tube 491 may be configured to deliver gas from the second compressed gas container 550, through the pass-through 490, and to the second float 462 in order to inflate the second float 462.

Continuing with FIG. 7D, the payload unit 500 may include a pressure vessel 501 that may include a first end 502 and an opposite second end 504. The first end 502 of the pressure vessel 501 may be disposed proximate to the launch float unit 460, while the second end 504 of the pressure vessel 501 may be disposed more proximate to the second end 406 of the canister 402. As best illustrated in FIGS. 8K-8M, the pressure vessel 501 may further include a hermetic seal 506 at the first end 502 of the pressure vessel 501, where the hermetic seal 506 may prevent water from entering the pressure vessel 501 and the payload unit 500. Returning to FIG. 7D, the payload unit 500 may further include a ballast 508 disposed proximate to the second end 504 of the pressure vessel 501, and proximate to the second end 406 of the canister 402. As explained in further detail below, the ballast 508 may be configured to weigh down the second end 406 of the canister 402 (i.e., both for descending from the vehicle and through the atmosphere, and for descending through a body of water), and orient the second end 406 of the canister 402 lower than the first end 404 of the canister 402.

The pressure vessel 501 of the payload unit 500 of the sonobuoy 400 may further include a sabot 510 disposed within the pressure vessel 501. The sabot 510 that may include a proximal end 512, which is disposed proximate to the second end 504 of the pressure vessel 501, and an opposite distal end 514, which is disposed proximate to the first end 502 of the pressure vessel 501 and the launch float unit 460. The distal end 514 of the sabot 510 may include a piercing stylus 516, which, as explained in further detail below, may be configured to pierce or break the hermetic seal 506 disposed at the first end 502 of the pressure vessel 501 when the sonobuoy 400 launches the sabot 510 from the canister 402. The sabot 510 may include two half structures 520, 522, that together house multiple unmanned aerial vehicles 560 (e.g., three (3)) within the sabot 510. The sabot 510 may further include one or more pressure channels 530. As further illustrated, a launch device 540 may also be disposed within the payload unit 500. The launch device 540 may include one or more pressure pistons 542 coupled to a third compressed gas container 544. As illustrated, when the sabot 510 is disposed within the cavity 416 of the canister 402 and within the pressure vessel 501, the one or more pressure pistons 542 may be received by the one or more pressure channels 530 of the sabot 510. As further explained below, the third compressed gas container 544 may release compressed gas into the one or more pressure channels 530 of the sabot 510 via the one or more pressure pistons 542 in order to launch the sabot 510 and unmanned aerial vehicles 560 from the canister 402.

Also included in the payload unit 500 may be an electronic components box 570. As illustrated, the electronic components box 570 may be disposed proximate to the second end 504 of the pressure vessel 501, and disposed proximate to the second end 406 of the canister 402. Thus, the electronic components box 570 may be disposed proximate to the ballast 508 and proximate to the proximal end 512 of the sabot 510, while being disposed outside of the pressure vessel 501. The electronic components box 570 may house electronic components that include, but are not limited to, a processor, sensors, an electronics control unit (hereinafter "ECU"), one or more batteries, a communications device, etc.

Returning to FIGS. 7B and 7C, the various units 420, 430, 460, 500 may be disposed within the cavity 416 of the canister 402, while the canister 402 is held within the SLC 580 by an endcap 582. The endcap 582 may be configured to retain the canister 402 and the units 420, 430, 460, 500 within the SLC 580 until deployment of the sonobuoy 400 from the SLC 580. As previously explained, the SLC 580 may be used to forcibly eject the canister 402 via pneumatic or pyrotechnic techniques. The SLC 580 may be used by operators to safely encase the canister 402, and accompanying units 420, 430, 460, 500, during storage, shipment, and loading. The SLC 580 may also contain the ejection bore and piston (or obturator) for overcoming the hermetic end cap 582 and frangible retention clips (not shown), and for propelling the canister 402 out of the SLC 580 under the influence of expanding hot (pyrotechnic) or cold (pneumatic) gas. Accordingly, the SLC 580 may remain disposed within the vehicle from which the canister 402 is launched (i.e., may not be ejected), and may later be disposed of, or reloaded with, a new canister 402 for another mission. As explained previously, according to other embodiments, the canister 402 and accompanying units 420, 430, 460, 500 may be deployed on its own (i.e., without being launched by the SLC 580) by throwing the canister 402 off of the vehicle/platform, or by releasing it via a gravity drop mechanism.

Figure 8A:
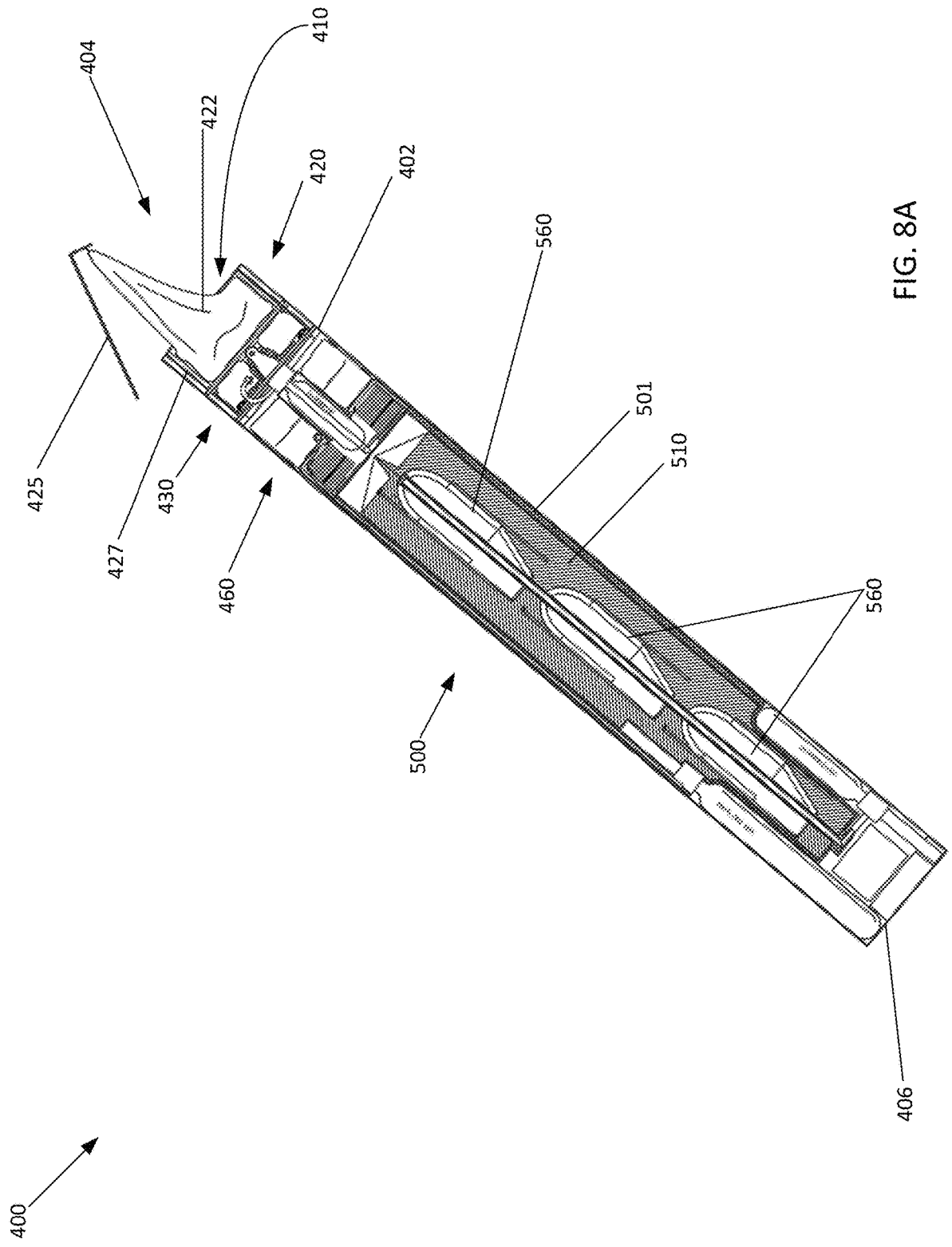
FIGS. 8A-8O illustrate cross-sectional views of the operational stages of the first embodiment of the embodiment of the sonobuoy illustrated in FIGS. 7A-7D for deploying the sonobuoy and launching the unmanned vehicles from the deployed sonobuoy.

Turning to FIGS. 8A-8O, illustrated are the various steps of the deployment of the sonobuoy 400 after being launched from a vehicle. As illustrated in FIG. 8A, shortly after the sonobuoy 400 has been launched from a vehicle, as the sonobuoy is descending through the atmosphere, a wind flap 425 disposed as part of the parachute unit 420, and coupled to the packed parachute 422, is configured to catch a portion of the air passing over the first end 404 of the canister 402 of the sonobuoy 400. This causes the wind flap 425 to separate from the first end 404 of the canister 402, which, because the wind flap 425 is coupled to the packed parachute 422, draws the parachute 422 out of the opening 410 of the first end 404 of the canister 402 to deploy the parachute 422. Moreover, as the parachute 422 is drawn out of the opening 410 of the first end 404 of the canister 402, the parachute 422 is also drawn out of the parachute cup 427 disposed within the cavity 416 of the canister 402.

Turning to FIG. 8B, illustrated is the sonobuoy 400 impacting the surface S of a body of water, with the parachute 422 deployed out of the first end 404 of the canister 402. As illustrated in FIG. 8B, after the parachute 422 is deployed, the parachute 422 is coupled to the parachute cup 427 via one or more parachute cords 424, where the parachute cup 427 is retained within the cavity 416 of the canister 402. Thus, the parachute cords 424 couple the deployed parachute 422 to the canister 402 of the sonobuoy 400 via the parachute cup 427. As further illustrated in FIG. 8B, because the ballast 508 is disposed proximate to the second end 406 of the canister 402, when the parachute 422 is deployed, the weight of the ballast 508 causes the second end 406 of the canister 402 to remain below the first end 404 of the canister 402. Thus, as the sonobuoy 400 impacts the surface S of a body of water, the second end 406 of the canister 402 impacts the surface S of the body of water prior to other portions of the canister 402.

Figure 8C:
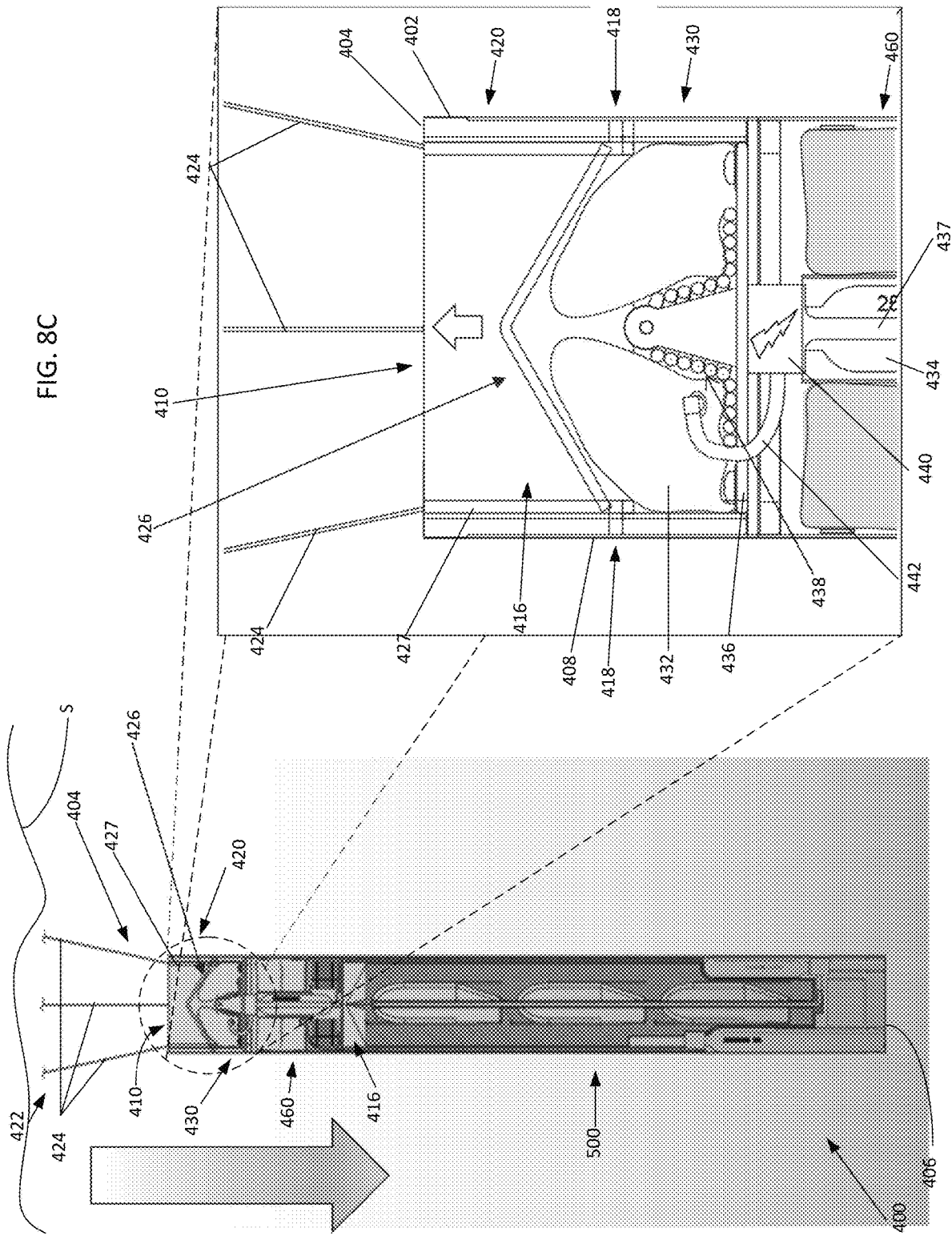
Figure 8D:
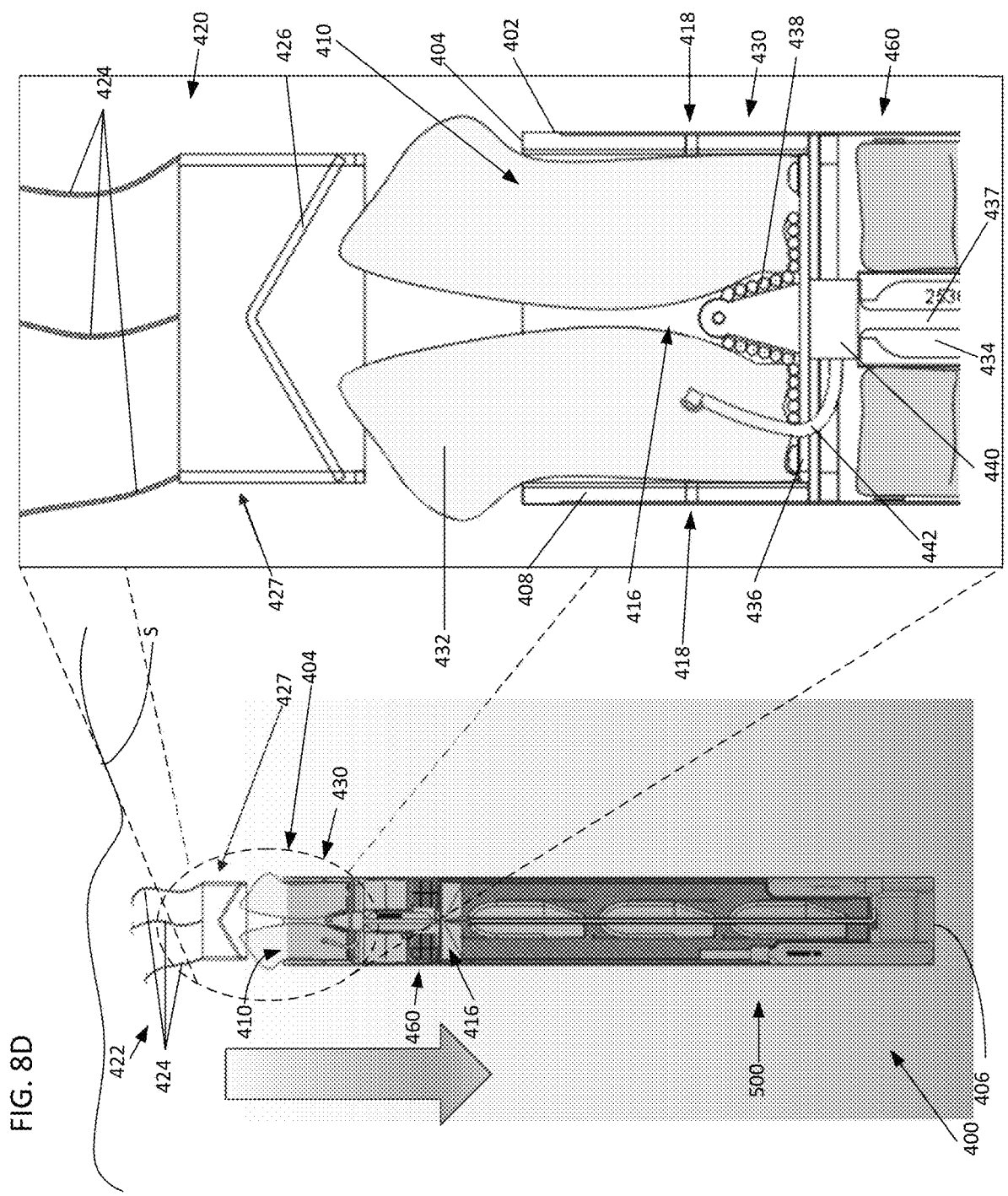

Turning to FIG. 8C, after the sonobuoy has impacted the surface S of the body of water, the sonobuoy 400 becomes submerged in the body of water, and continues to descend downward through the body of water away from the surface S. As the sonobuoy 400 descends through the body of water, a cartridge initiator 440, which is coupled to both the platform 436 of the surface float unit 430 and the first compressed gas container 434 of the surface float unit 430, initiates a release of the compressed gas from the first compressed gas container 434. The cartridge initiator 440 may be configured to be actuated based on a time delay (i.e., set to actuate after a predetermined time has passed from either the time the sonobuoy 400 was launched from a vehicle or from when the sonobuoy 400 impacted the surface S of the body of water), or may be configured to be actuated via a pressure switch (i.e., once the cartridge initiator 440 detects a certain water pressure as the sonobuoy 400 descends, the cartridge initiator 440 is actuated). Once the cartridge initiator 440 is actuated, the compressed gas of the first compressed gas container 434 is released to inflate the first float 432 via the fill tube 442. As illustrated in FIG. 8C, as the first float 432 is inflated, the crossbar 426 of the parachute unit 420 buckles, and becomes disengaged from both the parachute cup 427 and the first shear pockets 418 of the sidewalls 408 of the canister 402. Thus, as further illustrated in FIG. 8D, inflation of the first float 432 causes the crossbar 426 to buckle, which uncouples the parachute cup 427, and ultimately the parachute 422, from the canister 402. As the first float 432 continues to inflate, the first float 432 expands out of the opening 410 at the first end 404 of the canister 402.

Figure 8E:
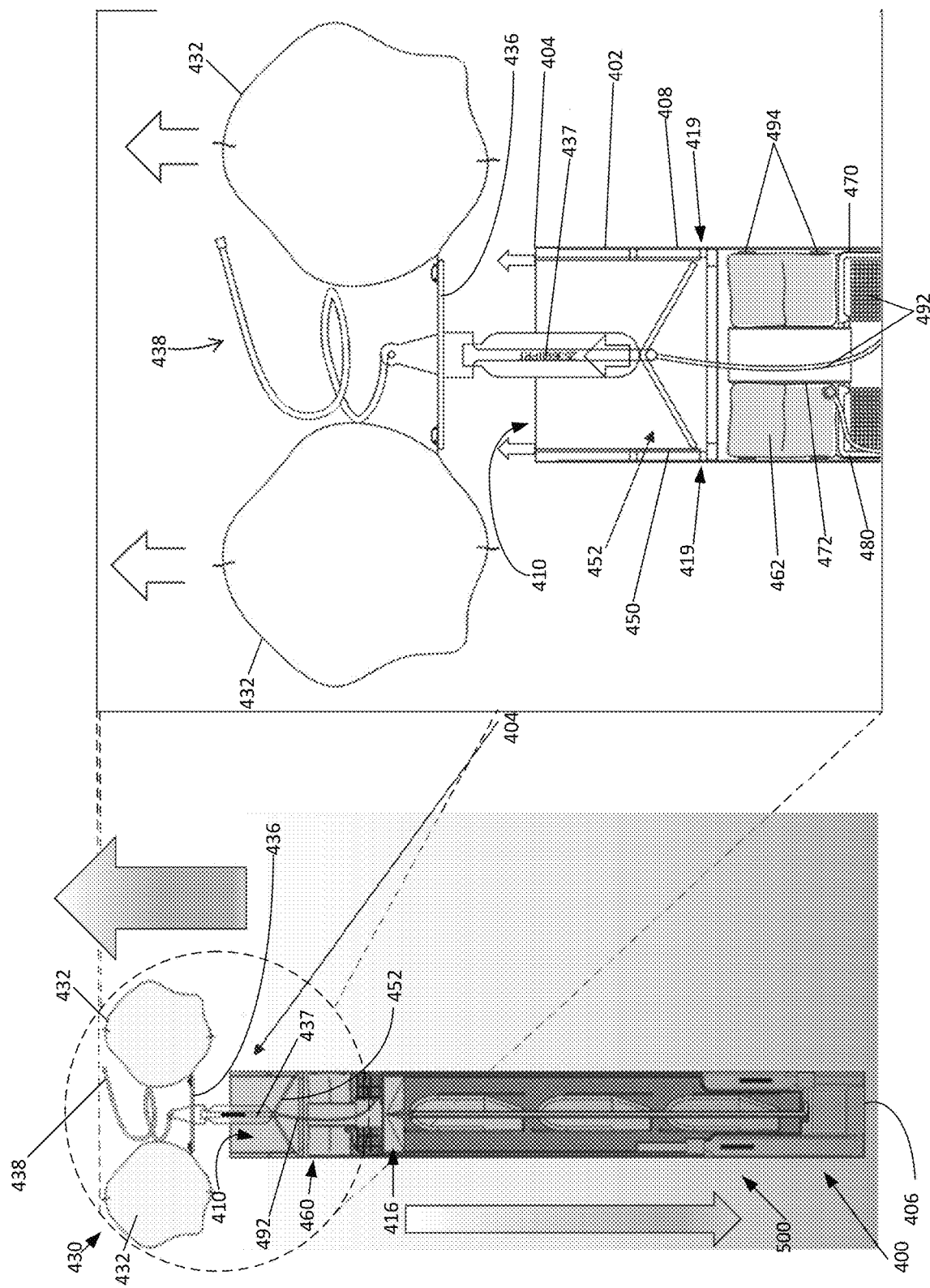

Turning to FIG. 8E, the first float 432 continues to inflate until the surface float unit 430 exits the opening 410 of the first end 404 of the canister 402 such that the surface float unit 430 is no longer disposed within the cavity 416 of the canister 402. Once the surface float unit 430 has exited the cavity 416 of the canister 402, the canister 402 continues to descend through the body of water, while, because of the inflated first float 432, the surface float unit 430 ascends through the body of water toward the surface S of the body of water (i.e., the surface float unit 430 and the canister 402 travel in opposing directions from each other). More specifically, as the surface float unit 430 exits the cavity 416 of the canister 402, the elongated arms 437 of the platform 436 of the surface float unit 430 slides out of the guide tube 472 of the spool section container 470 of the launch float unit 460. As illustrated, the elongated arms 437 may catch or engage the crossbar 452, where the crossbar 452 of the surface float unit 430 buckles and becomes disengaged from both the surface float retaining cup 450 and the second shear pockets 419 of the sidewalls 408 of the canister 402. In addition, the elongated arms 437 of the platform 436 of the surface float unit 430 may be coupled to the tether 492 of the launch float unit 460. Thus, as the surface float unit 430 ascends through the body of water and the canister 402 descends through the body of water, the tether 492 is unwound from within the spool section container 470 by passing through the guide tube 472. Once the surface float unit 430 is no longer disposed within the cavity 416 of the canister 402, the antenna 438 unwinds and expands from its wound up position.

Figure 8F:
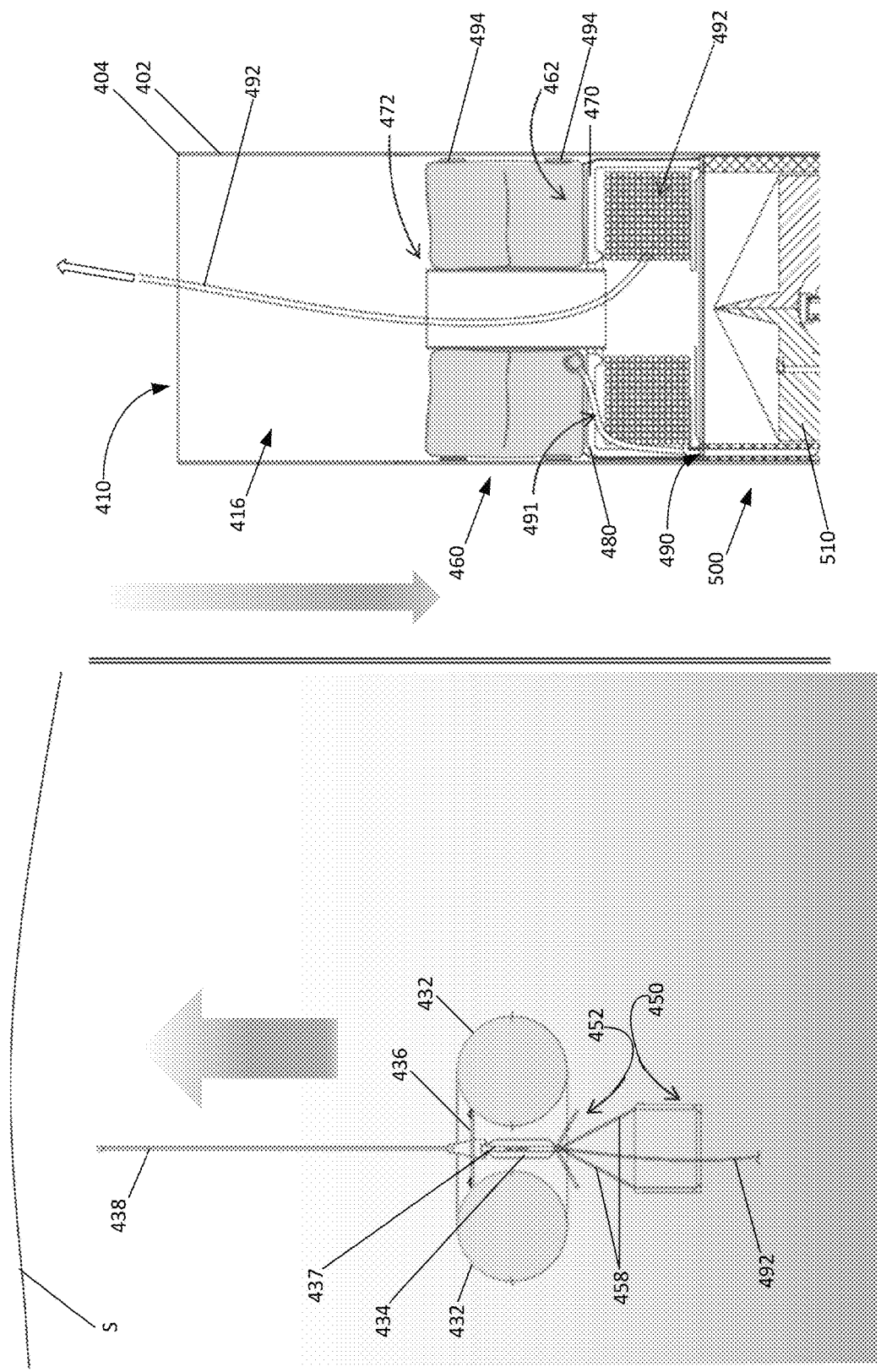

Turning to FIG. 8F, with the crossbar 452 disengaged from the surface float retaining cup 450 and the second shear pockets 419 of the sidewalls 408 of the canister 402, as the surface float unit 430 continues to ascend away from the canister 402, the tethering 458 of the surface unit retaining cup 450 to the elongated arms 437 of the platform 436 of the surface float unit 430 causes the surface unit retaining cup 450 to be pulled out from the opening 410 of the first end 404 of the canister 402. The hanging of the surface float retaining cup 450 from the elongated arms 437 of the platform 436 lowers the center of gravity of the surface float unit 430, which may increase the stability of the surface float unit 430 at the surface S of the body of water. FIG. 8F further illustrates that as the surface float unit 430 continues to ascend through the body of water to the surface S, the canister 402 continues to descend, where the movement of the canister 402 and the surface float unit 430 in opposing directions causes the tether 492 of the launch float unit 460 to unwind out of the spool section container 470 through the guide tube 472. Moreover, FIG. 8F also illustrates that, once the surface float unit 430 has exited from the opening 410 on the first end 404 of the canister 402, the launch float unit 460 initially remains spaced from the first end 404 of the canister 402 while the tether 492 continues to unwind from the spool section container 470.

Turning to FIGS. 8G and 8H, illustrated is the canister 402 once the tether 492 has been fully unwound from the spool section container 470. The canister 402 may have a length of X1, which is reflected in FIGS. 8G and 8H. In one embodiment, the length X1 of the canister 402 may be approximately 36 inches. While tether 492 is unwinding from the spool section container 470, and once the tether 492 has initially been fully unwound from the spool section container 470, as illustrated in FIG. 8G, the launch float unit 460 is disposed within the cavity 416 of the canister 402 a distance X2 from the first end 404 and the opening 410 of the canister 402. In one embodiment, the distance X2 that the launch float unit 460 is initially disposed from the first end 404 of the canister 402 is approximately 4 inches. With the tether 492 completely unwound from the spool section container 470, with the canister 402 being weighed down by the ballast 508, and with the surface float unit 430 (not shown in FIGS. 8G and 8H) floating at the surface S of the body of water, the launch float unit 460 and portions of the payload unit 500 (e.g., the pressure vessel 501, the sabot 510, and the launch device 540) slide upward through the cavity 416 of the canister 402 an approximate distance X3 such that the launch float unit 460 slides out of the cavity 416 of the canister 402 and extends from the first end 404 of the canister 402 by a distance X4. In some embodiments, the distance X3 may be approximately 8 inches, while the distance X4 may be approximately 4 inches. The sliding of the launch float unit 460 and portions of the payload unit 500 (e.g., the pressure vessel 501, the sabot 510, and the launch device 540) through the cavity 416 of the canister 402 is caused by the tension in the tether 492 with the surface float unit 430 floating on the surface S of the body of water and the canister 402 descending downwardly through the body of water away from the surface float unit 430.

As further illustrated in FIG. 8H, once the launch float unit 460 and the payload unit 500 have shifted or slid through the cavity 416 of the canister 402, the first end 502 of the pressure vessel 501 may be disposed proximate to the first end 404 of the canister 402, where a hermetic seal 506 at the first end 502 of the pressure vessel 501 is also disposed proximate to the first end 404 of the canister 402. The hermetic seal 506 may be configured to prevent water from entering the pressure vessel 501 and the payload unit 500, which would inhibit the launch of the unmanned vehicles 560 from the canister 402 once the canister 402 is repositioned to the surface S of the body of water. FIG. 8H also illustrates that, when the portions of the payload unit 500 have slid upwardly through the cavity 416 of the canister 402, a control cable 572 descends from the second end 504 of the pressure vessel 501, through the cavity 416 of the canister 402, and to the electronic components box 570. The control cable 572 may be configured to deliver signals received by the antenna 438 and transmitted through the tether 492 to the electronic components box 570, and vice versa. When the canister 402 is in the position or orientation illustrated in FIG. 8H, the canister 402 is in a static equilibrium state, where the canister 402 awaits to receive a launch command signal from a device that is remote from the canister 402, where the launch signal is received via the antenna 438 of the surface float unit 430.

Turning to FIG. 8I, illustrated is the canister 402 after receiving a launch command signal. When a launch command signal from a device that is remote from the canister 402 is received by the antenna 438 of the surface float unit 430, and then communicated to the electronic components box 570 of the canister 402 via the tether 492 and the control cable 572, the electronic components box 570 may begin to initiate the launch mode of the canister 402. Once the launch mode has been initiated, the electronic components box 570 may instruct the second compressed gas container 550 to release the compressed gas housed within the container 550 to inflate the launch float 462 of the launch float unit 460. As previously explained, the second compressed gas container 550 is connected to the launch float 462 by the launch float fill tube 491, which may extend along the sidewall 408 through the interior cavity 416 of the canister 402, through the pass-through 490 located at the first end 502 of the pressure vessel 501, so that the launch float fill tube 491 can deliver gas from the second compressed gas container 550 to the second float 462 to inflate the second float 462. As illustrated in FIG. 8I, as the launch float 462 is inflated with compressed gas from the second compressed gas container 550, the launch float 462 expands, causing the retention bands 494 to break or snap. This allows the launch float 462 to no longer be secured around the guide tube 472 of the spool section container 470.

Figure 8J:
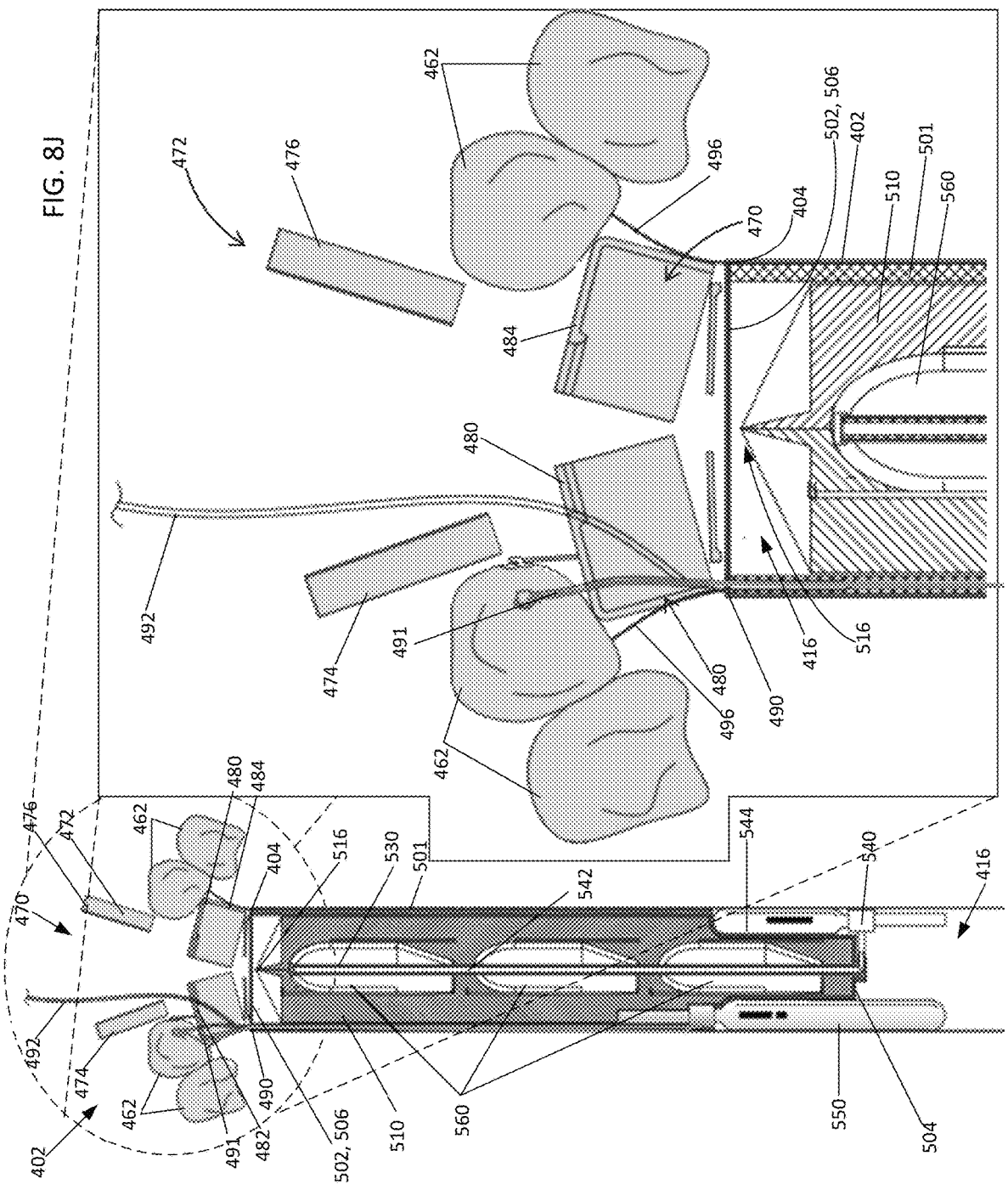
Figure 8K:
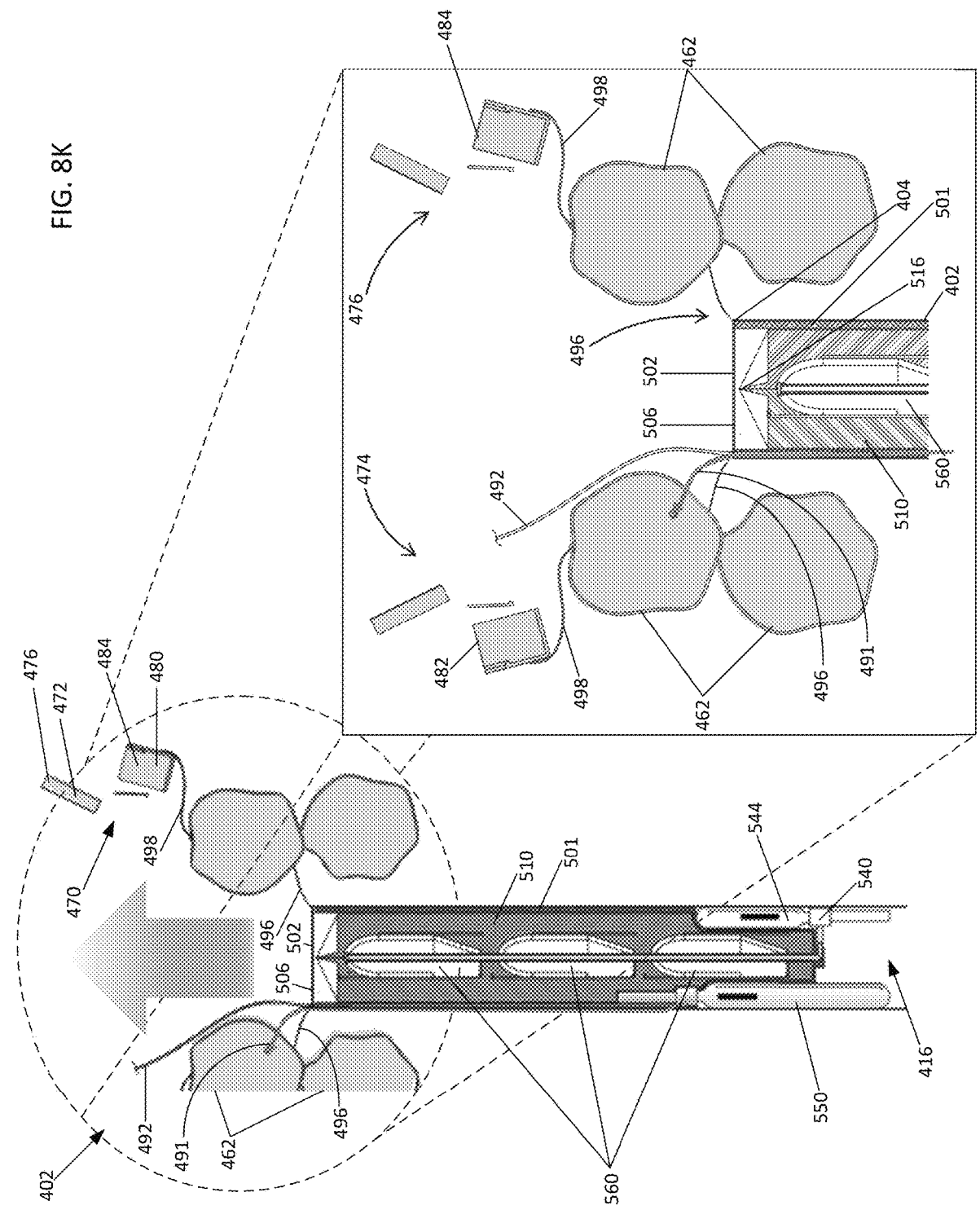
Figure 8M:
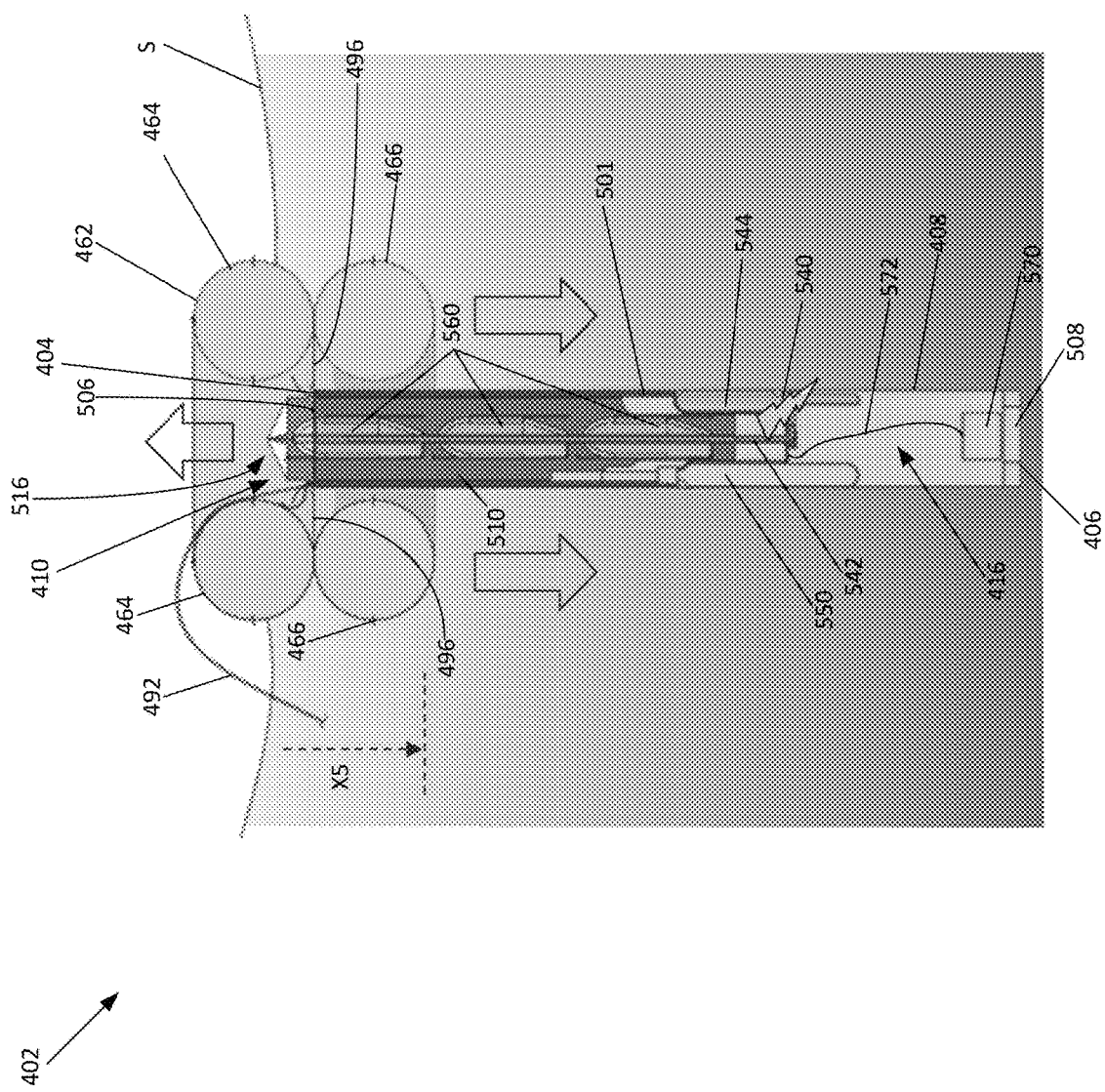

As further illustrated in FIGS. 8J and 8K, as the launch float 462 continues to inflate and expand, and as the launch float 462 continues to separate from the spool section container 470, the spool section container 470 breaks away from the first end 404 of the canister 402 in a plurality of parts. The guide tube 472 may break away from the lower cavity 480, while the guide tube 472 itself also separates into at least a first portion 474 and a second portion 476. Furthermore, the lower cavity 480 may also separate into at least a first portion 482 and a second portion 484 as the spool section container 470 breaks away from the first end 404 of the canister 402. As FIGS. 8J and 8K further illustrate, the launch float 462 may be coupled to the first end 404 of the canister 402 via connective membranes 496 that, as the launch float 462 continues to inflate, retains the launch float 462 proximate to the first end 404 of the canister 402. Moreover, as best illustrated in FIG. 8K, with the spool section container 470 continuing to separate from the first end 404 of the canister 402, the first and second portions 482, 484 of the lower cavity 480 may be connected to the launch float 462 by connective tethers 498 that retain the portions 482, 484 of the lower cavity 480 proximate to the inflating launch float 462. FIG. 8K further illustrates that, once the spool section container 470 separates from the first end 404 of the canister 402, and as the launch float 462 continues to inflate, the hermetic seal 506 of the first end 502 of the pressure vessel 501 may be located proximate to the first end 404 of the canister 402. As previously explained, the hermetic seal 506 is configured to prevent water from entering the pressure vessel 501 and the payload unit 500.

Turning to FIG. 8L, illustrated is the canister 402, where the launch float 462 is fully inflated, and where the first end 404 of the canister 402 is disposed proximate to the surface S of the body of water because of the fully inflated launch float 462 being coupled to the first end 404 of the canister 402 by the connective membranes 496. Once fully inflated, the launch float 462 may include a top portion 464 and a bottom portion 466, where the top and bottom portions 464, 466 may both be substantially doughnut shaped. Disposed between the top and bottom portions 464, 466 may be water drain holes 468 that are configured to enable water disposed within the center of the portions 464, 466 of the launch float 462 to be dispersed from the center of the launch float 462 so that the water is not disposed over the first end 404 of the canister 402 (i.e., so that the first end 404 of the canister 402 is not submerged in water). Water may enter the center of the portions 464, 466 of the launch float 462 from the canister 402 ascending through the body of water once the launch float 462 has inflated, or from waves that splash over the inflated launch float 462 as the launch float 462 floats on the surface S of the body of water. Having water disposed over the first end 404 of the canister 402 during the launch of the sabot 510 and the unmanned vehicles 560 may interfere or inhibit the sabot 510 and the unmanned vehicles 560 from launching properly from the canister 402. As further illustrated in FIG. 8L, the tether 492, which couples the surface float 432 and the antenna 438 of the surface float unit 430 to the canister 402, extends out of the interior cavity 416 of the canister 402 via the pass through 490, and through the center of the portions 464, 466 of the launch float 462.

Figure 8N:
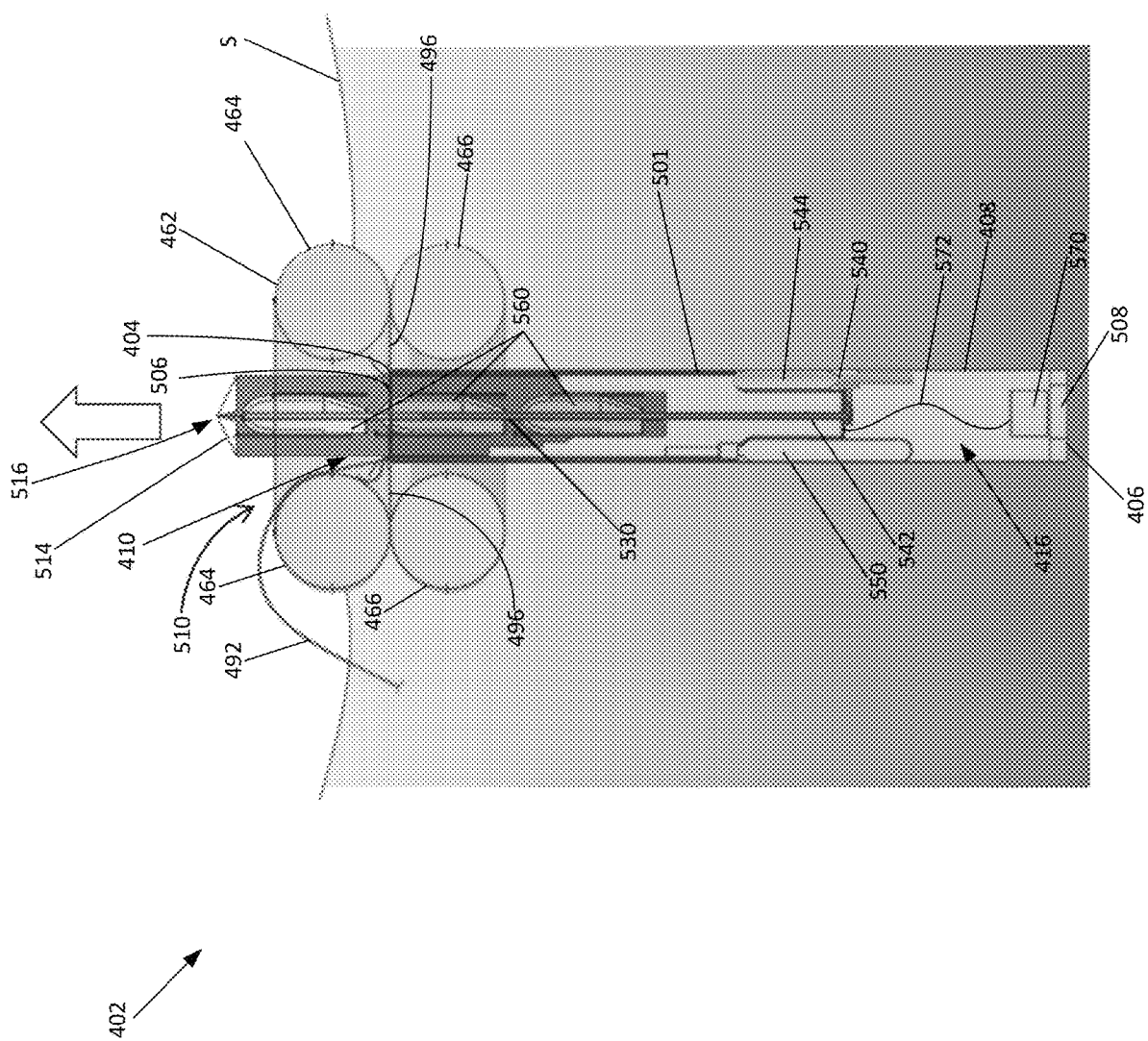
Figure 80:
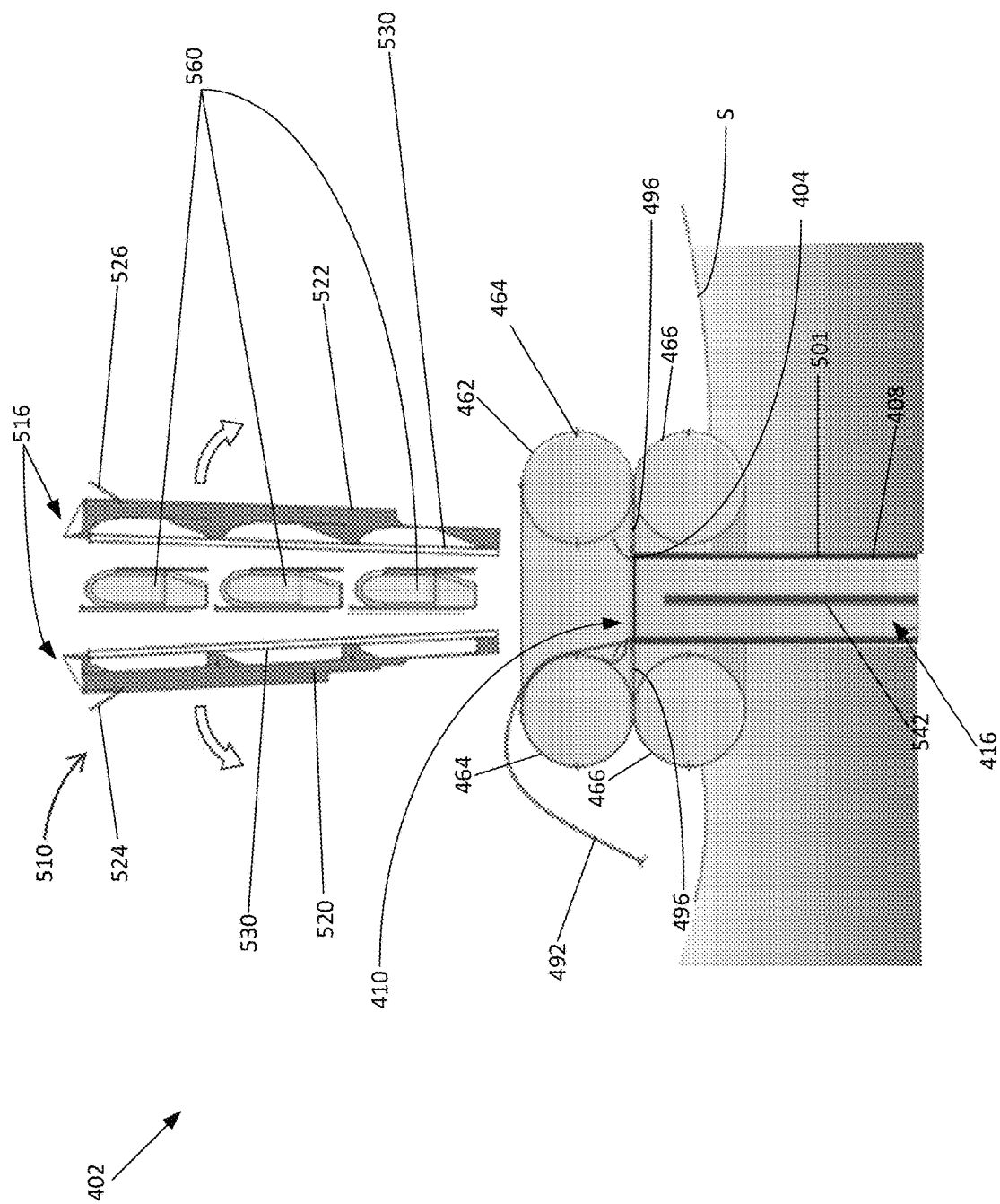

FIGS. 8M and 8N illustrate the sabot 510 being launched from the canister 402. As illustrated, once the first end 404 of the canister 402 has reached the surface S of the body of water due to the inflated launch float 462, and once any water located in the center of the portions 464, 466 of the launch float 462 has been dispersed through the drain holes 468, the electronic components box 570 may instruct the launch device 540 to release the compressed gas from the third compressed gas container 544. The released compressed gas travels, via the launch device 540, from the third compressed gas container 544 to the high pressure pistons 542. With the pressure pistons 542 being received by the pressure channels 530 of the sabot 510, as previously explained, the released compressed gas that travels through the pressure pistons 542 acts on the pressure channels 530 to propel the sabot 510 upwardly through the interior cavity 416 of the canister 402. As the sabot 510 is propelled upward through the canister 402, the piercing stylus 516 of the distal end 514 of the sabot 510 breaks through or pierces the hermetic seal 506 of the pressure vessel 501 disposed at the first end 404 of the canister 402. The release of the compressed gas from the third compressed gas container 544 further propels the sabot 510 out of the cavity 416 of the canister 402 via the opening 410 on the first end 404 of the canister 402, and through the center of the portions 464, 466 of the launch float 462. As best illustrated in FIG. 8M, when the compressed gas from the third compressed gas container 544 is initially released, the canister 402 may be displaced downwardly in the body of water a distance X5. In some embodiments, the displacement distance X5 may be approximately 6 inches.

Figure 9:
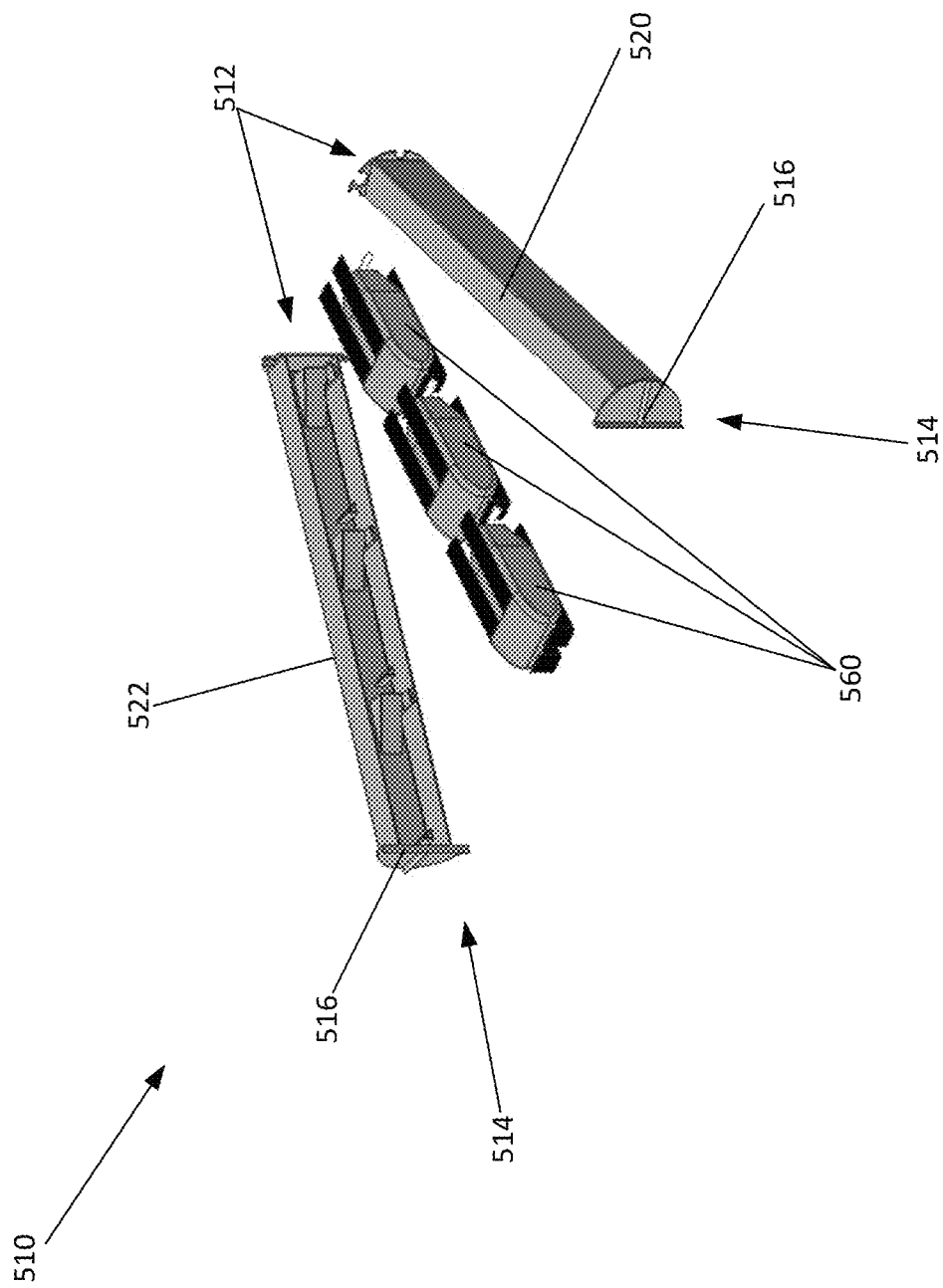
FIG. 9 illustrates an exploded view of the sabot for the unmanned vehicle that is disposed within the embodiment of the sonobuoy illustrated in FIG. 7.

Turning to FIG. 8O, shortly after the launched sabot 510 has fully left the canister 402 and cleared the top portion 464 of the launch float 462, the sabot 510 separates into a first half 520 and a second half 522. The sabot 510 separating into two halves 520, 522 and revealing the plurality of unmanned vehicles 560 is further shown in FIG. 9. The first half 520 may be equipped with wind flap 524, while the second half 522 may be equipped with wind flap 526. The wind flaps 524, 526 are configured to catch a portion of the airflow passing over the sabot 510 as the sabot 510 is propelled upward through the air. With the wind flaps 524, 526 disposed on opposing halves 520, 522 of the sabot 510, when the wind flaps 524, 526 catch a portion of the airflow passing over the sabot 510, the halves 520, 522 are pulled apart from one another. The momentum of the propelled sabot 510 is transferred to the unmanned vehicles 560 so that, as the halves 520, 522 of the sabot 510 are forced to separate from one another, the unmanned vehicles 560 continue to be propelled upward into the air. The unmanned vehicles 560 may be activated per a predetermined activation sequence (e.g., lower unmanned vehicle 560 to upper unmanned vehicle 560, or vice versa) to promote separation of the unmanned vehicles 560. While not illustrated, the surface float 432 and/or the launch float 462 may be equipped with seawater dissolvable plug or timed scuttle valves so that the canister 402 may be triggered to sink after the unmanned vehicles 560 have been launched.

Figure 10:
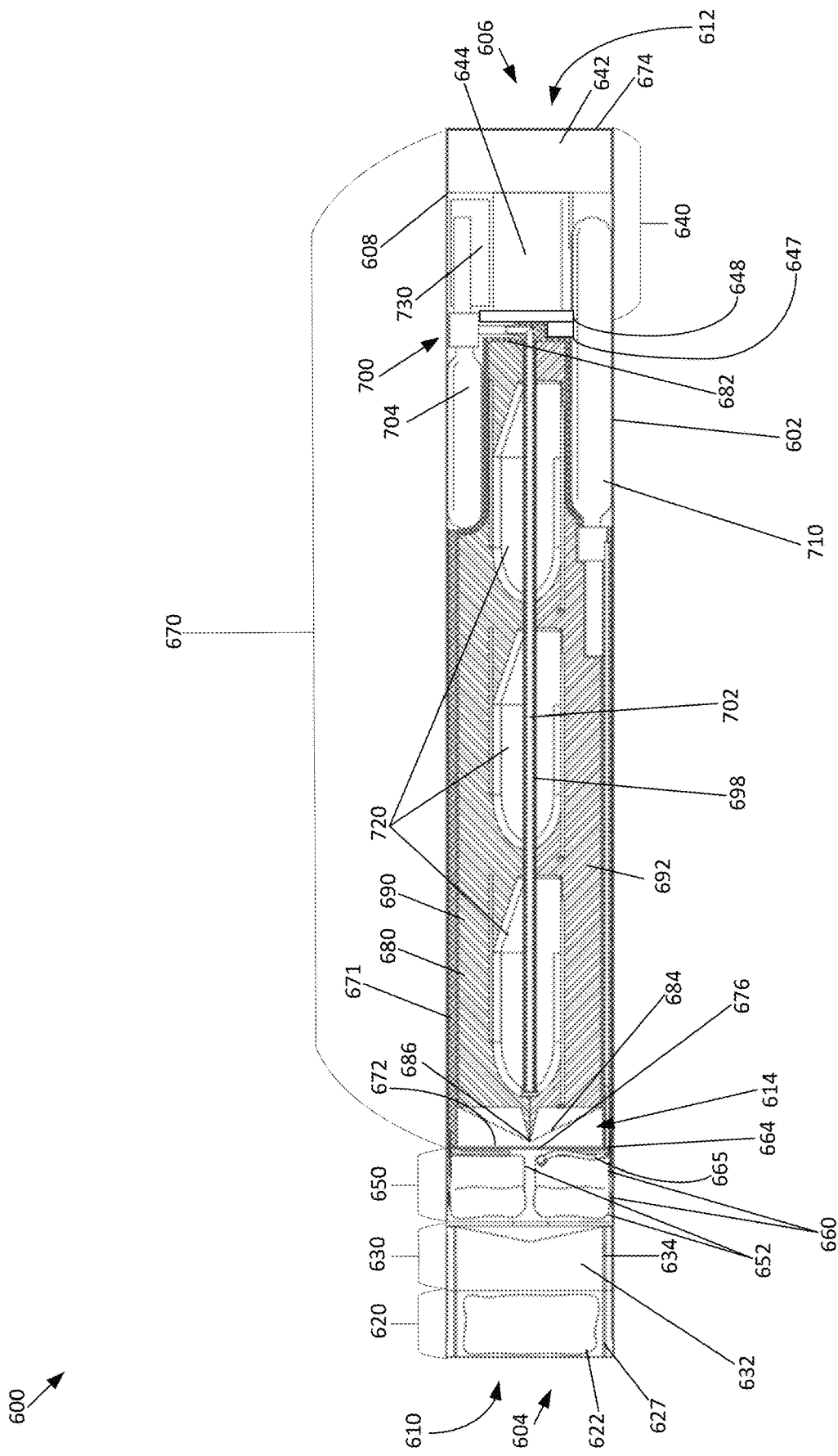
FIG. 10 illustrates a cross-sectional view of a second embodiment of a sonobuoy configured to house and launch at least one unmanned vehicle in accordance with the present disclosure.

Turning to FIGS. 10 and 11A-11F, illustrated is another embodiment of a sonobuoy 600 adapted to be deployed from a vehicle and then configured to launch at least one unmanned vehicle. The second embodiment of the sonobuoy 600 illustrated in FIG. 10 is substantially similar to the embodiment illustrated in FIGS. 7A-7D, in that the sonobuoy 600 may be substantially cylindrical, and may include a canister 602 that has a first end 604, an opposite second end 606, and a sidewall 608 spanning between the first and second ends 604, 606. The first end 604 of the canister 602 may include a substantially circular opening 610. Unlike the first embodiment of the sonobuoy 400, the embodiment illustrated in FIGS. 10 and 11A-11F may have a second circular opening 612 disposed at the second end 606 of the canister 602. The first end 604, the second end 606, and the sidewall 608 may collectively define a cavity 614 that is accessible via the openings 610, 612.

As best illustrated in FIG. 10, various units are adapted to be disposed within the cavity 614 of the canister 602 of the sonobuoy 600. Similar to the first embodiment of the sonobuoy 400, disposed within the cavity 614 proximate to the first end 604 of the canister 602 is a parachute unit 620. Unlike the first embodiment of the sonobuoy 400, disposed proximate to the parachute unit 620 of the second embodiment of the sonobuoy 600 is a foam slug unit 630. The embodiment of the sonobuoy 600 illustrated in FIG. 10 further includes an anchor unit 640 disposed within the cavity 614 of the canister 602 proximate to the second end 606 of the canister 602. Also disposed within the cavity 614 of the canister 602 of sonobuoy 600 is a launch float unit 650 that differs from the launch float unit 460 of the first embodiment of the sonobuoy 400, and a payload unit 670 that is substantially similar to the payload unit 500 of the first embodiment of the sonobuoy 400. The payload unit 670 may be disposed within the cavity 614 of the canister 602 between the launch float unit 650 and the anchor unit 640.

Figure 11A:
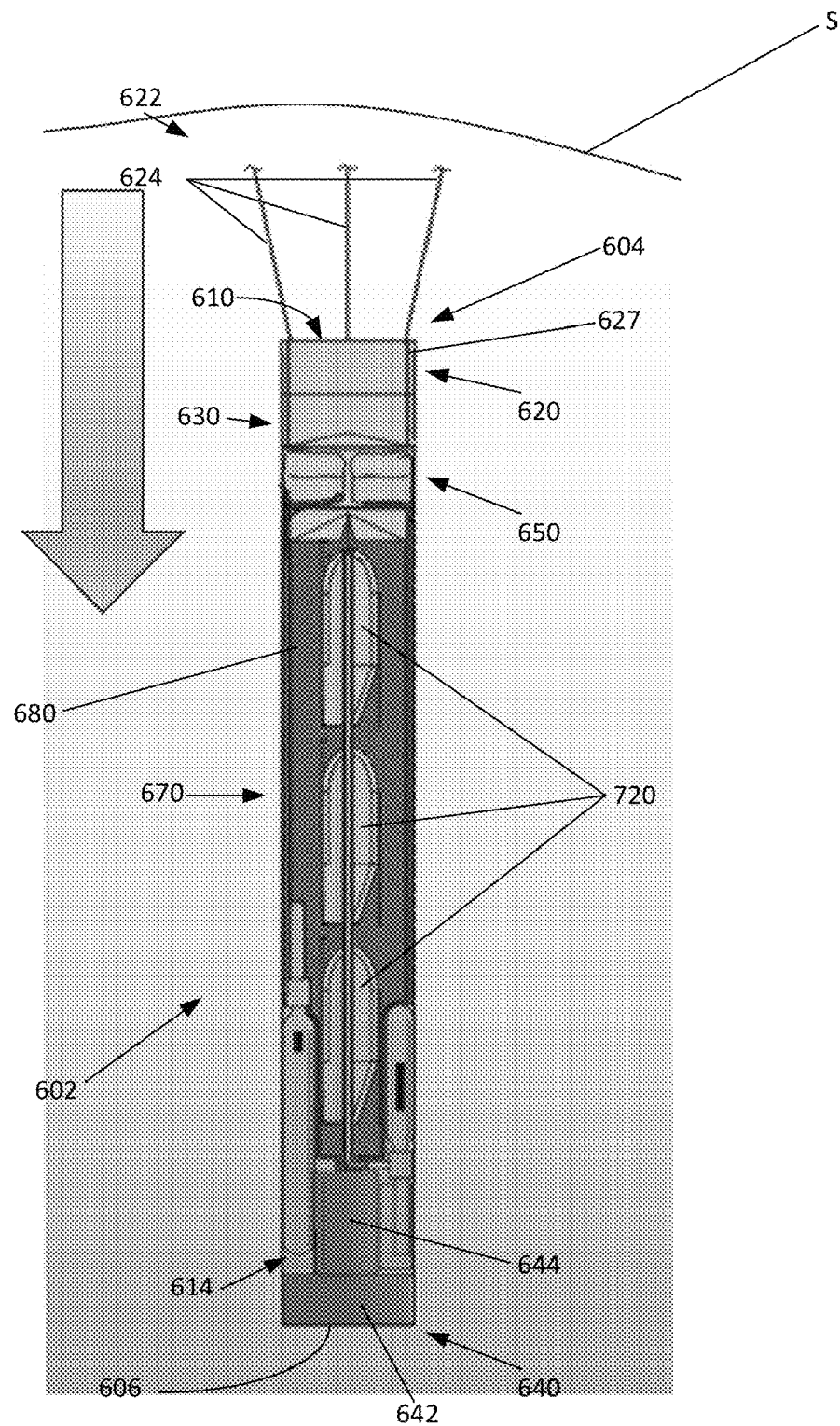
FIGS. 11A-11F illustrate cross-sectional views of the operational stages of the second embodiment of the embodiment of the sonobuoy illustrated in FIG. 10 for deploying the sonobuoy and launching the unmanned vehicles from the deployed sonobuoy.
Figure 11B:
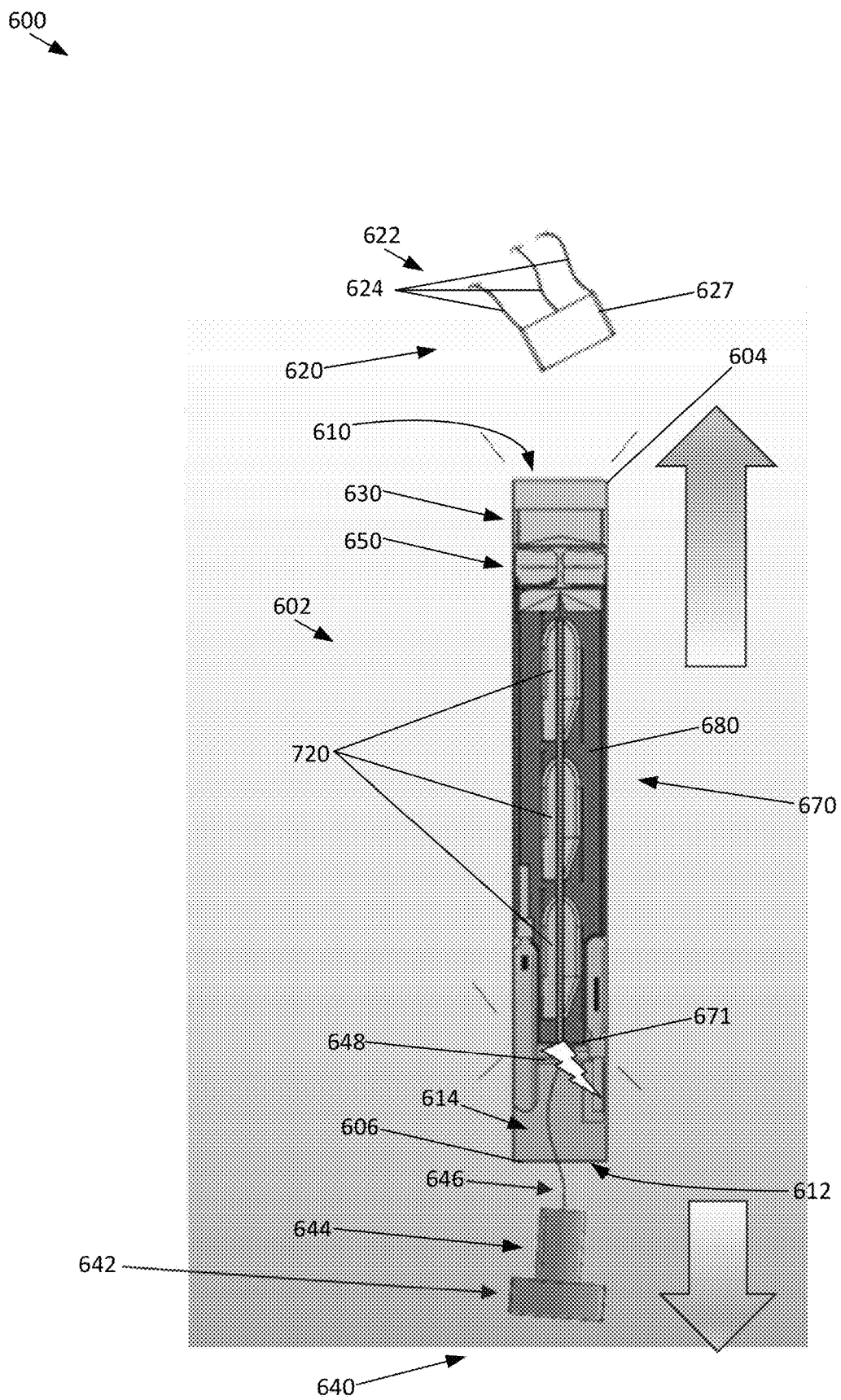

Continuing with FIG. 10, the parachute unit 620 is disposed proximate to the first end 604 of the canister 602, where, like parachute unit 420, the parachute unit 620 may include a parachute 622 packed into a parachute cup 627. The parachute unit 620 may be configured to operate substantially similar to that of parachute unit 420 of the first embodiment of the sonobuoy 400 (the operation of which is shown in FIGS. 8A and 8B) once the sonobuoy 600 has been deployed by a vehicle. As best illustrated in FIGS. 11A and 11B, the parachute 622 may be coupled to the parachute cup 627 via one or more parachute cords 624.

As further illustrated in FIG. 10, the foam slug unit 630 may be disposed between the parachute unit 620 and the launch float unit 650. The foam slug unit 630 may include a foam slug 632 disposed within a cup 634. The foam slug 632 may be disposed within the cavity 614 of the canister 602 for added stability of the other units 620, 640, 650, 670 disposed within the cavity 614 of the canister 602 (i.e., the presence of the foam slug 632 ensures the proper positioning of the other units 620, 640, 650, 670 within the cavity 614 of the canister 602).

The anchor unit 640, as previously explained and as illustrated in FIG. 10, may be disposed within the cavity 614 of the canister 602 proximate to the second end 606 of the canister 602. The anchor unit 640 may include an anchor 642, a spool section 644, a monofilament or cable 646 disposed within the spool section 644, a cable cutting device 647, and a platform 648. While the anchor 642 illustrated in FIGS. 10 and 11A-11F is a mooring anchor, any type of anchor may be utilized by the sonobuoy 600. Moreover, the anchor 642 may be constructed from any material (e.g., tungsten) configured to weigh the entire sonobuoy 600 down in a body of water. The anchor 642 may be coupled to the spool section 644, while, as best illustrated in FIGS. 11B-11E, the cable 646 may be coupled to both the spool section 644 and the platform 648. Thus, the anchor 642 and the spool section 644 may be coupled to the platform 648 by at least the cable 646. As best illustrated in FIG. 11F and further explained below, the cable cutting device 647 may be configured to sever the cable 646 in order to disconnect the platform 648, and ultimately the canister 602, from the anchor 642.

With continued reference to FIG. 10, the launch float unit 650 may include a float 652 that is packed into the cavity 614 of the canister 602. A pair of retention bands 660 may be disposed around the float 652 to retain the float 652 in the packed orientation when disposed within the cavity 614 of the canister 602. As further illustrated, the launch float unit 650 may further include a launch float fill tube 665 that is coupled to both the float 652 and a first compressed gas container 710, which is disposed more proximate to the second end 606 of the canister 602 (i.e., proximate to both the payload unit 670 and the anchor unit 640). The launch float fill tube 665 spans from the first compressed gas container 710, along the payload unit 670, through a pass-through 664 between the payload unit 670 and the launch float unit 650, to the packed float 652. As explained in further detail below, the launch float fill tube 665 may be configured to deliver gas from the first compressed gas container 710, through the pass-through 664, and to the float 652 to inflate the float 652.

Continuing with FIG. 10, the payload unit 670 may include a pressure vessel 671 that includes a first end 672 and an opposite second end 674. The first end 672 of the pressure vessel 671 may be disposed proximate to the launch float unit 650, while the second end 674 of the pressure vessel 671 may be disposed more proximate to the second end 606 of the canister 602 and proximate to the anchor unit 640. The pressure vessel 671 may further include a hermetic seal 676 at the first end 672 of the pressure vessel 671, where the hermetic seal 676 may prevent water from entering the pressure vessel 671 and/or the payload unit 670. As further illustrated, disposed within the pressure vessel 671 of the payload unit 670 is a sabot 680 that may include a proximal end 682, which is disposed proximate to the second end 674 of the pressure vessel 671, and an opposite distal end 684, which is disposed proximate to the first end 672 of the pressure vessel 671 and the launch float unit 650. The distal end 684 of the sabot 680 may include a piercing stylus 686, which, as explained in further detail below, may be configured to pierce or break the hermetic seal 676 disposed at the first end 672 of the pressure vessel 671 when the sonobuoy 600 launches the sabot 680 from the canister 602. The sabot 680 may include two half structures 690, 692, that together house multiple unmanned aerial vehicles 720 (e.g., three (3)) within the sabot 680. The sabot 680 may include one or more pressure channels 698 that span from the proximal end 682 to nearly the distal end 684. As further illustrated, a launch mechanism 700 may also be disposed within the payload unit 670, and operatively coupled to the pressure vessel 671 and the sabot 680. The launch mechanism 700 may include one or more pressure pistons 702 coupled to a third compressed gas container 704. As illustrated, when the sabot 680 is disposed within the cavity 614 of the canister 602 and within the pressure vessel 671, the one or more pressure pistons 702 may be received by the one or more pressure channels 698 of the sabot 680. As further explained below, the third compressed gas container 704 may release compressed gas into the one or more pressure channels 698 of the sabot 680 via the one or more pressure pistons 702 in order to launch the sabot 680 and unmanned aerial vehicles 720 from the canister 602.

Also included in the payload unit 670 may be an electronic components box 730. As illustrated, the electronic components box 730 may be disposed proximate to the second end 674 of the pressure vessel 671, disposed proximate to the anchor unit 640, and disposed proximate to the second end 606 of the canister 602. The electronic components box 730 may house electronic components that include, but are not limited to, a processor, sensors, an electronics control unit (hereinafter "ECU"), one or more batteries, a communication device, etc.

Turning to FIGS. 11A-11F, and with continued reference to FIG. 10, illustrated are the various steps of the deployment of the sonobuoy 600 after being launched from a vehicle. While not illustrated, the sonobuoy 600 may descend through the atmosphere and deploy the parachute 622 in a similar manner as that described with regard to FIGS. 8A and 8B, and with regard to the first embodiment of the sonobuoy 400. With the parachute unit 620 deployed out of the first opening 610 of the first end 604 of the canister 602, and with the anchor unit 640 disposed proximate to the second end 606 of the canister 602, the sonobuoy 600 descends through the atmosphere and first impacts the surface S of the body of water with the second end 606 of the canister 602. FIG. 11A illustrates the second embodiment of the sonobuoy 600 after the sonobuoy has struck the surface S of a body of water and has begun to descend downwardly from the surface S of the body of water. Because of the weight provided by the anchor 642 of the anchor unit 640, and because the anchor unit 640 is disposed at the second end 606 of the canister 602, the canister 602 descends through the body of water with the second end 606 of the canister 602 disposed below the first end 604 of the canister 602. In addition, the parachute 622, which is shown as still being coupled to the canister 602 via the parachute cords 624 and the parachute cup 627, may slow the descent of the canister 602 through the body of water as the parachute 622 catches water.

As illustrated in FIG. 11B, after the canister 602 has descended through the body of water for a period of time or has descended through the body a certain distance, the canister 602 may deploy the anchor 642 of the anchor unit 640. The deployment of the anchor 642 of the anchor unit 640 may be actuated via a pressure switch (i.e., once, as the canister 602 descends, the water pressure has increased above a predetermined limit), or may be actuated once a certain predetermined amount of time has passed since the canister 602 was launched from the vehicle or since the initial impact of the canister 602 with the surface S of the body of water. The spool section 644 of the anchor unit 640 is coupled to the anchor 642, and as the anchor 642 is deployed, the anchor 642 and spool section 644 descend out of and from the second opening 612 of the second end 606 of the canister 602. As previously explained, spool section 644 is configured to house a cable 646 that couples the spool section 644 and anchor 642 to the platform 648 disposed within the cavity 614 of the canister 602 proximate to the pressure vessel 671. As the anchor 642 and spool section 644 descend away from the canister 602, the cable 646 is unwound from the spool section 644.

Meanwhile, as further illustrated in FIG. 11B, before, after, or simultaneous to the anchor 642 being deployed from the second opening 612 of the second end 606 of the canister 602, the parachute unit 620 may become detached from the canister 602. More specifically, the parachute cup 627 may become detached from the canister 602 such that the parachute cup 627 slides out of the cavity 614 of the canister 602 via the first opening 610 of the first end 604 of the canister 602. Because the parachute 622 is coupled to the parachute cup 627 via the parachute cords 624, once the parachute cup 627 exits from the cavity 614 of the canister 602, the parachute 622 also becomes detached from the canister 602.

With the parachute unit 620 detached from the canister 602, and with the anchor 642 deployed out of the second end 606 of the canister 602, the canister 602 may become positively buoyant. Thus, as illustrated in FIG. 11B, with the parachute unit 620 detached and the anchor 642 in descent through the body of water, the canister 602 may ascend in the opposite direction from the anchor 642. This may allow for the cable 646 to be unwound from the spool section 644 more quickly.

Figure 11C:
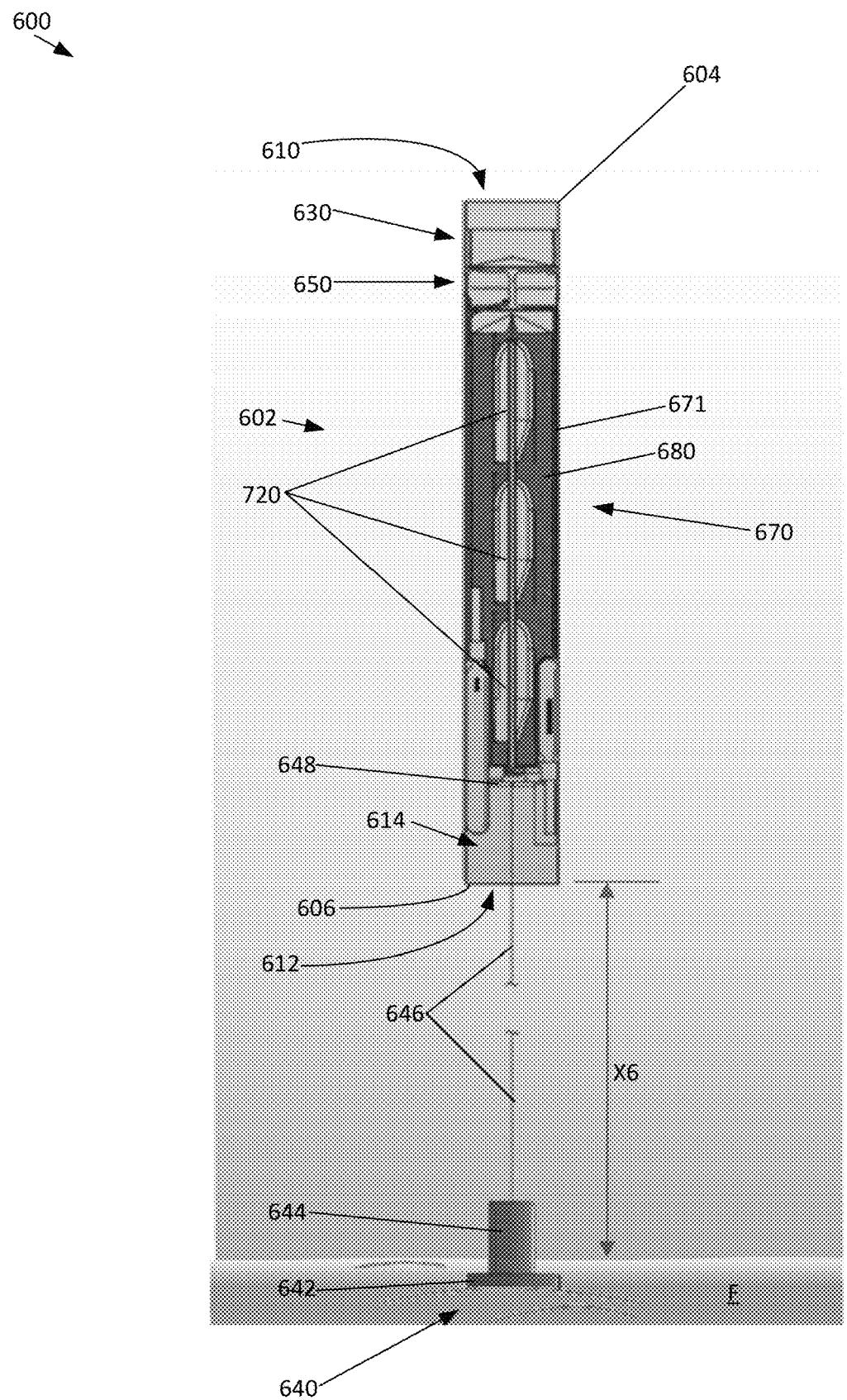

Turning to FIG. 11C, the cable 646 has been fully unwound from the spool section 644, while the anchor 642 may have come to rest on, or engaged with, the floor F of the body of water. Because the canister 602 itself may be positively buoyant, while the anchor 642 engages the floor F of the body of water, the positively buoyant canister 602 may ascend from the anchor 642 until the cable 646 is fully unwound and pulled taught. Thus, as illustrated in FIG. 11C, the second end 606 of the canister 602 may be spaced from the floor F of the body of water by a distance X6. The distance X6 may be based on the amount of cable 646 that was originally wound into the spool section 644.

Figure 11D:
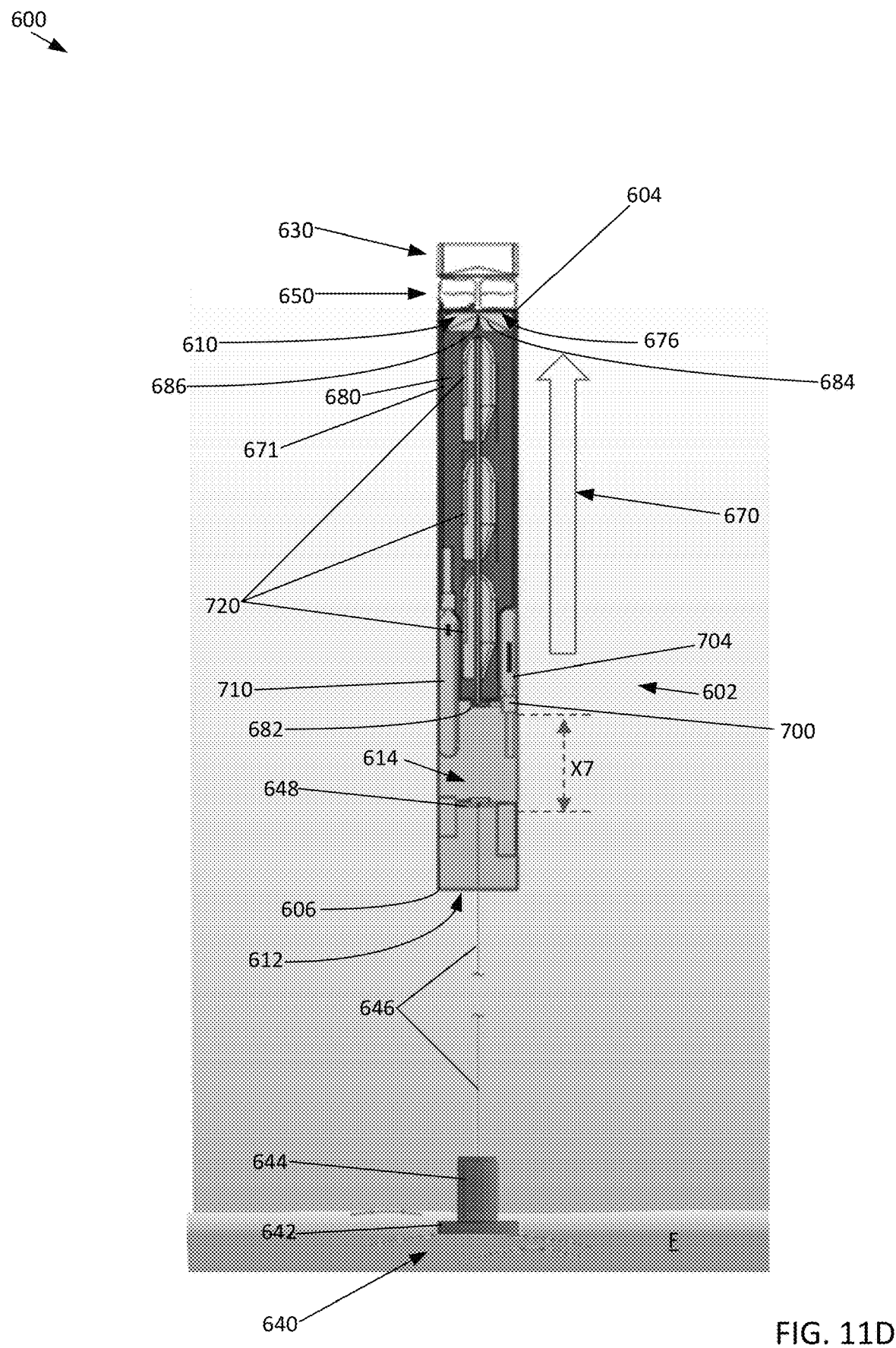

Turning to FIG. 11D, once the cable 646 has become taught, the foam slug unit 630, the launch float unit 650, the pressure vessel 671, the sabot 680 disposed within the pressure vessel 671, the first compressed gas container 710, and the launch mechanism 700 are slid upward through the cavity 614 of the canister 602. The foam slug unit 630 and the launch float unit 650 are slid through the cavity 614 of the canister 602 until the foam slug unit 630 and the launch float unit 650 have slid out of the first opening 610 of the first end 604 of the canister 602. As further illustrated, the pressure vessel 671 is slid upward through the cavity 614 of the canister 602 toward the first end 604 of the canister 602 until the hermetic seal 676 of the first end 672 of the pressure vessel 671 is disposed at, or proximate to, the first opening 610 of the first end 604 of the canister 602. Thus, the foam slug unit 630 and the launch float unit 650 may be disposed outside of the canister 602 while the pressure vessel 671 and other components of the payload unit 670 remain within the cavity 614 of the canister 602. When the canister 602 is in the position or orientation illustrated in FIG. 11D, the canister 602 is in a static equilibrium state, where the canister 602 awaits to receive a launch command signal from a device that is remote from the canister 602.

Figure 11E:
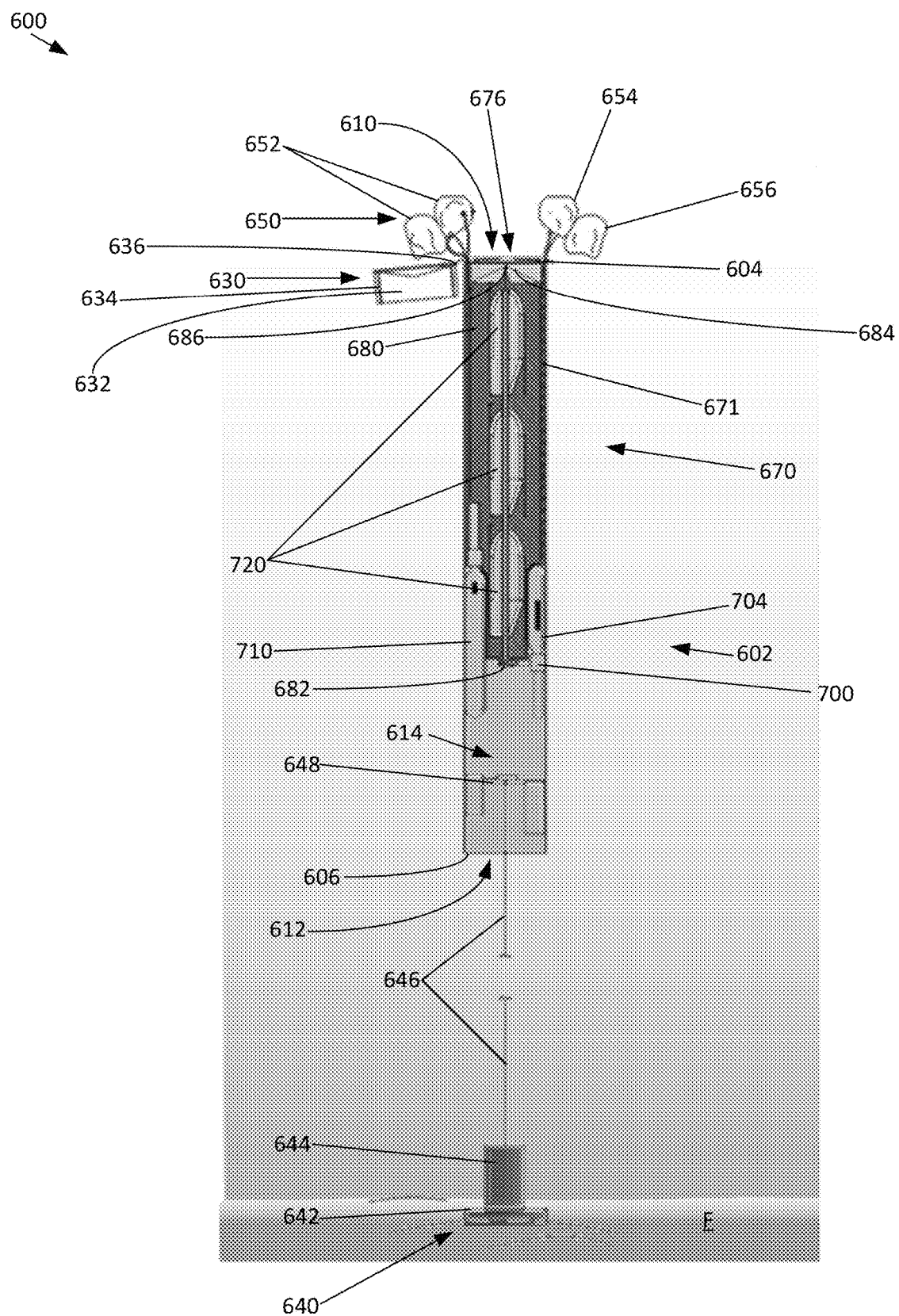
Figure 11F:
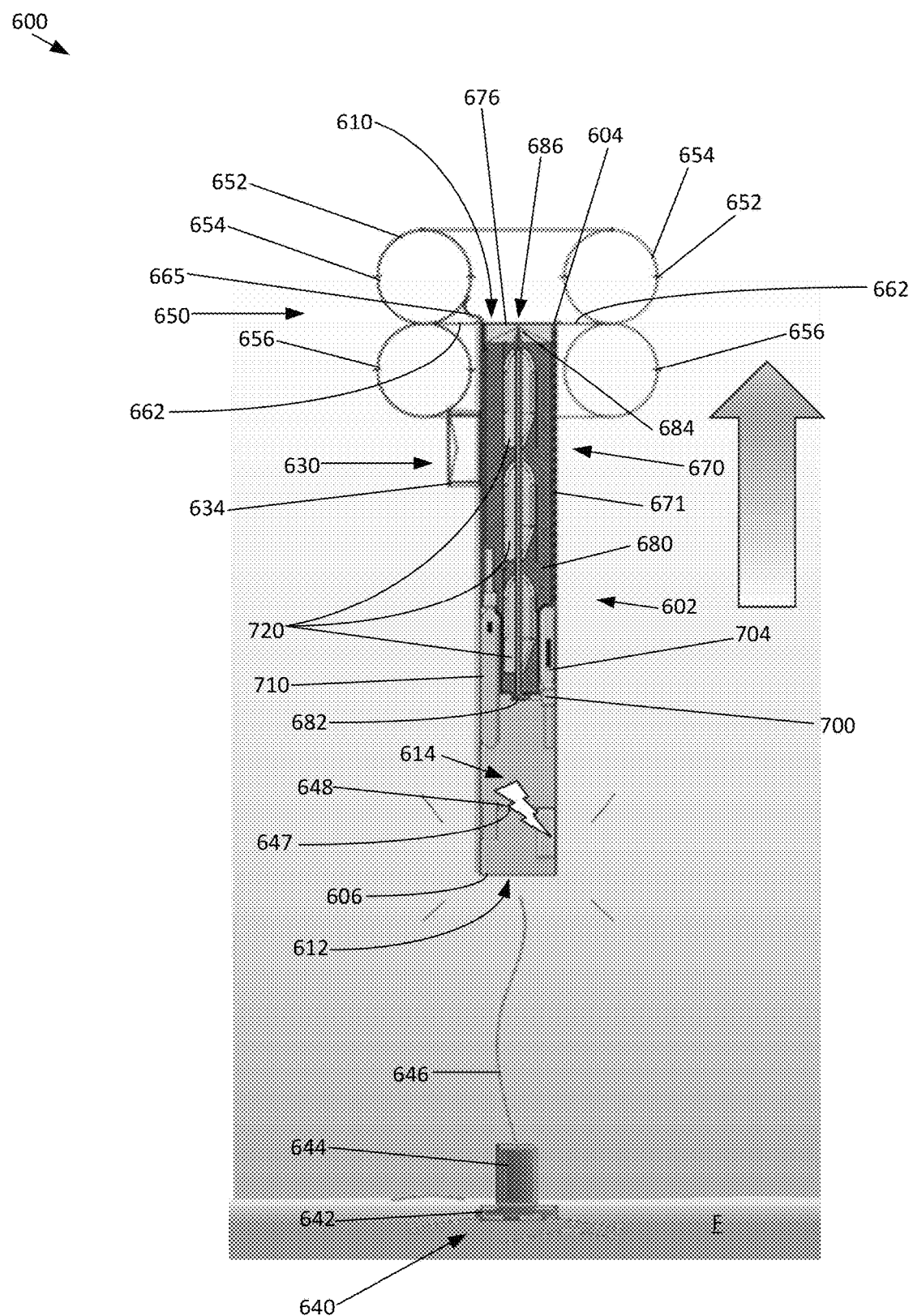

FIGS. 11E and 11F illustrate the ascent sequences performed by the sonobuoy 600 once a launch command signal has been received by the canister 602. As illustrated in FIG. 11E, after a launch command signal is received, the canister 602 may begin to inflate the launch float 652 with the compressed gas from the first compressed air container 710. As previously explained, the launch float transfer tube 665 may be connected to both the first compressed gas container 710 and the launch float 652, and may be configured to transfer the compressed gas from the first compressed gas container 710 to the launch float 652 in order to inflate the launch float 652. The inflation of the launch float 652 may cause the foam slug unit 630 to be slid, knocked, or repositioned to the side of the canister 602. As best illustrated in FIG. 11E, the foam slug 632 may be disposed within the cup 634, which may be coupled to the first end 604 of the canister 602 via tether 636. Thus, the tether 636 may prevent the foam slug unit 630 from fully separating from the canister 602 and floating to the surface.

As further illustrated in FIGS. 11E and 11F, as the launch float 652 is inflated, it unpacks itself, and, like that of the launch float 462 of the first embodiment of the sonobuoy 400, the launch float 652 of the second embodiment of the sonobuoy 600 may contain a top portion 654 and a bottom portion 656, where the top and bottom portions 464, 466 may both be substantially doughnut shaped. The launch float 652 may be coupled to the first end 604 of the canister 602 via connective membranes 662 that, as the launch float 652 continues to inflate, retains the launch float 652 proximate to the first end 604 of the canister 602. Once the launch float 652 has been fully inflated, the cable cutting device 647, which may be coupled to the platform 648 of anchor unit 640 that remains disposed within the cavity 614 of the canister 602, may be actuated to sever the cable 646 that couples the platform 648 to the spool section 644 and the anchor 642. Thus, once the cable 646 has be severed by the cable cutting device 647, the canister 602 may no longer be coupled to the anchor 642. With the canister 602 being positively buoyant, and with the launch float 652 fully inflated, once the canister 602 has been disconnected from the anchor 642, the canister 602 is free to float to the surface S of the body of water to launch the sabot 680 and the unmanned vehicles 720 from the canister 602. While not illustrated, the sonobuoy 600 may launch the sabot 680 and the unmanned vehicles 720 from the canister 602 in a substantially similar manner to that previously described with regard to FIGS. 8L-8O, and with regard to the first embodiment of the sonobuoy 400.

Figure 12A:
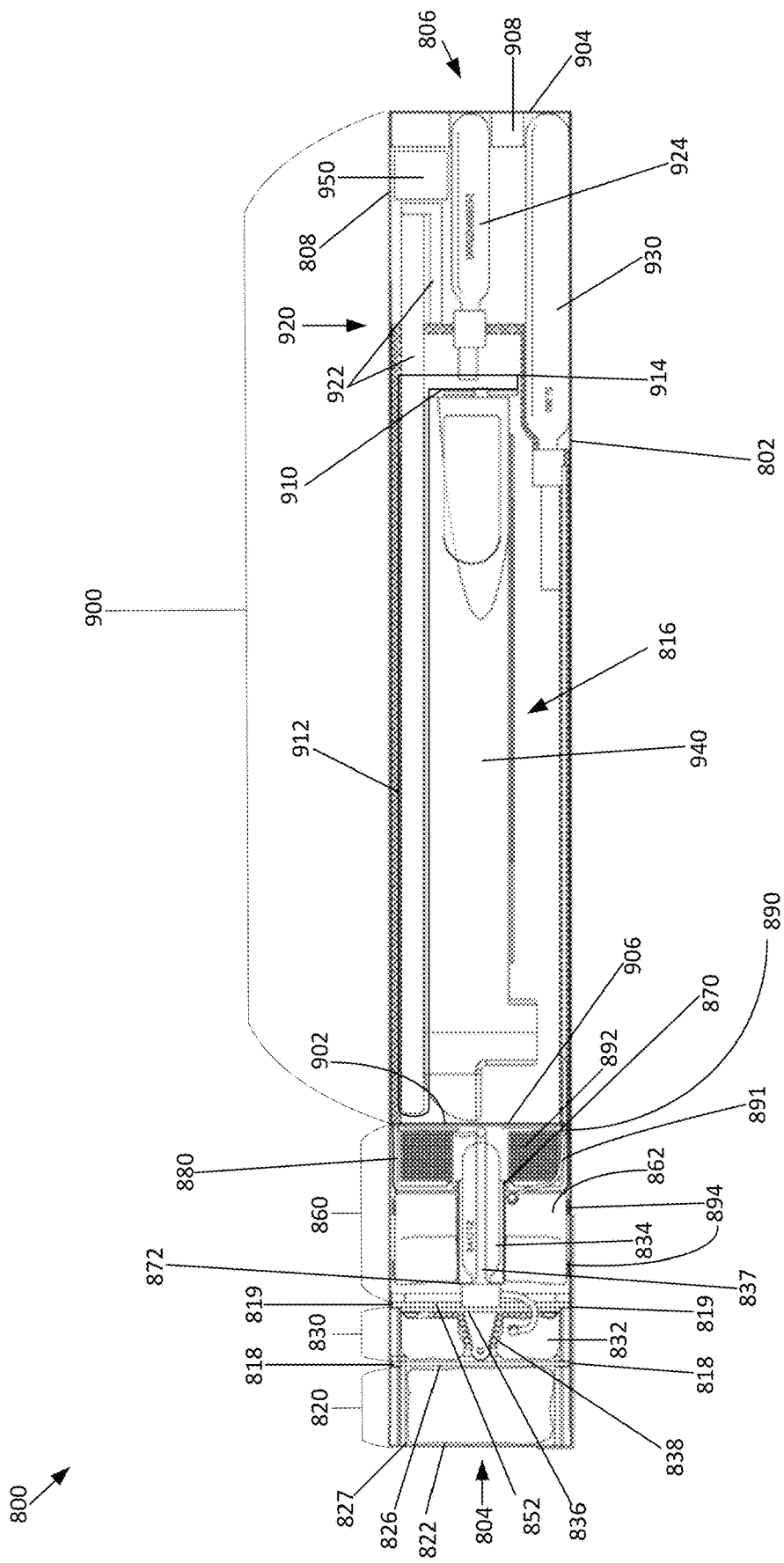
FIG. 12A illustrates a cross-sectional view of a third embodiment of a sonobuoy configured to house and launch at least one unmanned vehicle in accordance with the present disclosure.
Figure 12B:
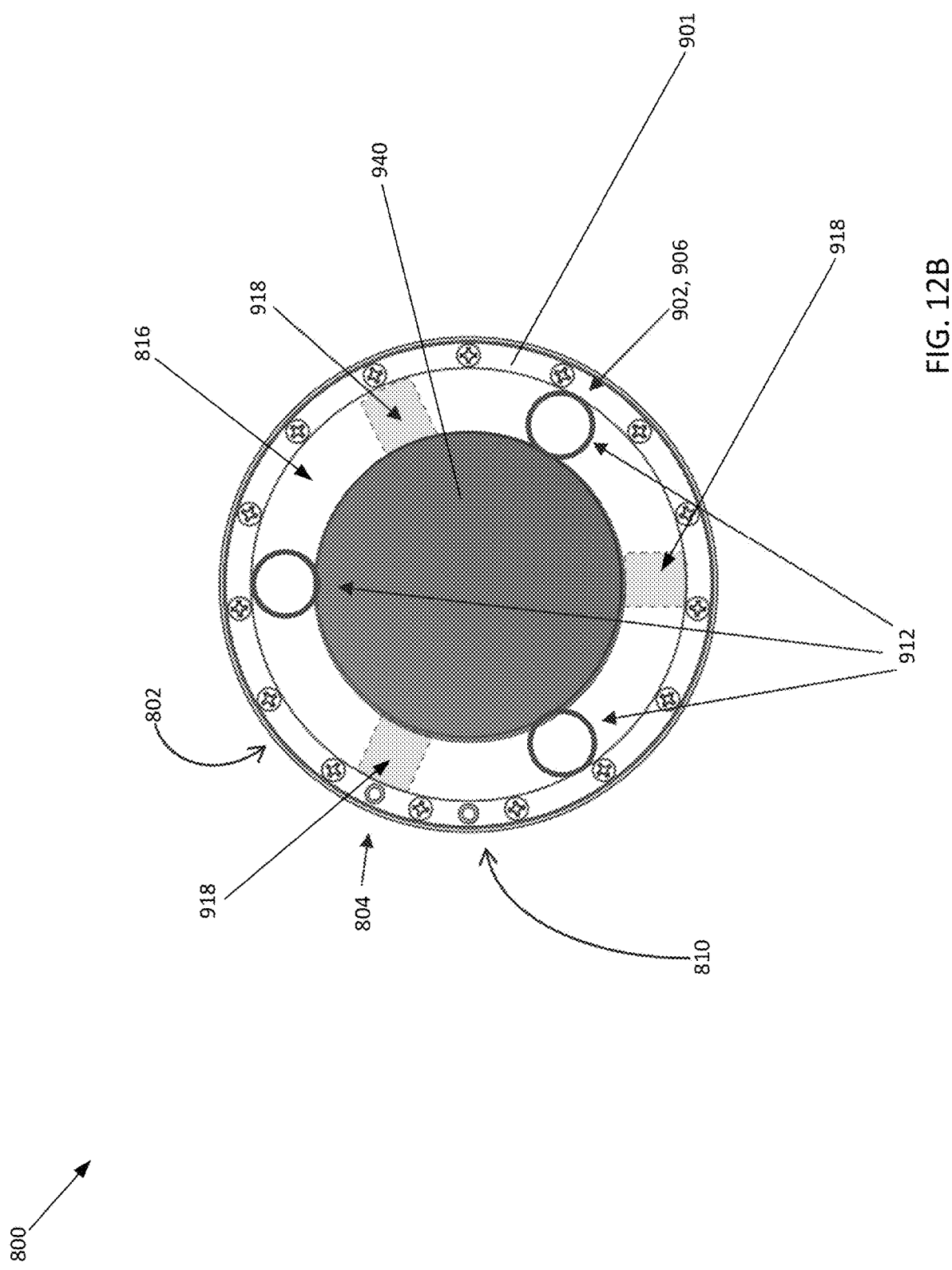
FIG. 12B illustrates radial cross-sectional view of the third embodiment of the sonobuoy illustrated in FIG. 12A.
Figure 13:
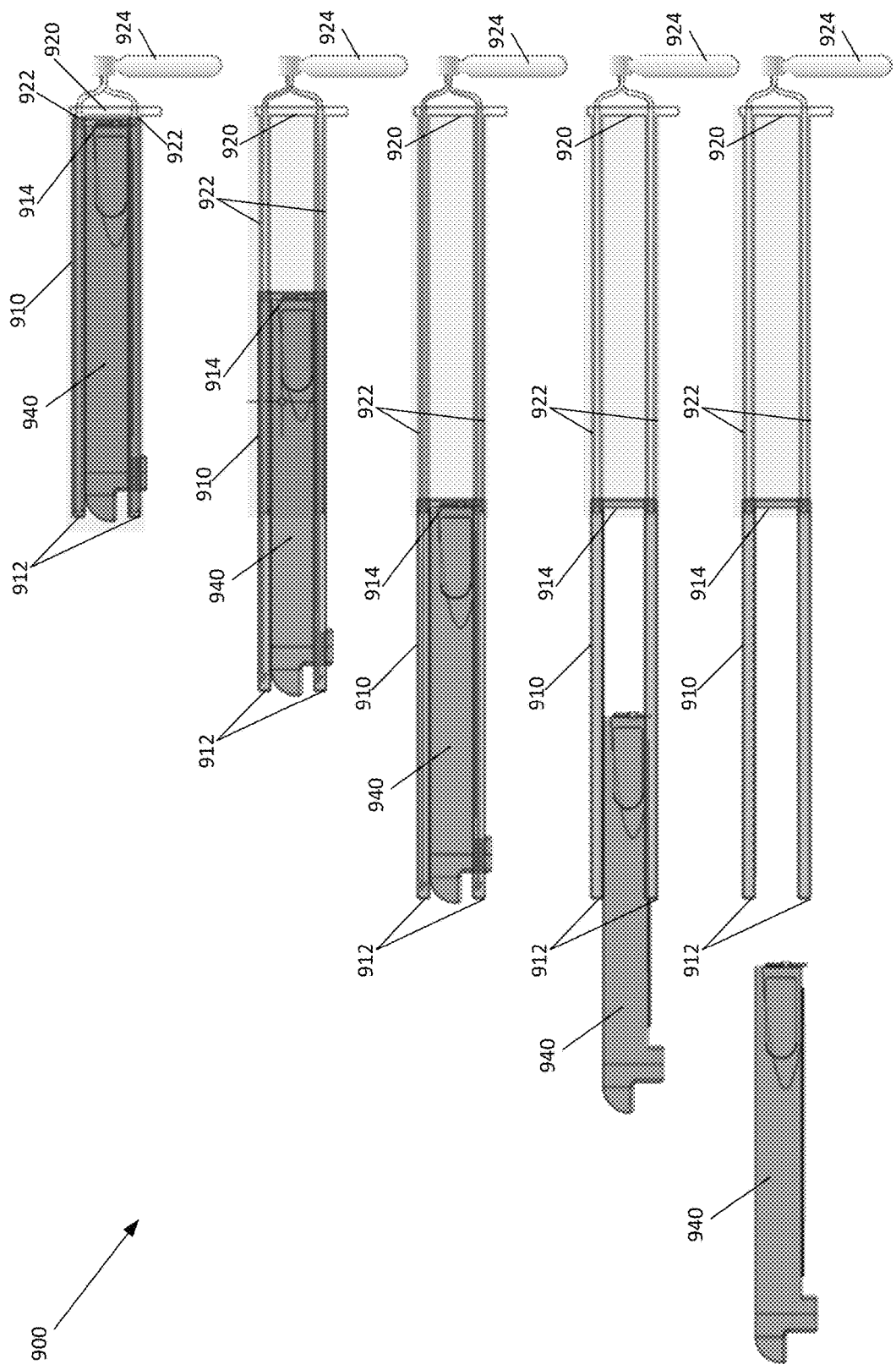
FIG. 13 illustrates views of the unmanned vehicle launch stages for deploying the unmanned vehicle from the third embodiment of the embodiment of the sonobuoy illustrated in FIGS. 12A and 12B.

Turning to FIGS. 12A, 12B, and 13, illustrated is third embodiment of a sonobuoy 800 that is adapted to be deployed from a vehicle and then configured to launch at least one unmanned vehicle. The third embodiment of sonobuoy 800 illustrated in FIGS. 12A and 12B are substantially similar to the embodiments illustrated in FIGS. 7A-7D and 10, in that the sonobuoy 800 may be substantially cylindrical, and may include a canister 802 that has a first end 804, an opposite second end 806, and a sidewall 808 spanning between the first and second ends 804, 806. The first end 804 of the canister 802 may include a substantially circular opening 810. The first end 804, the second end 806, and the sidewall 808 may collectively define a cavity 816 that is accessible via the opening 610.

As best illustrated in FIG. 12A, various units are adapted to be disposed within the cavity 816 of the canister 802 of the sonobuoy 800. Similar to the first embodiment of the sonobuoy 400, disposed within the cavity 816 proximate to the first end 804 of the canister 802 is a parachute unit 820. Also similar to the first embodiment of the sonobuoy 400, disposed proximate to the parachute unit 820 of the third embodiment of the sonobuoy 800 is a surface float unit 830, and then a launch float unit 860. The parachute unit 820, the surface float unit 830, and the launch float unit 860 may be identical to the parachute unit 420, the surface float unit 430, and the launch float unit 460 of the first embodiment of the sonobuoy 400 such that the units operate in the substantially same manner and contain substantially the same components. As further illustrated in FIG. 12A, the third embodiment of the sonobuoy 800 may also include a payload unit 900 disposed within the cavity 816 of the canister 602 between the launch float unit 860 and the second end 606 of the canister 602, where the payload unit 900 differs from the payload units 500, 670 of the first and second embodiments of the sonobuoys 400, 600, respectively.

Continuing with FIG. 12A, the parachute unit 820 is disposed proximate to the first end 804 of the canister 802, where, like parachute unit 420, the parachute unit 820 may include a parachute 822 packed into a parachute cup 827. The parachute unit 820 may be configured to operate substantially similar to that of parachute unit 420 of the first embodiment of the sonobuoy 400 (the operation of which is shown in FIGS. 8A and 8B) and to that of parachute unit 620 of the second embodiment of the sonobuoy 600 once the sonobuoy 800 has been deployed or launched by a vehicle. With continued reference to FIG. 12A, the parachute unit 820 may be disposed proximate to the surface float unit 830, where a crossbar or divider wall 826 separates the parachute unit 820 from the surface float unit 830. The crossbar 826, as illustrated, may sit at least partially inserted into shear pockets 818 that are disposed within the interior surface of the sidewall 808 of the canister 802.

The surface float unit 830, like that of surface float unit 430, may include a first float 832 that is packed around, and coupled to, a platform 836 when disposed within the cavity 816 of the canister 802. The platform 836 may include one or more elongated arms 837, which may extend in a substantially perpendicular direction to the platform 836 and along a first compressed gas container 834. As illustrated in FIG. 12A, the elongated arms 837 and the first compressed gas container 834 extend beyond or through a crossbar or divider wall 852, which separates the surface float unit 830 from the launch float unit 860. The crossbar 852, as illustrated, may sit within the cavity 816 of the canister 802 such that the crossbar 852 is at least partially inserted into shear pockets 819 that are disposed within the interior surface of the sidewall 808 of the canister 802. As illustrated, the shear pockets 819 may be spaced from shear pockets 818. Like that of the surface float unit 430, surface float unit 830 may further include an antenna 838 that is coupled to the platform 836, and, when the surface float unit 830 is disposed within the cavity 816 of the canister 802, is wound up or folded proximate to the first float 832 and the platform 836.

With continued reference to FIG. 12A, the launch float unit 860, like that of the launch float unit 460 of the first embodiment of the sonobuoy 400, may include a second float 862 that is packed around, and coupled to, a spool section container 870 when disposed within the cavity 816 of the canister 802. The spool section container 870 may be identical to the spool section container 470 in that the spool section container 870 also includes a central guide tube 872 and a lower cavity 880. The second float 862 may be packed around the central guide tube 872 of the spool section container 870. A pair of retention bands 894 may be disposed around the second float 862. As further illustrated, when the surface float unit 830 and the launch float unit 860 are disposed within the cavity 816 of the canister 802, the elongated arms 837 and the first compressed gas container 834 of the surface float unit 830 may extend into the spool section container 870. A tether or cord 892 may be disposed within the lower cavity 880 of the spool section container 870, where the tether 892 may be coupled to the elongated arms 837 of the platform 836 of the surface float unit 830, while also being coupled to the canister 802 via the pass-through 890. The launch float unit 860 may further include a launch float fill tube 891 that is coupled to both the second float 862 and the second compressed gas container 930, which is disposed within the payload unit 900 more proximate to the second end 806 of the canister 802. The launch float fill tube 891 may be configured to deliver gas from the second compressed gas container 930, through the pass-through 890, and to the second float 862 to inflate the second float 862.

Continuing with FIG. 12A, the payload unit 900 may include a pressure vessel 901 that includes a first end 902 and an opposite second end 904. The first end 902 of the pressure vessel 901 may be disposed proximate to the launch float unit 860, while the second end 904 of the pressure vessel 901 may be disposed more proximate to the second end 806 of the canister 802 than the first end 902 of the pressure vessel 901. The pressure vessel 901 may further include a hermetic seal 906 at the first end 902 of the pressure vessel 901, where the hermetic seal 906 may prevent water from entering the pressure vessel 901 or payload unit 900. The payload unit 900 may also include a ballast 908 disposed within the cavity 816 of the canister 802 between the second end 904 of the pressure vessel 901 and the second end 806 of the canister 802. As further illustrated in FIG. 12A, and unlike the payload units 500, 670 of the previous embodiments of the sonobuoys 400, 600, the pressure vessel 901 of the payload unit 900 may not include a sabot. Instead, a launch slider mechanism 910 and a single unmanned vehicle 940 may be disposed within the pressure vessel 901.

As illustrated in FIGS. 12A and 12B, the launch slider mechanism 910 may include a series of launch cylinders 912 disposed about the unmanned vehicle 940, and a rear platform 914 coupled to the launch cylinders 912 and disposed adjacent the rear side of the unmanned vehicle 940. In the illustrated embodiment, and as best illustrated in FIG. 12B, the launch slider mechanism 910 includes three launch cylinders disposed around the outside of the unmanned vehicle 940 and spaced equidistant from one another. In some embodiments, and as further illustrated in FIG. 12B, a series of guide blocks 918 may be disposed within the pressure vessel 901 around the unmanned vehicle 940 to further guide the unmanned vehicle 940 and to maintain a centered position by the unmanned vehicle 940 within pressure vessel 901 the during the launch of the unmanned vehicle 940. As further illustrated in FIGS. 12A and 12B, a launch mechanism 920 may also be disposed within the payload unit 900, and operatively coupled to the pressure vessel 901 and the launch slider mechanism 910. The launch mechanism 920 may include one or more pressure pistons 922 coupled to a third compressed gas container 924. As illustrated, the one or more pressure pistons 922 may be received by the one or more launch cylinders 912 of the launch slider mechanism 910. As further explained below, the third compressed gas container 924 may release compressed gas into the one or more launch cylinders 912 of the launch slider mechanism 910 via the one or more pressure pistons 922 in order to propel or slide the launch slider mechanism 910 and launch the unmanned aerial vehicle 940 from the canister 802.

Also included in the payload unit 900 may be an electronic components box 950. As illustrated, the electronic components box 950 may be disposed proximate to the second end 904 of the pressure vessel 901, and disposed proximate to the second end 806 of the canister 802. Thus, the electronic components box 950 may be disposed proximate to the ballast 908, while being disposed outside of the pressure vessel 501. The electronic components box 950 may house electronic components that include, but are not limited to, a processor, sensors, an electronics control unit (hereinafter "ECU"), one or more batteries, a communication device, etc.

Turning to FIG. 13, illustrated are the various steps of the launch of the unmanned vehicle 940 from the canister 802, where the launch slider mechanism 910, the launch mechanism 920, and the unmanned vehicle 940 are illustrated as being isolated from the canister 802 for illustrative purposes only. While not illustrated, the sonobuoy 800 may descend through the atmosphere and deploy the parachute 622 in a similar manner as that described with regard to FIGS. 8A and 8B, and with regard to the first embodiment of the sonobuoy 400. Moreover, while also not illustrated, the sonobuoy 800 may deploy the surface float 832 in a similar manner as that described with regard to FIGS. 8C-8H, and with regard to the first embodiment of the sonobuoy 400. The sonobuoy 800 may also deploy the launch float 862 and ascend to the launch position at the surface S of the body of water in a similar manner as that described with regard to FIGS. 8I-8L, and with regard to the first embodiment of the sonobuoy 400. Where the third embodiment of the sonobuoy 800 differs from the first embodiment of the sonobuoy 400 is the launch of the unmanned vehicle 940 from the canister 802. Once the canister 802 is floating at the surface S of the body of water because of the launch float 862, such that the first end 804 of the canister 802 is disposed above the surface S of the body of water and the second end 806 of the canister 802 is disposed below the surface S of the body of water, as illustrated in FIG. 13, the third compressed gas container 924 releases the compressed gas stored within the third compressed gas container 924 to propel or slide the launch slider mechanism 910 (i.e., toward the first end 804 of the canister 802) along the pressure pistons 922 (i.e., due to the pressure pistons 922 being received by the launch cylinders 912). As the pressure from the compressed gas acts on the launch cylinders 912 and causes the launch slider mechanism 910 to slide along the pressure pistons 922, the platform 914 acts on the rear or bottom side of the unmanned vehicle 940 to also cause the unmanned vehicle 940 to propel or slide in the same direction (i.e., toward the first end 804 of the canister 802). Because, as illustrated in FIG. 12B, the launch cylinders 912 and the guide blocks 918 are spaced equidistant from one another around the unmanned vehicle 940, the launch cylinders 912 and the guide blocks 918 guide the unmanned vehicle 940 as it is propelled. The third compressed gas container 924 may be configured to develop enough pressure with the compressed gas stored in the third compressed gas container 924 to generate enough force on the launch slider mechanism 910, and ultimately the unmanned vehicle 940, to break through the hermetic seal 906 at the first end 902 of the pressure vessel 901 and out of the opening 810 of the first end 804 of the canister 802. Once the launch slider mechanism 910 has slid far enough along the pressure pistons 922 of the launch mechanism 920 that the platform 914 is disposed at or proximate to the ends of the pressure pistons 922, the launch slider mechanism 910 is prevented from sliding any farther along the pressure pistons 922. The momentum generated by the launch slider mechanism 910 on the unmanned vehicle 940 may continue to propel the unmanned vehicle 940 away from the first end 804 of the canister 802, and out of the center of the launch slider mechanism 910 such that the unmanned vehicle 940 has been launched into the air and away from the canister 802. Once the unmanned vehicle 940 is free from the launch slider mechanism 910 and the canister 802, the unmanned vehicle 940 may be activated to perform the intended mission of the unmanned vehicle 940 either remotely or autonomously.

While referred to as a sonobuoy, and depicted in this document in water applications, the configuration of the systems described herein are not limited to water environments as shown. A configuration of this invention may be utilized or configured for ground deployments of the system.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed is:

1. A sonobuoy comprising:
a canister having a first end and an opposite second end, the canister defining an interior cavity;
an unmanned vehicle disposed within the interior cavity of the canister; and
a launch mechanism disposed within the interior cavity of the canister and operatively coupled to the unmanned vehicle, wherein the launch mechanism is configured to launch the unmanned vehicle from the canister, the launch mechanism comprising:
a compressed gas container;
a piston coupled to the compressed gas container and the canister; and
a slider mechanism coupled to the unmanned vehicle, the slider mechanism having a launch cylinder configured to receive the piston,
wherein the piston is configured to guide a compressed gas from the compressed gas container to the launch cylinder.

2. The sonobuoy of claim 1, further comprising a parachute unit disposed within the interior cavity of the canister proximate to the first end of the canister.

3. The sonobuoy of claim 2, wherein the parachute unit is configured to deploy a parachute from the first end of the canister after the sonobuoy has been launched and prior to the sonobuoy impacting a surface.

4. The sonobuoy of claim 3, wherein the launch mechanism is configured to launch the unmanned vehicle from the canister after the sonobuoy has impacted the surface.

5. The sonobuoy of claim 2, wherein the unmanned vehicle and the launch mechanism are disposed within the interior cavity of the canister more proximate to the second end of the canister than the first end of the canister.

6. The sonobuoy of claim 1, further comprising a communication device disposed within the interior cavity of the canister, wherein the communication device is configured to receive launch signals from a device remotely located from the sonobuoy.

7. The sonobuoy of claim 1, wherein the unmanned vehicle is a plurality of unmanned vehicles disposed within the interior cavity of the canister.

8. The sonobuoy of claim 1, wherein the compressed gas exits the piston and fills the launch cylinder to propel the slider mechanism and the unmanned vehicle towards the first end of the canister.

9. The sonobuoy of claim 1, wherein the launch mechanism further comprises:
   one or more additional pistons coupled to the compressed gas container and the canister, and the one or more additional pistons disposed radially about the slider mechanism; and
   one or more additional launch cylinders configured to receive the one or more additional pistons.

10. A sonobuoy comprising:
   a canister defining an interior cavity, the canister having a first end and a second end;
   a parachute disposed within the interior cavity of the canister proximate to the first end of the canister;
   an unmanned vehicle disposed within the interior cavity of the canister proximate to the second end;
   a launch mechanism disposed within the interior cavity of the canister and operatively coupled to the unmanned vehicle, wherein the launch mechanism is configured to launch the unmanned vehicle from the canister;
   a launch deployment mechanism disposed within the interior cavity of the canister between the unmanned vehicle and the parachute, wherein the launch deployment mechanism is configured to orient the canister with respect to a surface after the sonobuoy impacts the surface to facilitate the launch of the unmanned vehicle from the canister; and
   an anchor unit disposed within the interior cavity of the canister opposite the launch deployment mechanism, the anchor unit comprising:
      an anchor; and
      a cable coupled to the anchor and the canister,
   wherein the anchor unit secures the canister to a floor below the surface.

11. The sonobuoy of claim 10, wherein the parachute is configured to be deployed from the first end of the canister after the sonobuoy has been launched and prior to the sonobuoy impacting the surface.

12. The sonobuoy of claim 11, further comprising a communication device disposed within the interior cavity of the canister, wherein the communication device is configured to receive one or more launch signals from a device remotely located from the sonobuoy after the sonobuoy impacts the surface, the one or more launch signals being configured to actuate the launch mechanism to launch the unmanned vehicle from the canister.

13. The sonobuoy of claim 10, wherein the launch mechanism includes a container of compressed gas.

14. The sonobuoy of claim 10, wherein the launch deployment mechanism comprises:
   a launch float disposed in the interior cavity and operatively coupled to the canister; and
   the anchor unit further comprises a cutting device,
   wherein, in response to a received signal:
      the cutting device is configured to sever the cable to disconnect the anchor from the canister, and
      the launch float is configured to inflate, exit the canister, and float the canister to the surface.

15. The sonobuoy of claim 10, further comprising:
   a surface float configured to float an antenna to the surface when the canister is submerged; and
   a tether coupling the antenna to the submerged canister.

16. A sonobuoy comprising:
   a canister having a first end, an opposite second end, and a sidewall spanning between the first end and the second end, wherein the first end, the second end, and the sidewall collectively define an interior cavity;
   a parachute disposed within the interior cavity of the canister proximate to the first end of the canister;
   an unmanned vehicle disposed within the interior cavity of the canister proximate to the second end of the canister;
   a launch mechanism disposed within the interior cavity of the canister and operatively coupled to the unmanned vehicle, wherein the launch mechanism is configured to launch the unmanned vehicle from the canister;
   a seal configured to prevent water from entering the launch mechanism when the sonobuoy is deployed in a body of water; and
   a piercing stylus configured to pierce the seal when the unmanned vehicle is launched by the launch mechanism.

17. The sonobuoy of claim 16, wherein the unmanned vehicle is a plurality of unmanned vehicles that may be simultaneously launched from the canister by the launch mechanism.

18. The sonobuoy of claim 16, wherein the launch mechanism includes a container of compressed gas configured to propel the unmanned vehicle from the interior cavity of the canister.

19. The sonobuoy of claim 16, further comprising a communication device disposed within the interior cavity of the canister, wherein the communication device is configured to receive one or more launch signals from a device remotely located from the sonobuoy, the one or more launch signals being configured to actuate the launch mechanism to launch the unmanned vehicle from the canister.

20. The sonobuoy of claim 16, wherein the piercing stylus is disposed on the unmanned vehicle or a sabot receiving the unmanned vehicle.

* * * * *